Nov. 10, 1964 H. J. MUMMA 3,156,900

MEMORY DEVICE FOR A MACHINE FOR HANDLING EGGS

Original Filed Dec. 28, 1953 32 Sheets-Sheet 1

INVENTOR
HAROLD J. MUMMA

BY Hans G. Hoffmeister

ATTORNEY

INVENTOR
HAROLD J. MUMMA

BY Hans G. Hoffmeister

ATTORNEY

Nov. 10, 1964 H. J. MUMMA 3,156,900

MEMORY DEVICE FOR A MACHINE FOR HANDLING EGGS

Original Filed Dec. 28, 1953 32 Sheets-Sheet 3

INVENTOR
HAROLD J. MUMMA

BY Hans G. Hoffmeister
ATTORNEY

MEMORY DEVICE FOR A MACHINE FOR HANDLING EGGS

Original Filed Dec. 28, 1953

INVENTOR
HAROLD J. MUMMA
BY Hans G. Hoffmeister
ATTORNEY

MEMORY DEVICE FOR A MACHINE FOR HANDLING EGGS

Original Filed Dec. 28, 1953 32 Sheets-Sheet 5

INVENTOR
HAROLD J. MUMMA
BY Hans G. Hoffmeister
ATTORNEY

Nov. 10, 1964 H. J. MUMMA 3,156,900

MEMORY DEVICE FOR A MACHINE FOR HANDLING EGGS

Original Filed Dec. 28, 1953 32 Sheets-Sheet 6

INVENTOR
HAROLD J. MUMMA

BY Hans G. Hoffmeister
ATTORNEY

MEMORY DEVICE FOR A MACHINE FOR HANDLING EGGS

Original Filed Dec. 28, 1953 32 Sheets-Sheet 7

INVENTOR
HAROLD J. MUMMA

BY Hans G. Hoffmeister
ATTORNEY

MEMORY DEVICE FOR A MACHINE FOR HANDLING EGGS

Original Filed Dec. 28, 1953 32 Sheets-Sheet 8

INVENTOR
HAROLD J. MUMMA

BY Hans G. Hoffmeister
ATTORNEY

MEMORY DEVICE FOR A MACHINE FOR HANDLING EGGS

INVENTOR.
HAROLD J. MUMMA

BY Hans G. Hoffmeister
ATTORNEY

INVENTOR
HAROLD J. MUMMA
BY Hans G. Hoffmeister
ATTORNEY

MEMORY DEVICE FOR A MACHINE FOR HANDLING EGGS

Original Filed Dec. 28, 1953 32 Sheets-Sheet 11

INVENTOR
HAROLD J. MUMMA
BY Hans G. Hoffmeister
ATTORNEY

INVENTOR
HAROLD J. MUMMA
BY Hans G. Hoffmeister
ATTORNEY

INVENTOR
HAROLD J. MUMMA

BY Hans G. Hoffmeister
ATTORNEY

INVENTOR
HAROLD J. MUMMA
BY Hans G. Hoffmeister
ATTORNEY

INVENTOR
HAROLD J. MUMMA
BY Hans G. Hoffmeister
ATTORNEY

MEMORY DEVICE FOR A MACHINE FOR HANDLING EGGS

Original Filed Dec. 28, 1953

32 Sheets-Sheet 16

INVENTOR
HAROLD J. MUMMA

BY [signature]
ATTORNEY

MEMORY DEVICE FOR A MACHINE FOR HANDLING EGGS

Original Filed Dec. 28, 1953 32 Sheets-Sheet 17

INVENTOR
HAROLD J. MUMMA

BY Hans G. Hoffmeister
ATTORNEY

INVENTOR
HAROLD J. MUMMA
BY Hans G. Hoffmeister
ATTORNEY

MEMORY DEVICE FOR A MACHINE FOR HANDLING EGGS

Original Filed Dec. 28, 1953 32 Sheets-Sheet 19

INVENTOR
HAROLD J. MUMMA
BY Hans G. Hoffmeister
ATTORNEY

INVENTOR
HAROLD J. MUMMA

BY Hans G. Hoffmeister
ATTORNEY

Nov. 10, 1964 H. J. MUMMA 3,156,900

MEMORY DEVICE FOR A MACHINE FOR HANDLING EGGS

Original Filed Dec. 28, 1953 32 Sheets-Sheet 21

INVENTOR

HAROLD J. MUMMA

BY Hans G. Hoffmeister

ATTORNEY

MEMORY DEVICE FOR A MACHINE FOR HANDLING EGGS

Original Filed Dec. 28, 1953 32 Sheets-Sheet 22

INVENTOR
HAROLD J. MUMMA
BY Hans G. Hoffmeister
ATTORNEY

INVENTOR
HAROLD J. MUMMA

BY Hans G. Hoffmeister
ATTORNEY

Nov. 10, 1964 H. J. MUMMA 3,156,900

MEMORY DEVICE FOR A MACHINE FOR HANDLING EGGS

Original Filed Dec. 28, 1953 32 Sheets-Sheet 24

INVENTOR
HAROLD J. MUMMA

BY Hans G. Hoffmeister
ATTORNEY

MEMORY DEVICE FOR A MACHINE FOR HANDLING EGGS

Original Filed Dec. 28, 1953 32 Sheets-Sheet 25

INVENTOR
HAROLD J. MUMMA

BY Hans G. Hoffmeister
ATTORNEY

INVENTOR
HAROLD J. MUMMA
BY Hans G. Hoffmeister
ATTORNEY

MEMORY DEVICE FOR A MACHINE FOR HANDLING EGGS

Original Filed Dec. 28, 1953 32 Sheets-Sheet 27

INVENTOR
HAROLD J. MUMMA
BY Hans G. Hoffmeister
ATTORNEY

INVENTOR
HAROLD J. MUMMA
BY Hans G. Hoffmeister
ATTORNEY

MEMORY DEVICE FOR A MACHINE FOR HANDLING EGGS

Original Filed Dec. 28, 1953 32 Sheets-Sheet 29

INVENTOR
HAROLD J. MUMMA
BY Hans G. Hoffmeister
ATTORNEY

INVENTOR
HAROLD J. MUMMA
BY Hans G. Hoffmeister
ATTORNEY

INVENTOR
HAROLD J. MUMMA
BY Hans G. Hoffmeister
ATTORNEY

Nov. 10, 1964 H. J. MUMMA 3,156,900

MEMORY DEVICE FOR A MACHINE FOR HANDLING EGGS

Original Filed Dec. 28, 1953 32 Sheets-Sheet 32

INVENTOR
HAROLD J. MUMMA

BY Hans G. Hoffmeister
ATTORNEY

United States Patent Office 3,156,900
Patented Nov. 10, 1964

3,156,900

MEMORY DEVICE FOR A MACHINE FOR HANDLING EGGS

Harold J. Mumma, Riverside, Calif., assignor to FMC Corporation, a corporation of Delaware Original application Dec. 28, 1953, Ser. No. 400,466, now Patent No. 2,895,274, dated July 21, 1959. Divided and this application May 15, 1959, Ser. No. 813,547
16 Claims. (Cl. 340—173)

The present invention relates in general to machines for handling eggs, and more particularly to a memory device adapted for use in egg handling machines.

This application is a division of my copending application, U.S. Serial No. 400,466, filed December 28, 1953, for a Machine for Handling Eggs now U.S. Patent No. 2,895,274.

An object of the present invention is to provide means for registering the quality of eggs delivered onto a conveyor from supply chutes representing different quality classifications.

Another object is to provide means for registering both the quality and the weight of each egg traveling along a predetermined conveyor path.

Another object is to provide control means effective to record the quality and weight of each egg delivered onto a conveyor path and to effect discharge of eggs of a predetermined quality and weight combination at identical points of said conveyor path.

Another object is to provide a rotary control device for egg supporting conveyors having members operable to be set into effective position representative of different quality grades and weights of an egg and operative when in effective position to initiate operation of a mechanism effective to drop eggs of selected quality and weight combinations from said conveyor at predetermined points thereof.

Another object is to provide an arrangement for a rotary control device operable to dependably set representative members thereof into effective position even though the rotary control device may travel at high speeds.

Another object is to provide an improved data storage device that is particularly adapted for use in the processing of eggs or other similar articles.

These and other objects of the present invention will be apparent from the following description of the accompanying drawings which illustrate a preferred embodiment thereof and wherein.

Figures 20, 22, 23:
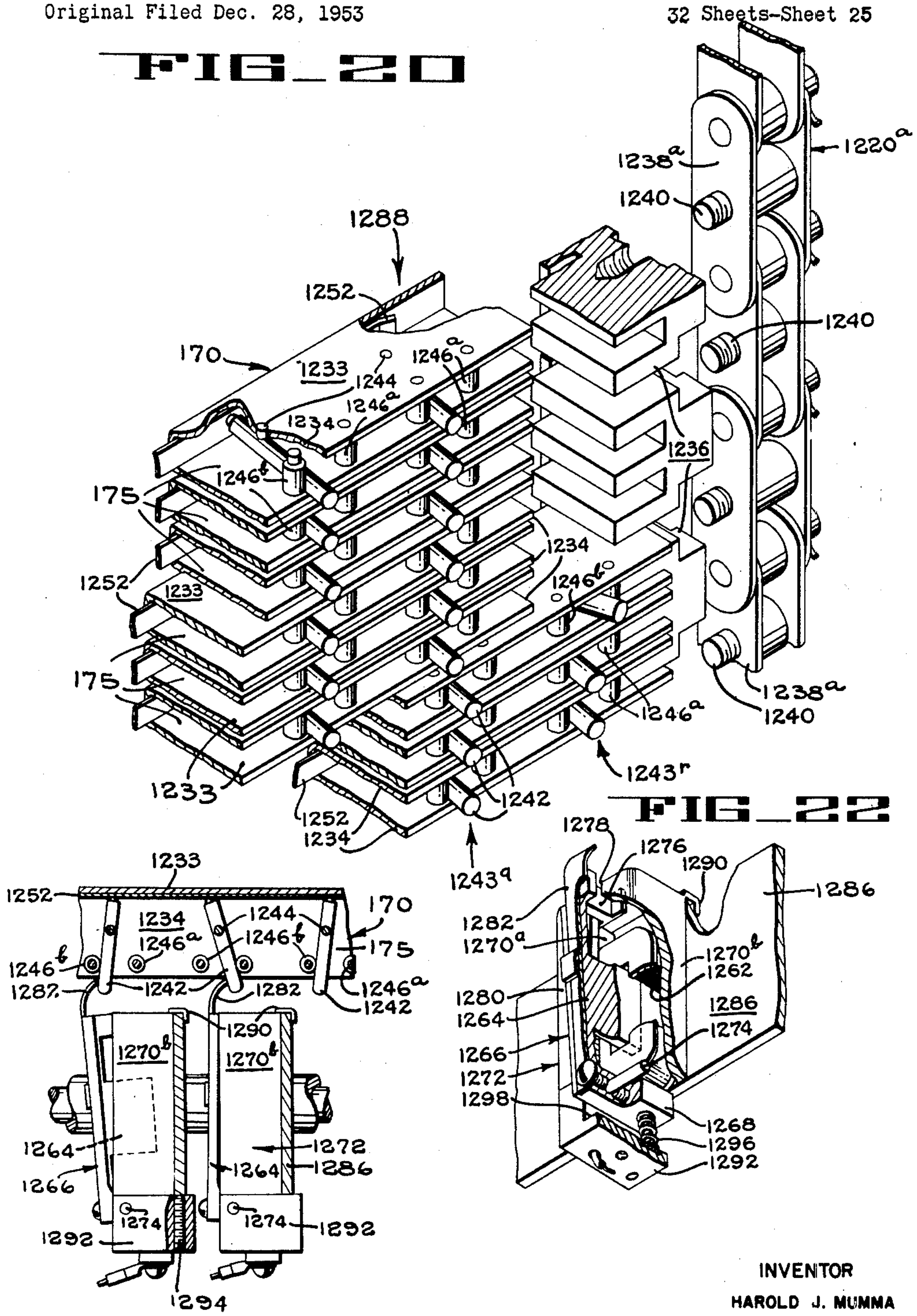
FIG. 20 is a fragmentary exploded perspective of part of the memory belt.
FIG. 22 is a fragmentary perspective of one of the solenoids located at the recording side of the memory belt to activate the memory pins thereof.
FIG. 23 is a plan view partially in section of two solenoids of the type shown in FIG. 22 illustrating the manner in which they act upon the memory pins.

FIGS. 24A, 24B, 24C, and 24D are operational views which illustrate the manner in which a solenoid of the type shown in FIG. 22 acts upon a pin of the memory belt.

Figure 25:
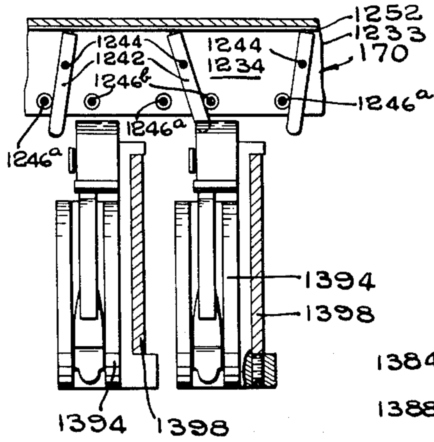

FIG. 25 is a plan view of two switches in their relation to pins of the memory belt.

FIGS. 26A, 26B, 26C and 26D are consecutive operational views illustrating the manner in which a switch of the type shown in FIG. 25 is actuated by pins of the memory belt.

Figure 8:
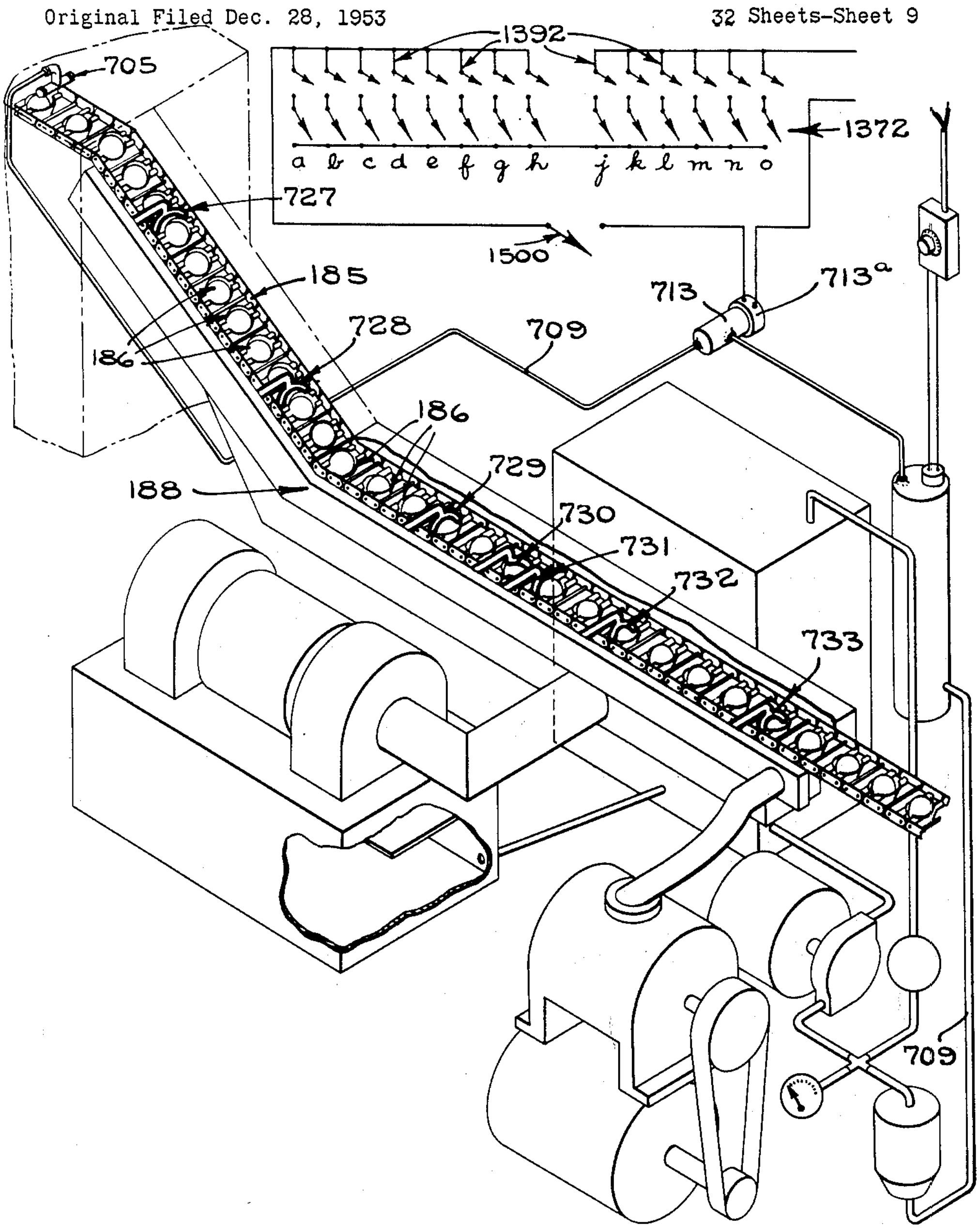
FIG. 8 is a schematic perspective of an oiling station through which a distributing conveyor carries eggs supported in its buckets.
Figure 27:
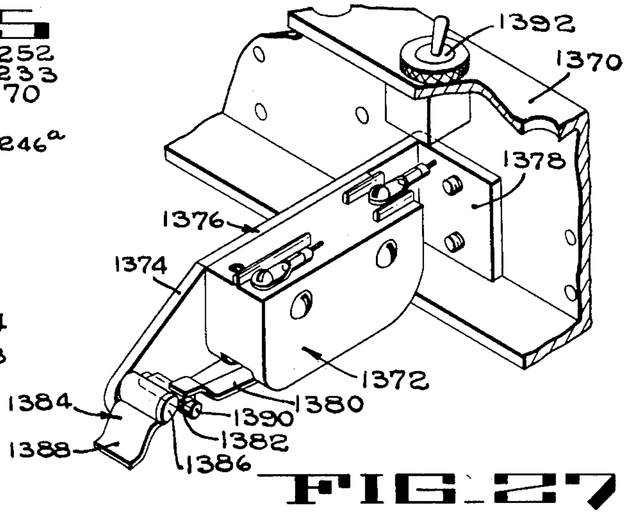
Figures 26A, 26B, 26C, 26D:
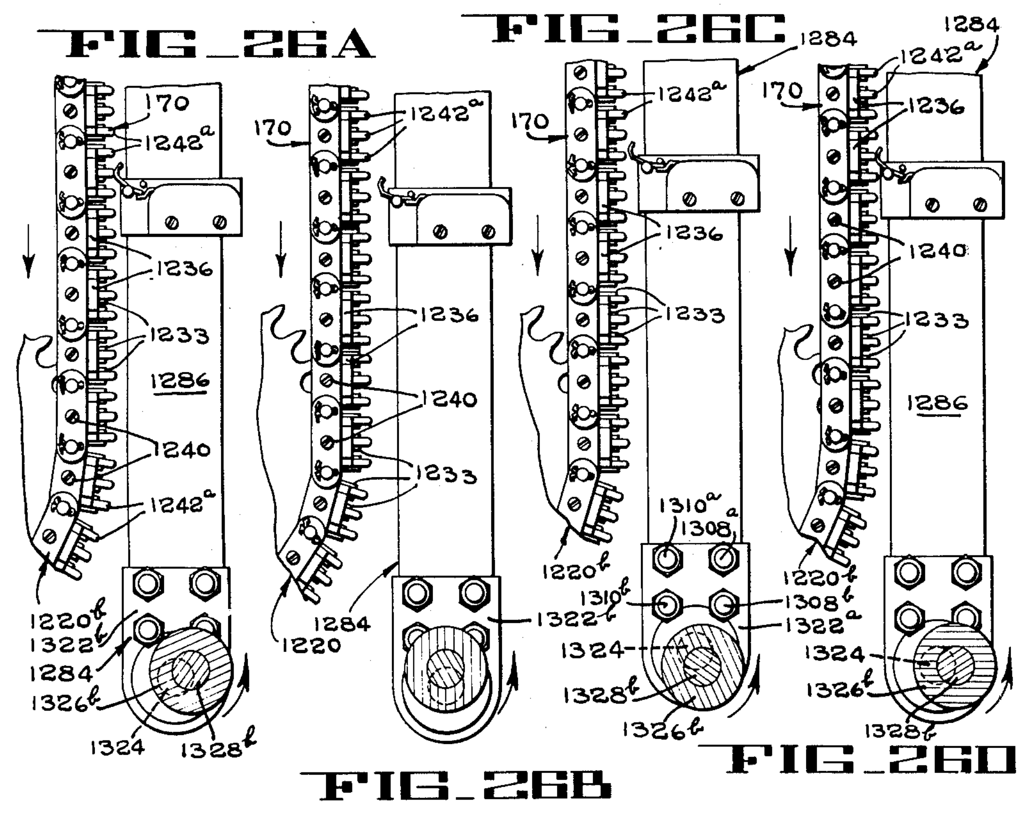

FIG. 27 is a perspective of another switch that is adapted for actuation by pins of the memory belt and which lies in the electrical control circuit of the oiling station illustrated in FIG. 8.

Figure 28:
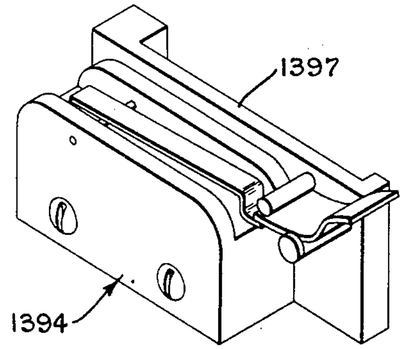

FIG. 28 is a perspective of another switch adapted for actuation by pins of the memory belt to initiate operations that result in the release of an egg from the distributing conveyor.

Figure 29:
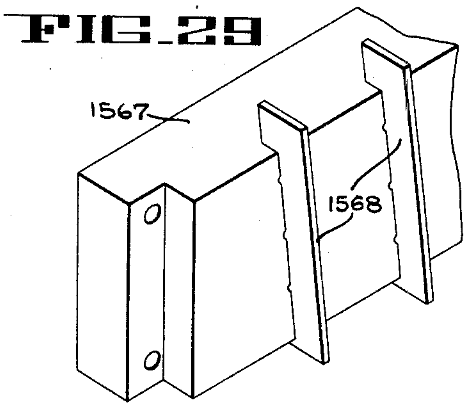

FIG. 29 is a fragmentary perspective of cams arranged to restore the memory pins to a neutral position.

Figure 30A:
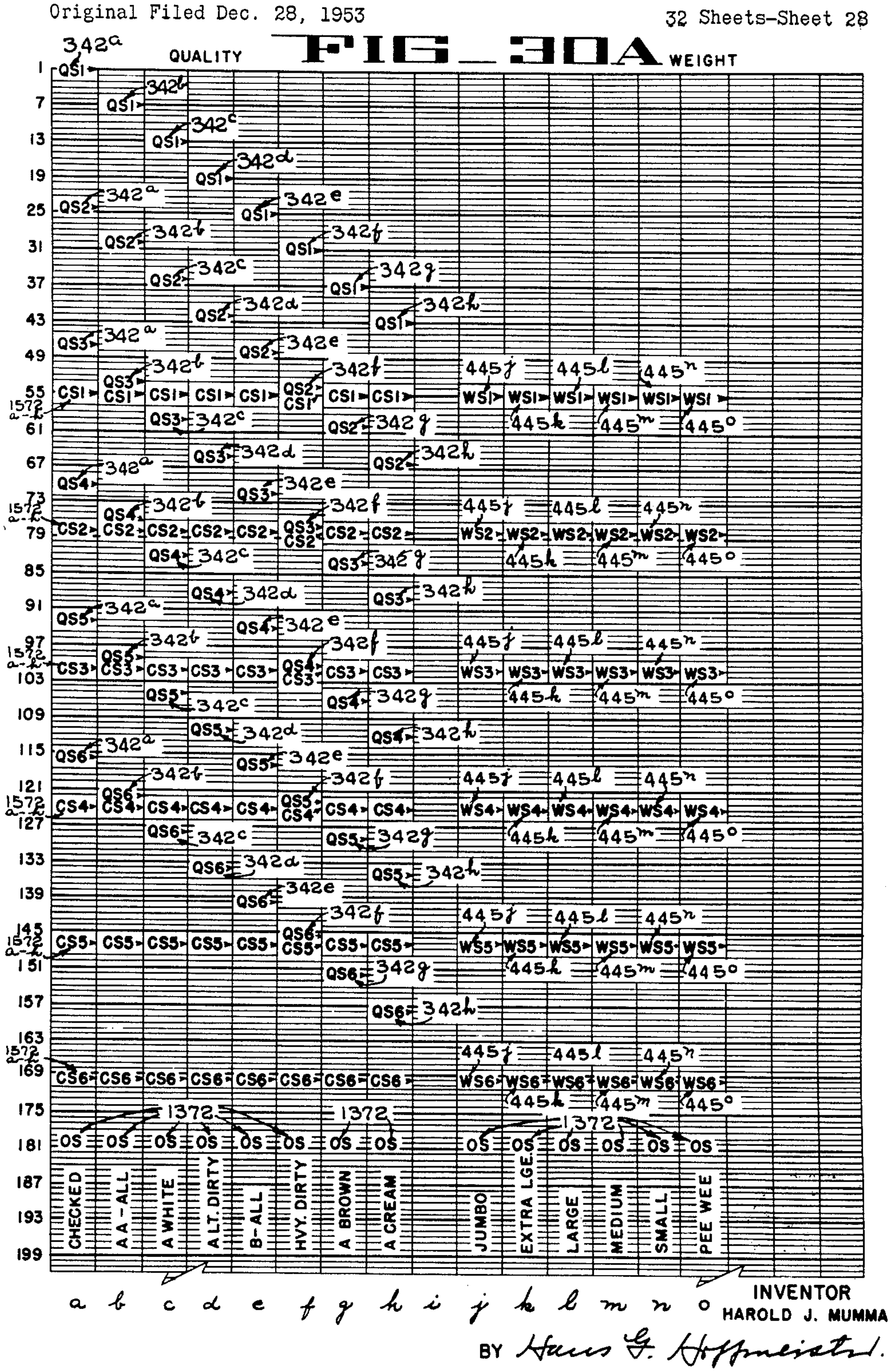
Figure 30B:
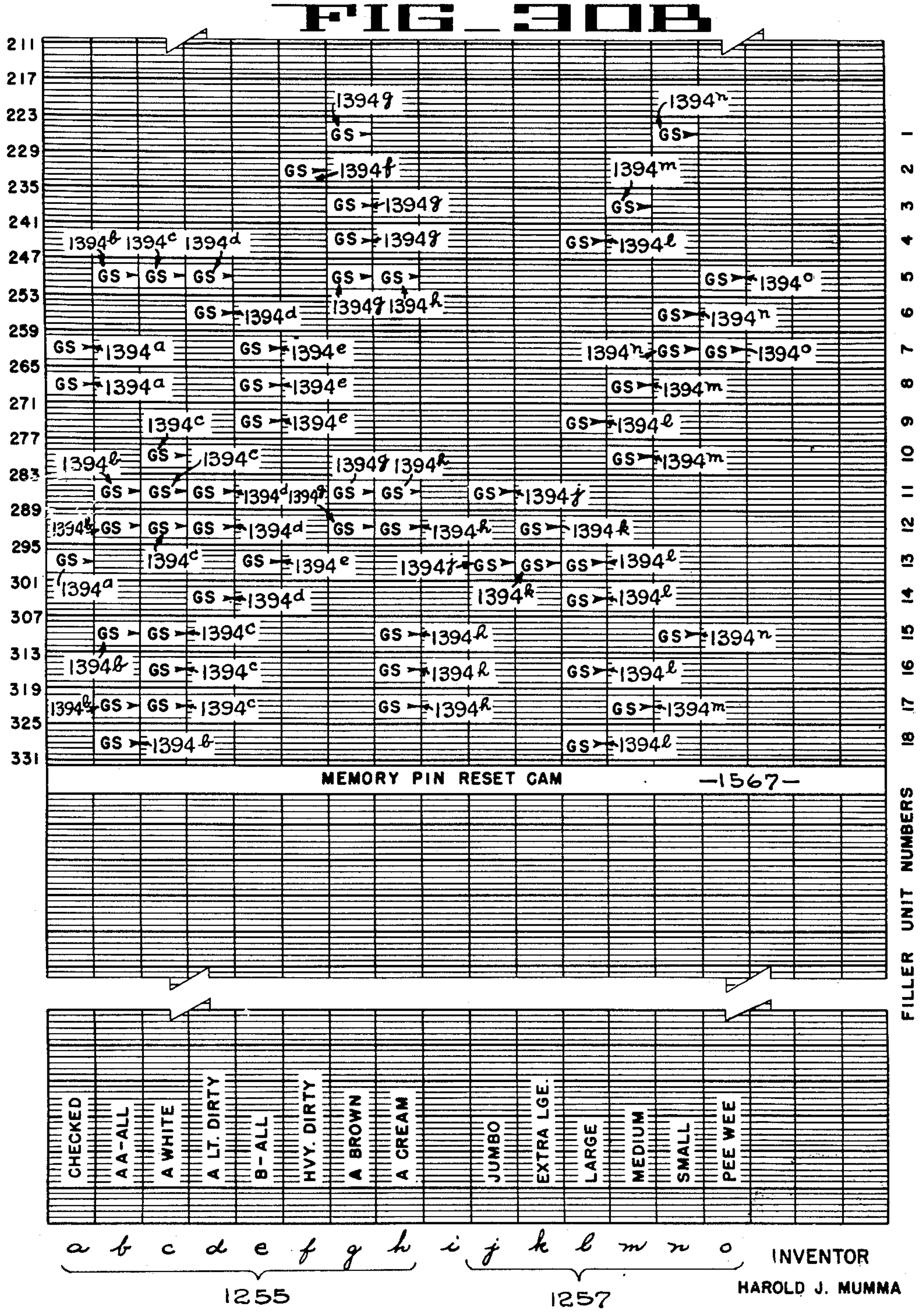

FIGS. 30A and 30B are the two consecutive halves of a diagrammatical development of the control structure surrounding the memory belt.

Figures 31, 32:
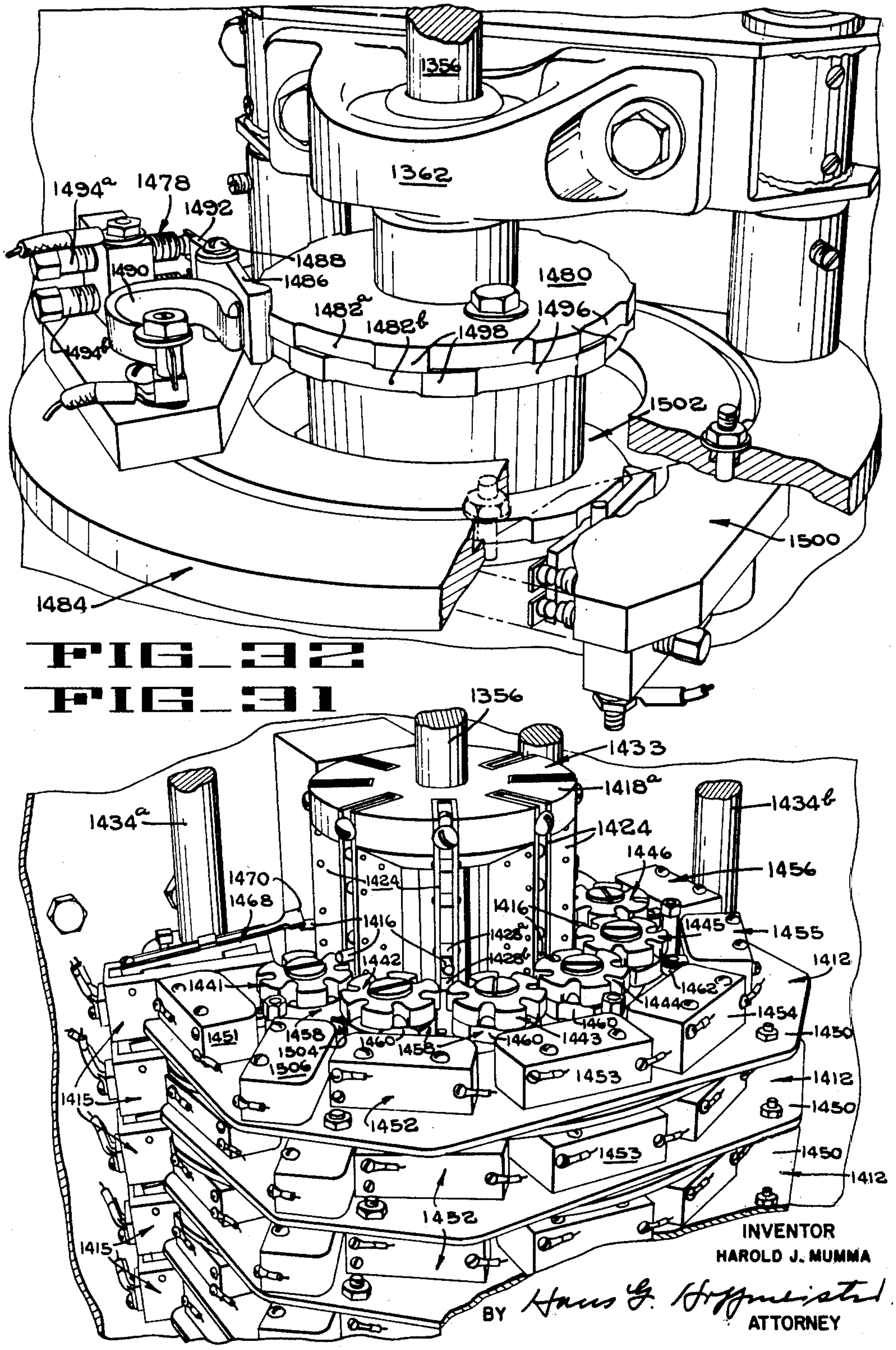

FIG. 31 is a fragmentary perspective of a secondary control mechanism which is associated with and is controlled from the memory belt and which determines the exact point of release of the eggs form the distributing conveyor.

FIG. 32 is a fragmentary perspective similar to FIG. 31 illustrating the bottom end of the mechanism shown in said FIG. 31.

Figure 19A:
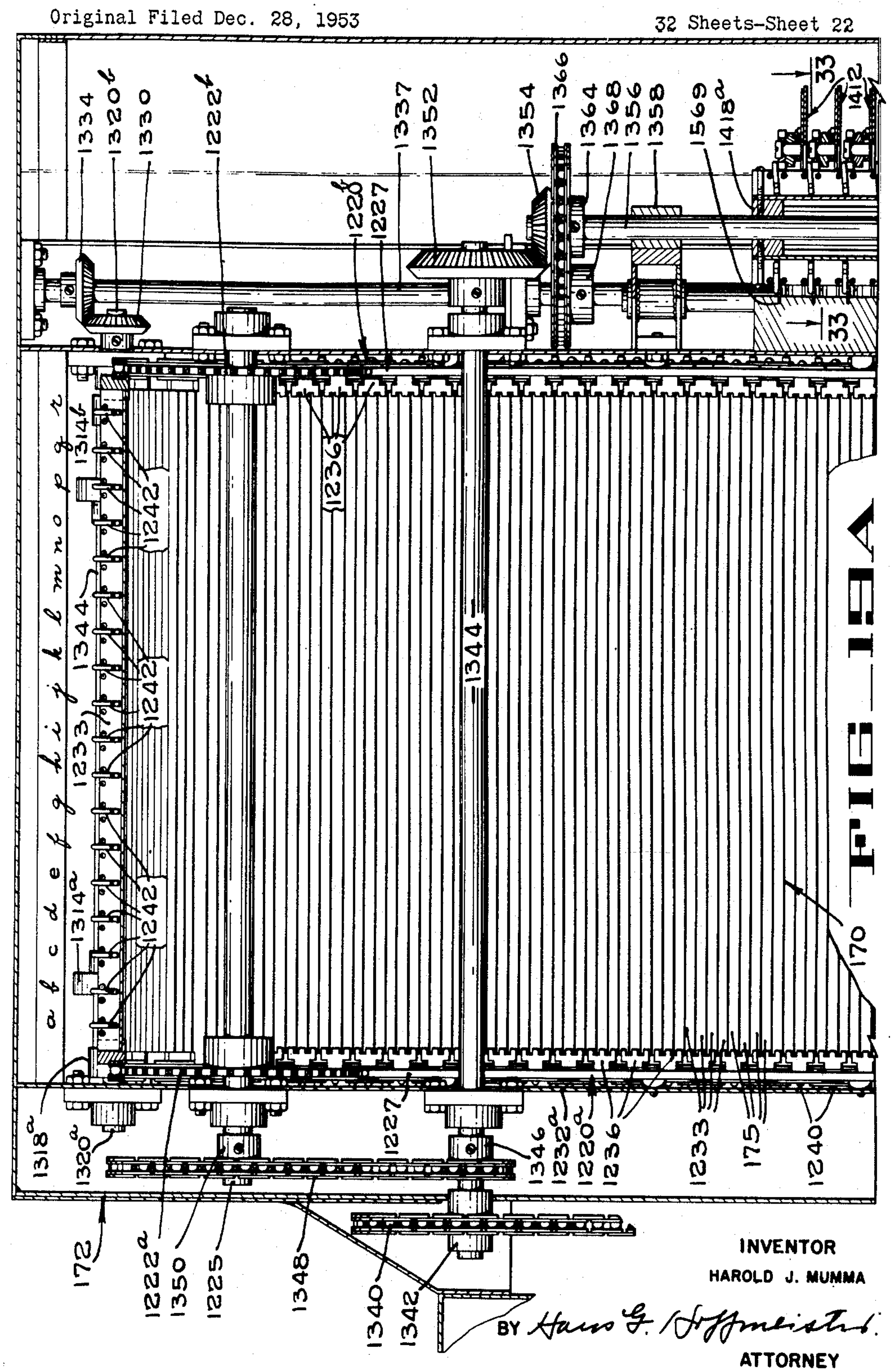
FIGS. 19A, 19B and 19C are the top, center and bottom portions, respectively, of an axial vertical section through the memory belt taken along line 19—19 of FIGS. 18A and 18B.
Figure 33:
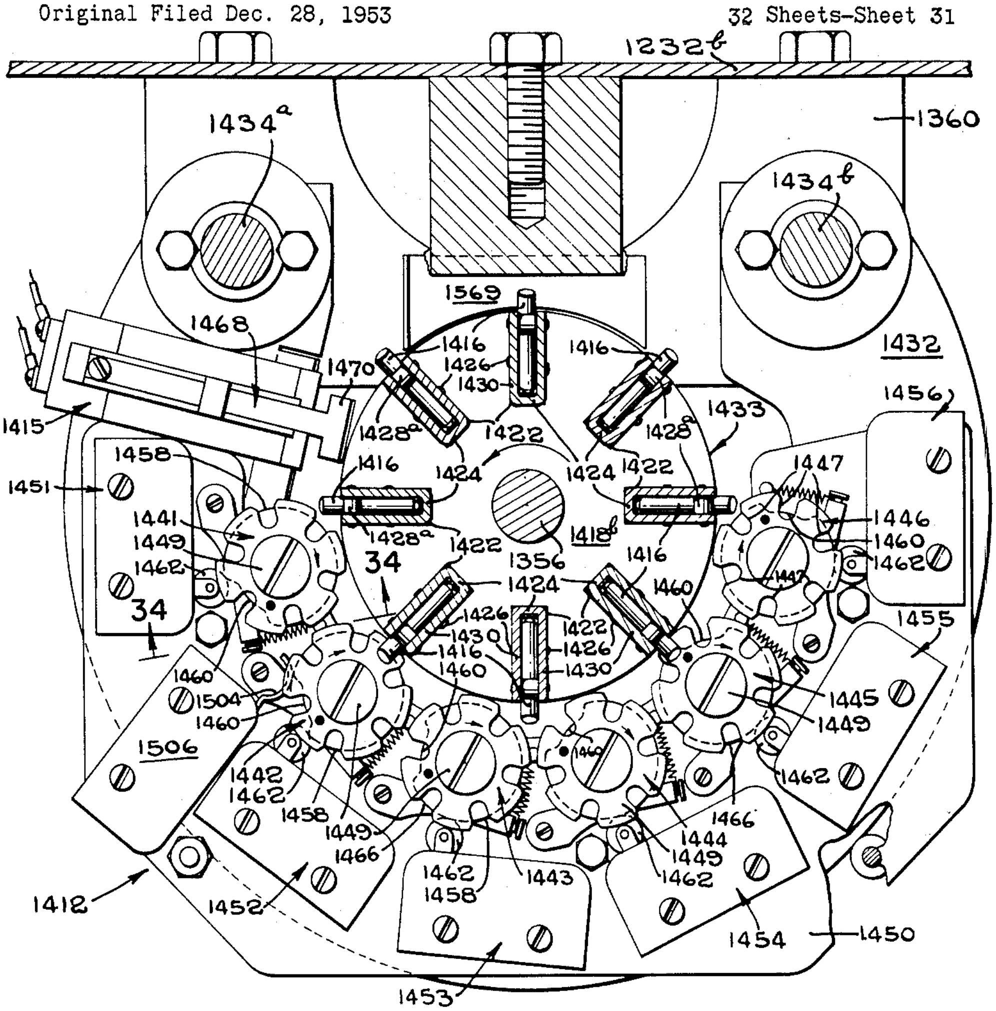

FIG. 33 is a horizontal section taken along line 33—33 of FIG. 19A.

Figures 34, 35:
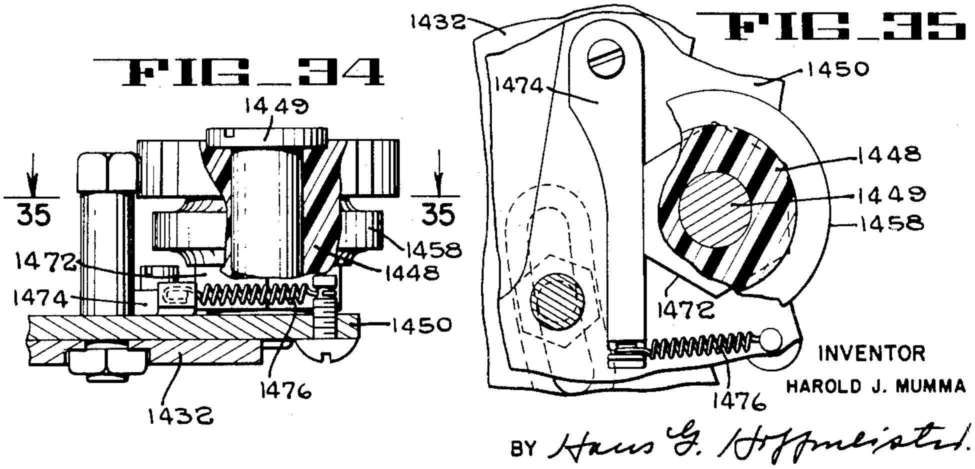

FIG. 34 is a fragmentary detail view illustrating a component part of the mechanism shown in FIGS. 31 and 33 as viewed in the direction of the arrows 34—34 shown in FIG. 33.

FIG. 35 is a fragmentary horizontal section through the mechanism shown in FIG. 34 taken along line 35—35 of FIG. 34.

FIGS. 36A, 36B, 36C, 36D, 36E, 36F, 36G, 36H are schematic views of the mechanism shown in FIG. 33 illustrating eight consecutive operational phases thereof.

Figure 1:
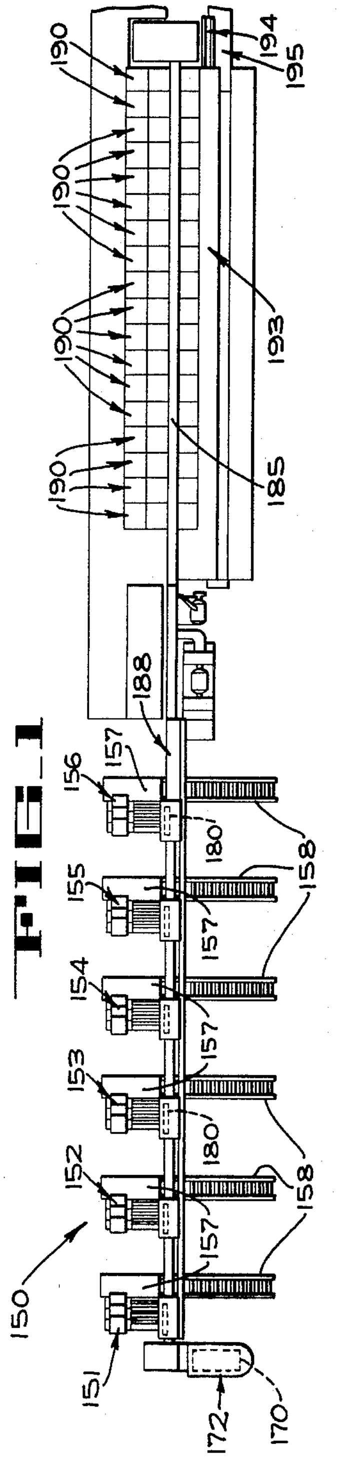
FIG. 1 is a schematic plan view of an egg handling machine incorporating therein the present invention.
Figure 2:
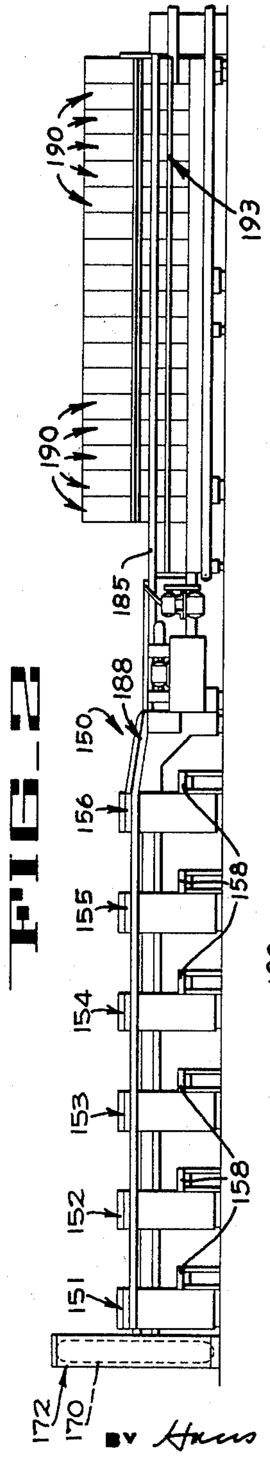
FIG. 2 is a schematic side elevation of the machine shown in FIG. 1.
Figure 3:
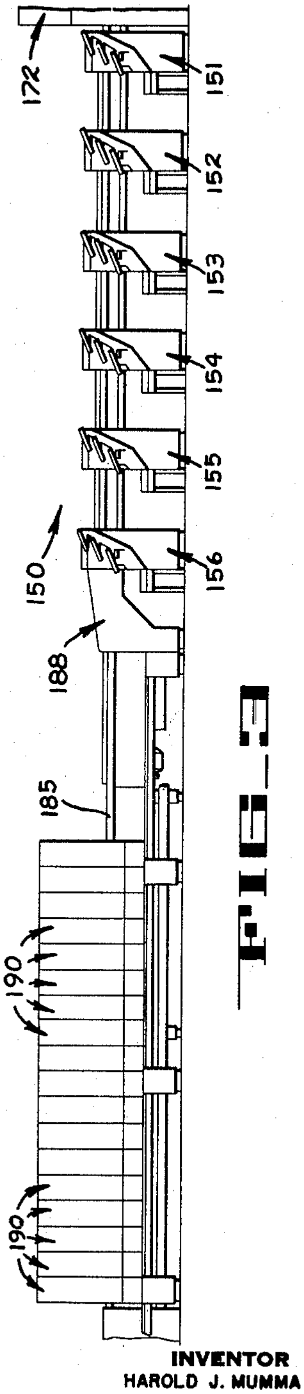
FIG. 3 is a schematic side elevation of the same machine viewed from the opposite side.
Figure 4:
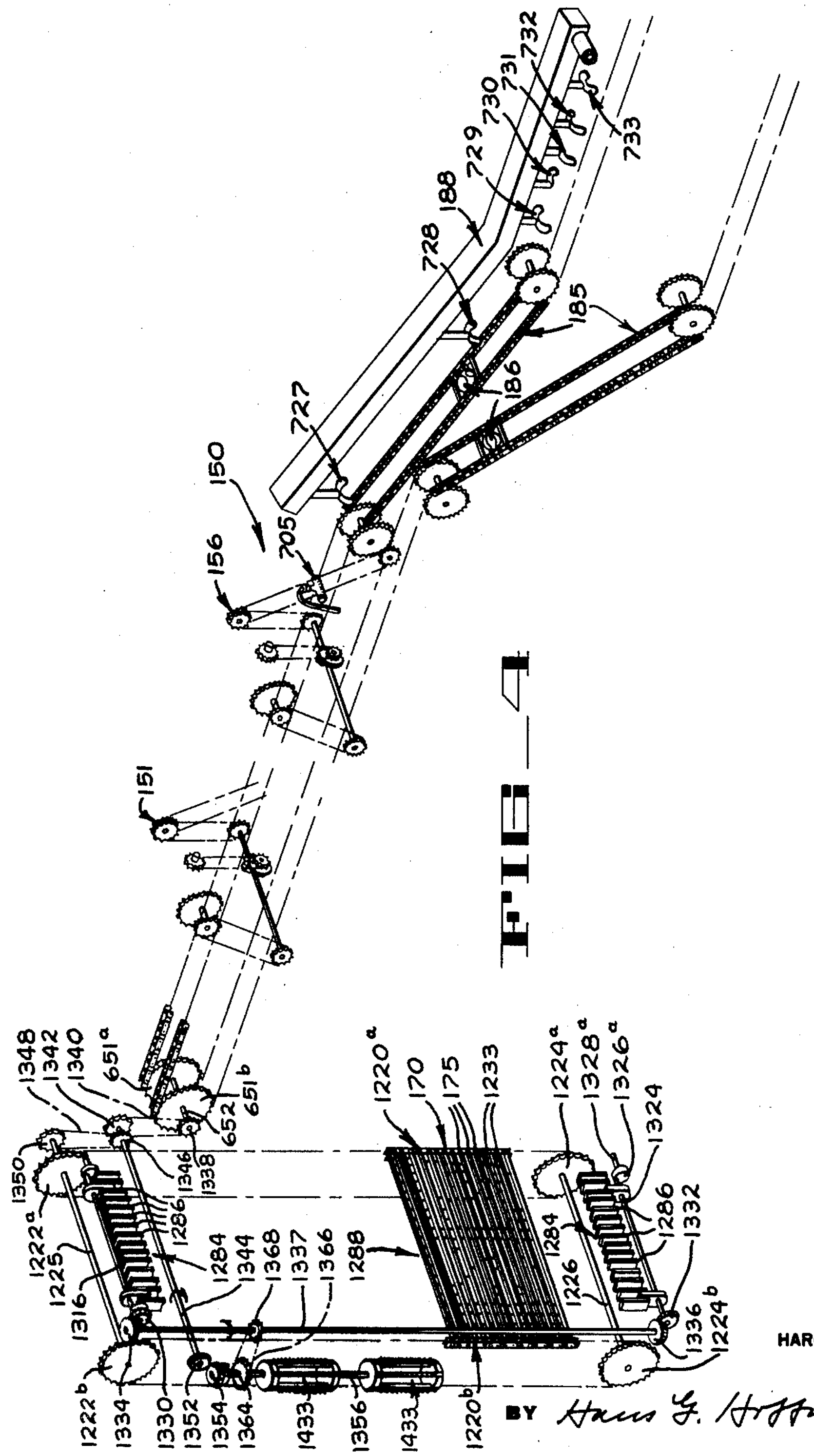
FIG. 4 is a fragmentary schematic perspective illustrating mechanical power trains included in the machine shown in FIG. 1.

In FIGS. 1, 2 and 3 is illustrated the egg handling machine, which comprises six candling stations 150 individually identified by the reference numerals 151, 152, 153, 154, 155 and 156. Every one of said stations is provided with a platform 157 upon which the candler receives cases or crates with eggs from an inclined roller conveyor 158. At every one of said stations, an operator examines the eggs for external appearance, views them against a torch 159 (FIG. 6) to determine their internal condition and places those found acceptable upon one of eight superposed feed racks or chutes 160, individually identified by the suffix letters *a*, *b*, *c*, *d*, *e*, *f*, *g*, and *h*, according to their individual quality, while depositing eggs that are broken, excessively dirty, or otherwise unfit for human consumption into cardboard containers (not shown) placed upon trays 162 that are supported in candelabrum fashion at the right end of the racks 160 as viewed in FIG. 6.

At each candling station, the eight superposed racks or chutes 160 are arranged to deliver eggs deposited thereinto onto cups 164 upon the rising run 166 (FIG. 6) of an elevator 168, and whenever an egg passes from the end of a rack or chute 160 into a cup 164, it actuates mechanism that registers the quality of the egg, as represented by the rack onto which it was deposited by the candler, upon a rotary control device 170 (FIG. 15) termed the memory belt that operates within a cabinet indicated at 172 in FIGS. 1, 2, 3 and 15. Said memory belt is divided into a multitude of consecutive horizontally extending strip-shaped sectors 175 (FIGS. 16A, 16B, 17A, 17B and 20), and every one of the cups 164 on the rising runs of the six elevators 168 comprised in the machine is represented by a sector 175 of the memory belt. The memory belt 170 turns in timed relation with the elevators 168, and when an egg passes from one of the eight racks 160 of a candling station onto a cup 164 of the particular elevator associated with said candling station, the hereinbefore mentioned registration mechanism sets an element supported upon the sector 175 of the memory belt that corresponds to the particular elevator cup, in a manner indicative of the quality as represented by the chute or rack from which the egg was delivered onto the cup.

Every one of the six elevators 168 is arranged to deliver the eggs it receives from its associated racks or chute 160 to a respective one of six weighing mechanisms collectively identified by the reference numeral 180 (FIGS. 1 and 7) upon which the eggs are weighed and which is arranged to activate mechanism that registers the weight group to which a particular egg belongs in the same sector 175 of the memory belt that previously recorded the quality of said egg.

From the weighing mechanism 180 of the six candling stations the eggs are delivered by means of a lowering mechanism 182 (FIG. 7) onto a common single file distributing conveyor 185 that carries an endless sequence of egg retaining buckets 186, and which operates at six times the speed of the elevators 168 and is timed in such a manner relative to said elevators and the associated weighing and egg lowering mechanisms that its consecutive buckets may carry away all eggs supplied from the six elevators by the egg lowering mechanisms 182 without danger that more than one egg may be deposited into one and the same bucket.

The conveyor 185 conducts the eggs through an oiling station 188 (FIGS. 1, 2, 4 and 8) wherein eggs of selected quality and weight combinations are subjected to an oil spray under control from the memory belt 170 to preserve their freshness. Thereafter said conveyor 185 extends over eighteen consecutive packing stations 190 (FIGS. 1, 2, 3 and 9) each provided with a container supply magazine 191 (FIGS. 9 and 10), and as it carries the eggs consecutively to said packing stations, it distributes eggs of the same preselected weight and quality combinations under control from the memory belt 170 at predetermined ones of said stations into suitable cardboard containers delivered by feed conveyors 192 (FIG. 10) from the magazines 191 into positions underneath the distributing conveyor, such that said containers will receive only eggs of the same preselected weight and quality group. After a cardboard container has been filled in the described manner with eggs of the same quality and weight group, it is discharged onto a take-off ramp 193 from where an attendant may transfer it onto a suitable take-off conveyor 194 or 195, depending on its size (FIG. 9), while means enter into operation that deliver a fresh cardboard container from the magazine 191 into egg receiving position below the distributing conveyor 185.

According to the present invention, the rotary control device 170 (FIG. 15) has the form of an endless belt and which may conveniently be termed the memory belt. The peripheral surface of said belt is subdivided into a multitude of strip-shaped consecutive sectors 175 to represent every egg delivered onto any one of the six elevators 168 at the candling stations 150 (FIG. 6) from the moment it passes from one of the feed racks 160 onto an elevator cup 164 until it approaches a selected packing station 190 along the terminal run of the distributing conveyor 185. Whenever an egg passes from a feed rack 160 at a candling station 150, its quality as indicated by the rack upon which it was placed by the candler is recorded upon the sector 175 of the memory belt that corresponds to the particular elevator cup at the moment. Said sector continues to represent the particular egg as it passes from the elevator over the weighing mechanism 180 (FIG. 7) onto the distributing conveyor 185 and as it travels along the upper run of said distributing conveyor, and records the weight of the egg at a sector of its rotary orbit that corresponds to the location of the weighing mechanism, and initiates release of the eggs from the distributing conveyor at a sector of its rotary orbit that corresponds to the location of a selected one of the eighteen packing stations 190 (FIG. 9) where eggs of its particular quality and weight are to be gathered into a common carton or cardboard grid. It will be understood, therefore, that the memory belt 170 must turn in timed relation with the elevators 168, the weighing mechanisms 180, and the distributing conveyor 185, with initial sectors of its rotary orbit corresponding to the locations of the elevator cups 164 adjacent the feed racks 160 and the weighing stations 180, intermediate sectors of its rotary orbit corresponding to the oiling station 188 (FIG. 8), and terminal sectors of its rotary orbit corresponding to the eighteen packing stations associated with the terminal run of the distributing conveyor 185.

Figure 21:
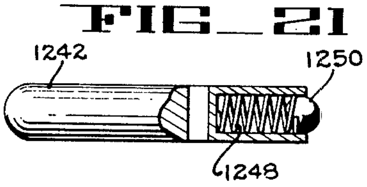
FIG. 21 is a side elevation, partly in section, of a recording pin forming part of the memory belt and hereinafter to be referred to as a memory pin.

Having reference to FIGS. 18A, 18B, 19A, 19B and 19C, the memory belt comprises a pair of transversely spaced, vertically disposed endless sprocket chains 1220*a* and 1220*b* trained about an upper and a lower pair of sprockets 1222*a*, 1222*b* and 1224*a*, 1224*b*, respectively, that are mounted upon common transverse shafts 1225 and 1226. The individual vertical runs of said chains extend between vertical guide bars 1227, 1228 and 1229, 1230, respectively (FIG. 18B), that are suitably supported from the opposite side panels 1232*a* and 1232*b* (FIG. 19B) of the hereinbefore mentioned cabinet 172. Both the shafts 1225 and 1226 are rotatably mounted in said side panels 1232*a* and 1232*b*, and supported from and between the parallel sprocket chains is an endless sequence of numerous narrow U-shaped channels 1233, the open ends of which face outwardly. These channels represent the hereinbefore mentioned quality and weight recording sectors 175 of the memory belt. In the particular embodiment of the invention illustrated in the accompanying drawings, said channels 1233 are combined into packages of three superposed channels each, in that the ends of their adjacent side flanges 1234 are detachably received in the interstitial spaces of mounting blocks 1236 of a cross-section resembling a trident, as best shown in FIG. 20. Said blocks in turn are firmly secured to the inner links 1238*a* and 1238*b*, respectively, of the sprocket chains 1220*a* and 1220*b* at the center points thereof, such as by means of threaded bolts 1240. From the interior of each of the U-shaped channels 1233 project eighteen equi-spaced pins 1242 extending past the peripheral surface of the memory belt as established by the outer edges of said U-shaped channels, with the pins of consecutive channels aligned in a direction longitudinally of the memory belt to form eighteen parallel endless rows 1243. Said pins may be made from metal or a durable plastic such as nylon. Within the channels 1233 the superposed pins 1242 of every three channels that are combined into a bundle are rotatably supported upon a common pivot 1244, and at either side of each pin is provided a stud 1246*a* and 1246*b*, respectively, that is mounted in the side flanges 1234 of the U-shaped channels near the outer edges thereof. The studs 1246*a* and 1246*b* limit the rotary movement of each pin 1242 upon its pivot 1244 from a position wherein its outwardly projecting end leans against the left stud 1246*b* to a position wherein said end leans against the right stud 1246*a*, both said positions being illustrated in FIGS. 20 and 23. To yieldably maintain the pins 1242 in either of the described positions, their inner ends are preferably of tubular construction as shown in FIG. 21 and contain a coil spring 1248 that urges a spherical bead 1250 out of said pin and into engagement with a wear strip 1252 which covers the bottom of each of the U-shaped channels 1233 as best shown in FIGS. 20 and 23.

Figure 6:
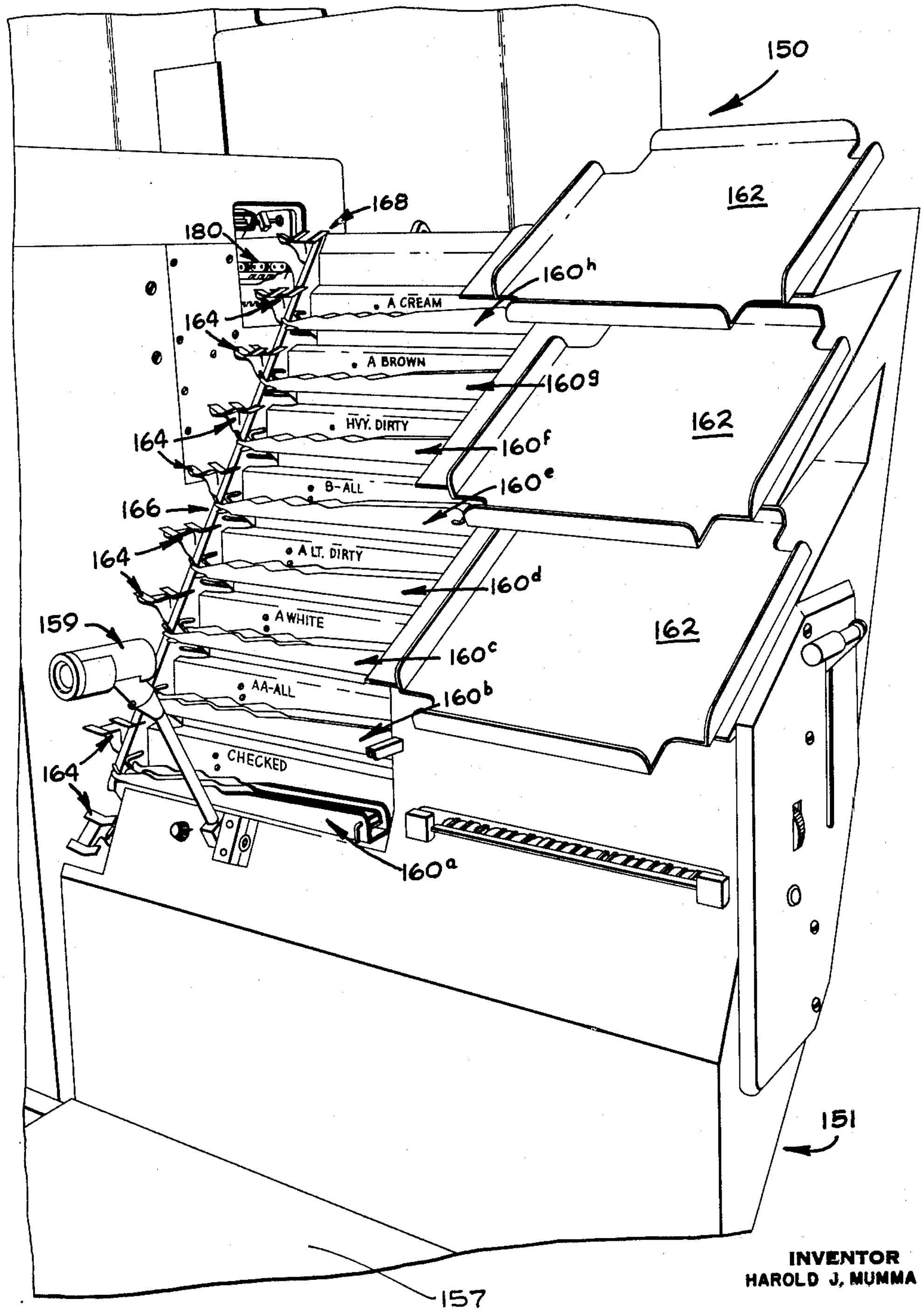
FIG. 6 is a perspective of one of the candling stations comprised in the machine shown in FIG. 1.

As pointed out hereinbefore, the U-shaped channel bars 1233 correspond to the initially discussed quality and weight recording sectors 175 of the memory belt, with every egg on its way through the machine represented by one of said bars, and the eighteen pins 1242 that are pivotally mounted in each of the channels 1233 provide the means for recording the quality and weight of each egg represented by a particular channel. In the embodiment of the invention illustrated in the accompanying drawings, the first eight pins 1242 of each bar counted from the left of FIGS. 16A and 16B which are individually identified by the suffix letters *a, b, c, d, e, f, g* and *h*, are employed to represent the eight different quality grades into which the candlers separate the eggs at the candling stations, i.e., the left-most row of pins 1243*a* corresponds to the lowest rack of the candling stations, upon which the candlers place eggs classed as "Checks," as indicated in FIG. 6, and the eighth row of pins 1243*h* corresponds to the highest rack at each candling station upon which the candlers place all eggs of A Cream quality. Furthermore, in the particular embodiment of the invention illustrated in the accompanying drawings, the pins from the tenth to the fifteenth row of pins, which are individually identified by the suffix letters *j, k, l, m, n,* and *o*, respectively, are employed to represent the six different weight ranges between which the weighing mechanisms 180 (FIGS. 1 and 7) are arranged to distinguish, with the pins 1242*j* in the tenth pin row 1243*j* corresponding to the heaviest weight range, termed "Jumbos" and the pins 1242*o* in the fifteenth pin row 1243*o* corresponding to the lightest weight range, termed "Peewees." In the exemplary performance of the machine to be described in greater detail hereinafter, the remaining rows of pins, namely, the ninth, sixteenth, seventeenth and eighteenth row of pins, individually identified by the suffix letters *i, p, q* and *r*, respectively, remain idle. It will be understood, however, that they may be employed to represent additional weight ranges and/or quality grades if it should be desired to distinguish between more than six weight ranges and/or more than eight quality grades.

Figure 5A:
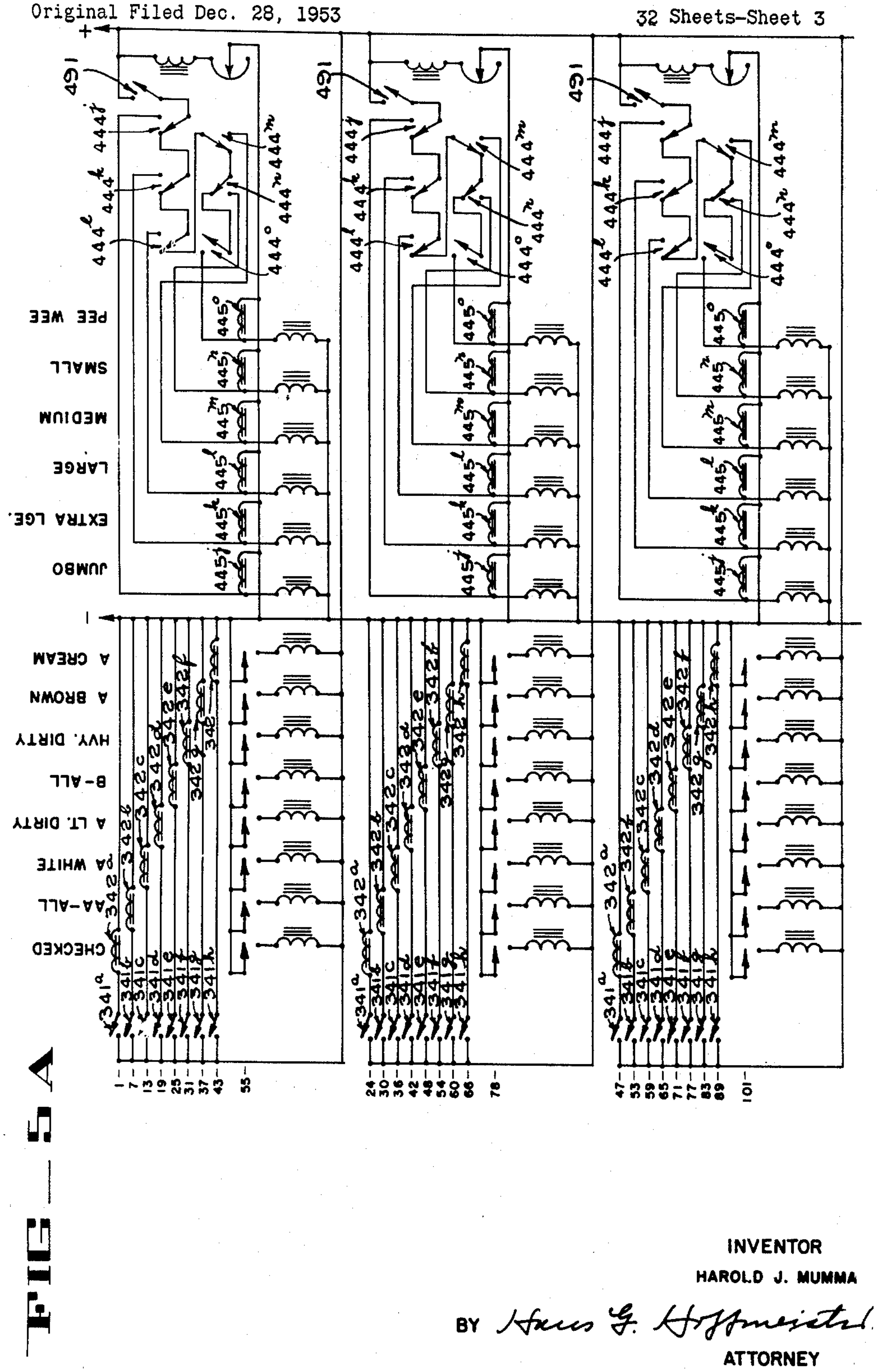
FIGS. 5A, 5B, 5C and 5D are consecutive parts of the electrical circuit diagram of the machine illustrated in FIGS. 1, 2 and 3.
Figure 5B:
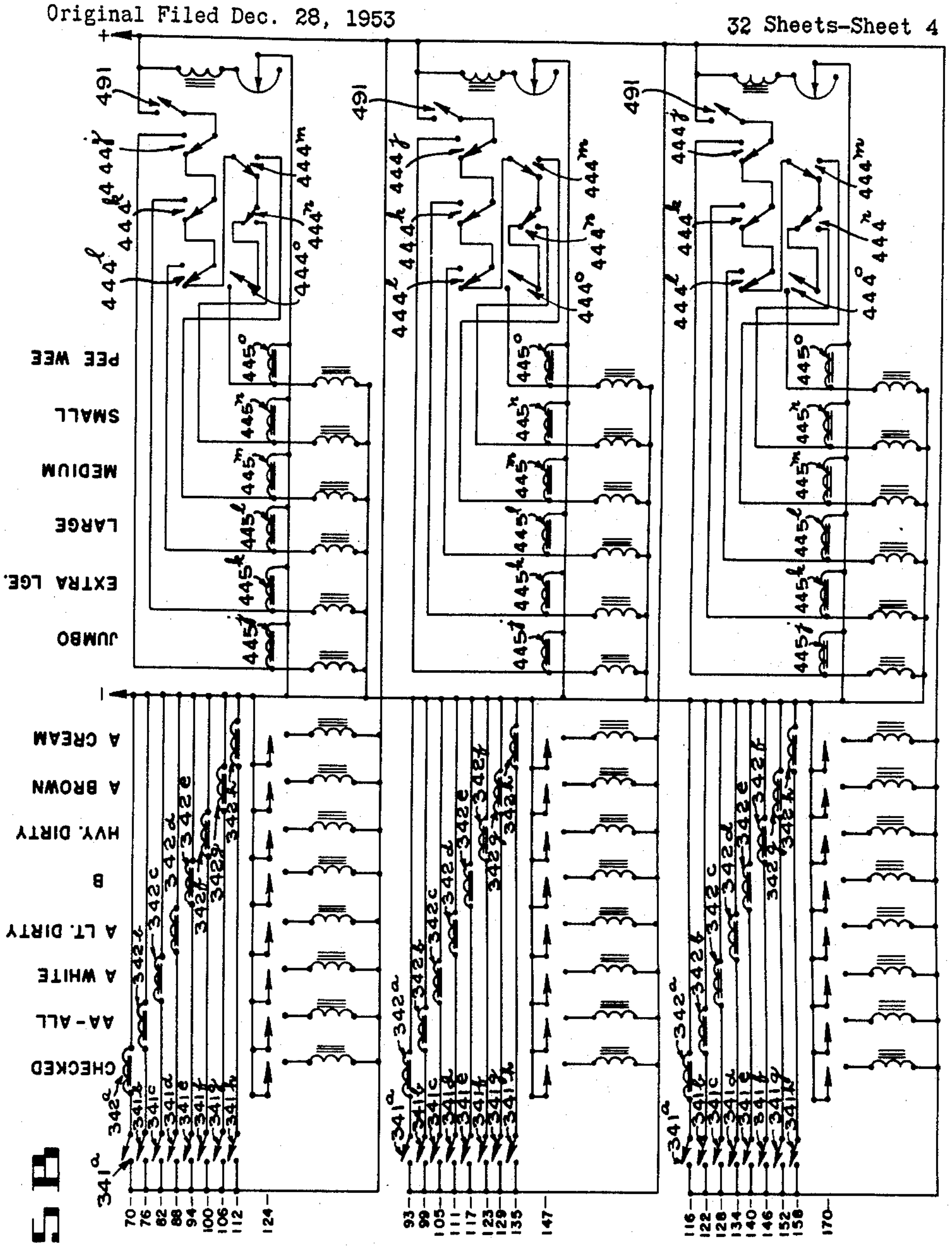
Figure 9:
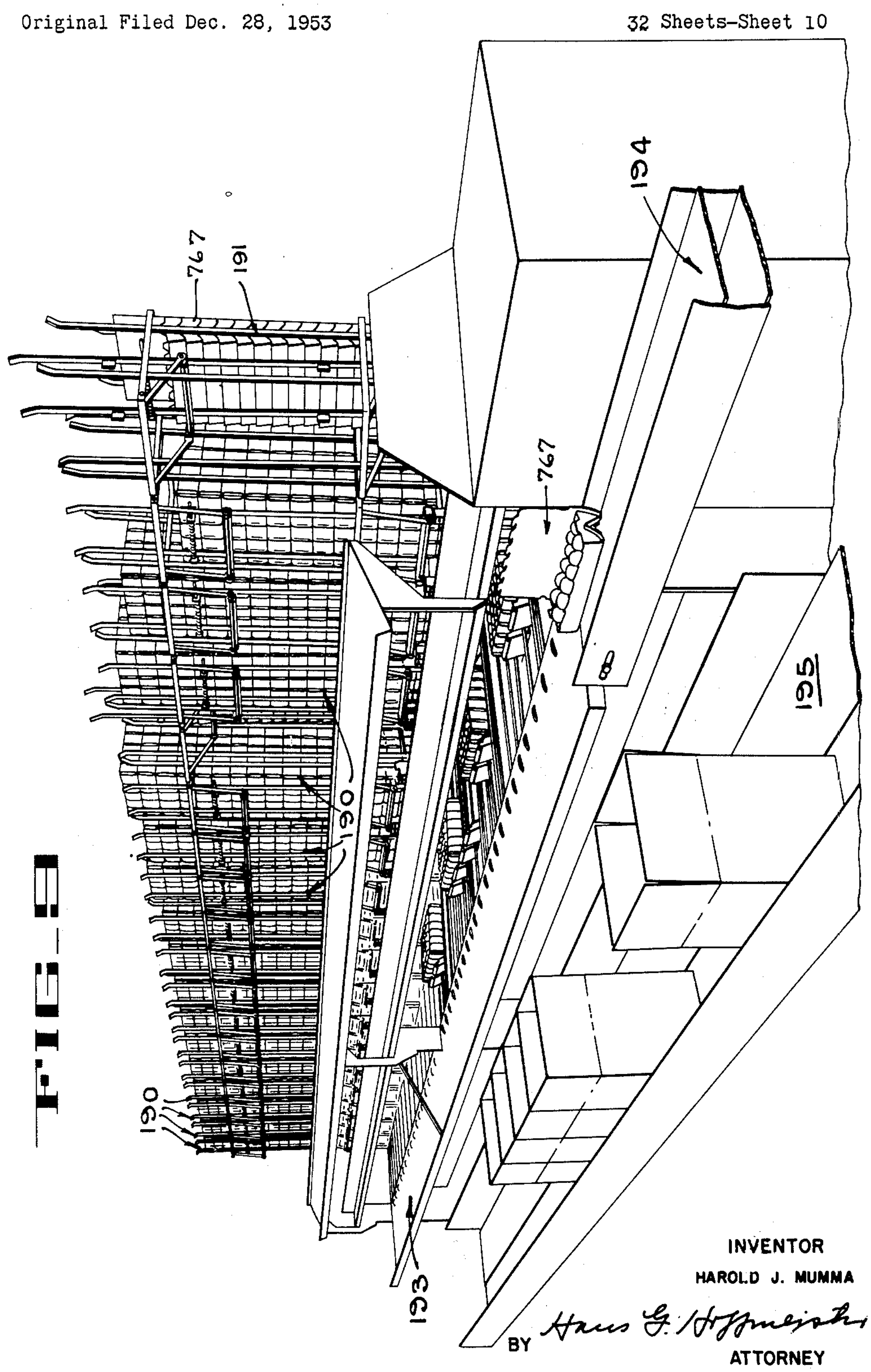
FIG. 9 is a perspective of eighteen packing stations associated with the terminal run of the distributing conveyor.
Figure 10:
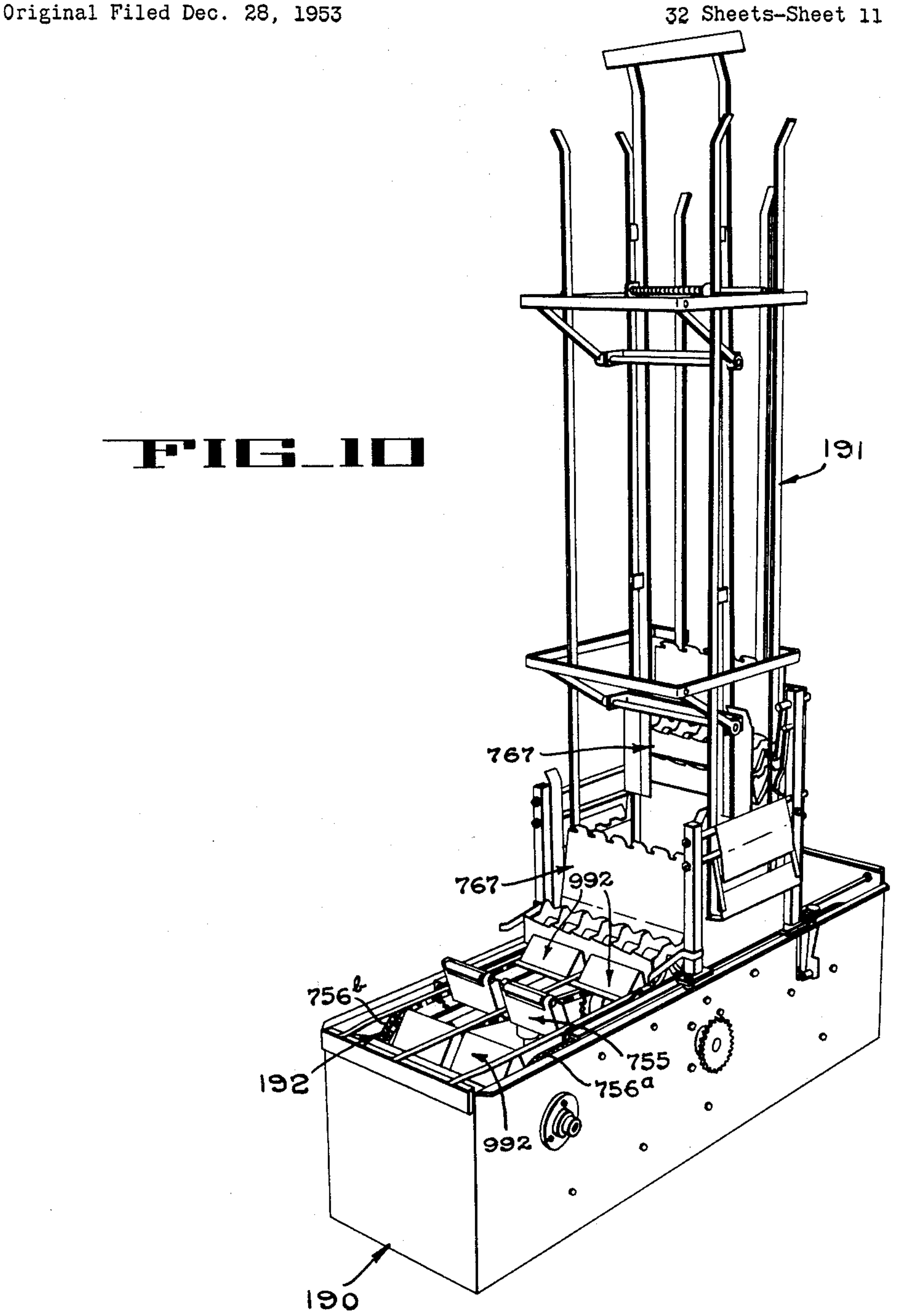
FIG. 10 is a perspective of one of said packing stations.
Figure 14:
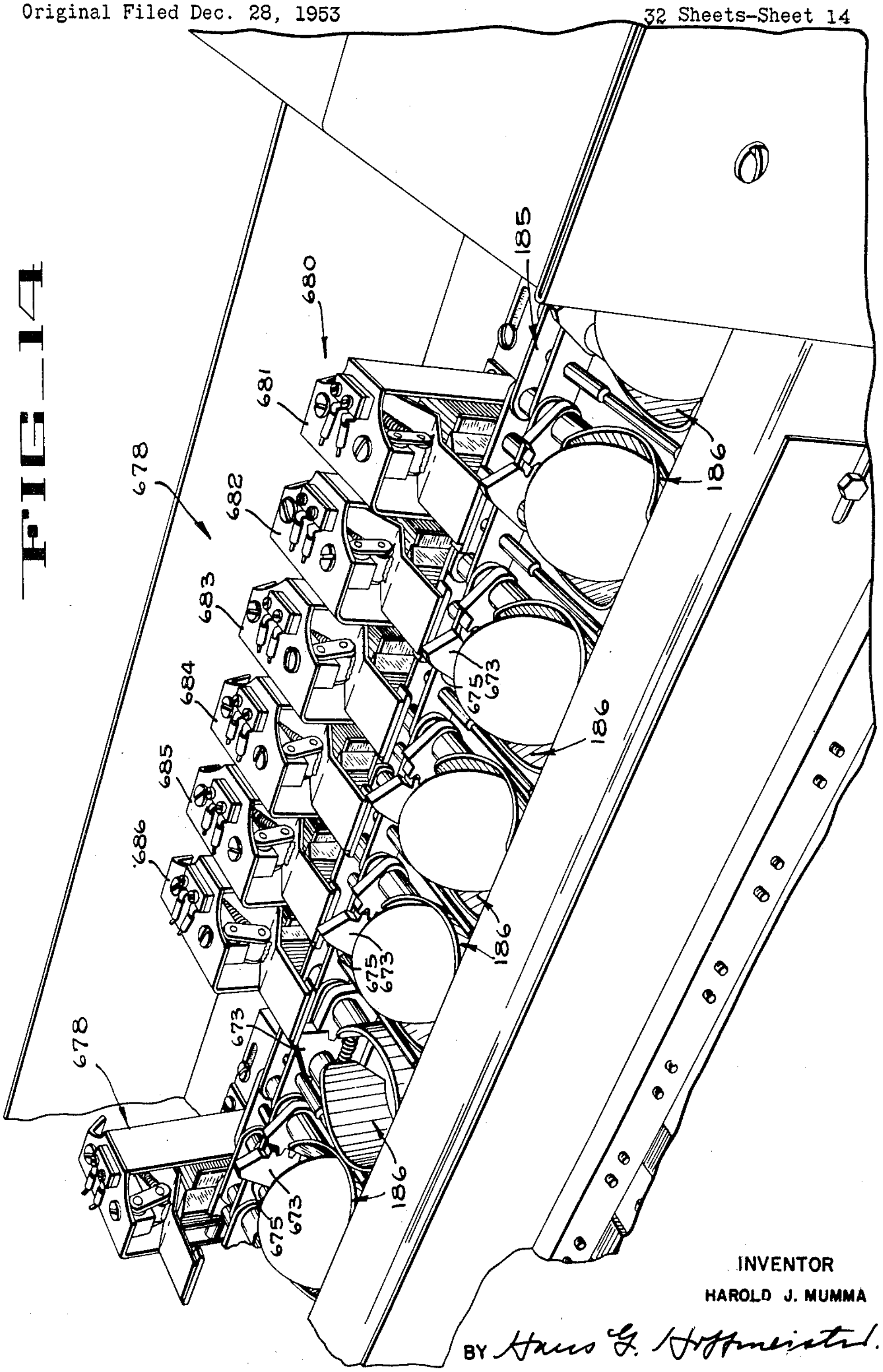
FIG. 14 is a perspective of a battery of six egg release solenoids provided along the distributing conveyor at each of the eighteen packing stations.

Having again reference to FIGS. 20 and 23, when tilted to the left as viewed in said figures, the pins 1242 are in neutral or ineffective position. When shifted to the right, however, they assume a position in which they are adapted to close switches 1255 and 1257, respectively (FIGS. 5C and 5D) which upon closure operate to cause appropriately timed energization of predetermined ones of bucket opening solenoids 680 (FIG. 14) associated with the packing stations 190 (FIG. 9). To shift the quality and weight-recording memory pins 1242*a* to 1242*h* and 1242*j* to 1242*o*, respectively, from neutral to effective position, solenoids 342*a* to 342*h* and 445*j* to 445*o* (FIGS. 5A and 5B) are provided adjacent the memory belt in sectors of its rotary orbit corresponding to the eight feed racks 160*a* to 160*h* and six weight recording switches 444*j* to 444*o* (FIGS. 5A and 5B) of every one of the six candling stations 150 comprised in the machine of the invention. When energized said solenoids operate to shift a pin, in whatever channel 1233 passes by at the moment, corresponding to the quality represented by a particular feed rack 160, and another pin indicative of the result of a particular weighing operation, from its leftwardly tilted neutral position to its rightwardly tilted effective position.

The solenoids 342 and 445 may be of any suitable construction and may comprise a coil 1262 disposed in spaced relation about the center bar 1264 of an E-shaped armature 1266 that is pivotally supported at its lower horizontal bar 1268 from the opposite side walls 1270*a* and 1270*b* of a shell 1272 by means of a pivot pin 1274 (FIGS. 22 and 23). Said shell 1272 encases the coil 1262 and part of the armature 1266, but the rear bar 1276 of each E-shaped armature 1266 is arranged to project through an elongated slot 1278 provided in a side wall 1280 of said shell. At its free end, the rear bar 1276 of the E-shaped armature 1266 carries an arched actuating lug 1282 adapted to engage the projecting ends of the memory pins 1242.

To mount the solenoids 342 and 445 in their proper positions relative to the weight and quality recording pins 1242 of the memory belt 170, a grid 1284 (FIGS. 24A–24D) of eighteen vertical bars 1286, one for each of the endless pin rows 1243*a* to 1243*r* of the memory belt, is provided along the descending run 1288 of said belt which is the run that faces the candling and packing stations in the particular embodiment of the invention illustrated in the accompanying drawings. The solenoids 342 and 445 are fastened to said bars 1286 in a horizontal position by means of a hook 1290 (FIGS. 22 and 23) that is provided at the inner end of their shells 1272 and which is engaged over the inner edge of a bar 1286, and by a laterally projecting shoulder 1292 formed on the opposite end of the shell, which is engaged over the outer edge of the bar 1286 and held in place by a setscrew 1294, as best shown in FIG. 23. A spring 1296 interposed between the free end of the outer horizontal bar 1268 of the E-shaped armature 1266 and the adjacent floor 1298 of the shell 1272 maintains the armature in the outwardly swung position illustrated at the left side of FIG. 23 wherein its actuating lug 1282 travels leftwardly clear of the pins 1242 of a pin row 1243. Upon energization of the coil 1262, however, the center bar 1264 of the armature 1266 is briefly pulled deeper into the interior of said coil against the force of spring 1296. This swings its actuating lug 1282 in clockwise direction as viewed in FIG. 23 into the position shown at the right side of said FIG. 23 wherein it is effective to shift a memory pin that may pass it at the moment into its rightwardly tilted effective position.

In the embodiment of the invention illustrated in the accompanying drawings, the distributing conveyor 185 (FIG. 7) has to handle eggs supplied from six consecutive candling stations 151 to 156, respectively. To be able to receive an uninterrupted supply of eggs from said six candling stations (FIG. 6) without danger that more than one egg may be delivered into individual buckets thereof, the distributing conveyor 185 must be arranged to advance at six times the speed of the feed elevators 168 and their associated weighing and lowering mechanisms 180 and 182, respectively. Therefore, upon delivery of an egg from a particular lowering mechanism into a bucket 186 on the distributing conveyor 185, five buckets on said distributing conveyor will pass said lowering mechanism before said particular lowering mechanism is again in a position to deliver another egg to the distributing conveyor, which egg is then received into the sixth pocket following the particular bucket that received the first egg from the lowerator. This means that eggs from a particular candling station will drop only into every sixth bucket of the distributing conveyor with the intermediate five buckets remaining free to receive eggs from the succeeding five candling stations. From the above, it will be understood that the succeeding candling stations are arranged at a distance from each other that is smaller or larger by one bucket than a multiple of six buckets such that the bucket following directly behind the bucket that received an egg from the first candling station can only receive an egg from the second candling station, and the third candling station can deliver its eggs only into the second buckets following behind the buckets that receive eggs from the first candling station, and so on, with the fifth buckets behind the buckets for the first candling station arranged to receive eggs from the sixth candling station. In this manner, the distributing conveyor 185 may at all times receive the total output of all six candling stations even if their elevators operate at full capacity, and there is no possibility that more than one egg is delivered into a particular bucket. Accordingly, on the memory belt 170 the eggs supplied from a particular candling station are represented by channels 1233 spaced apart by a distance equal to five channels. In other words, if a first egg traveling on the feed elevator 168 of a candling station is represented by a first channel on the memory belt which may be termed channel #1, an egg in a directly succeeding cup 164 of said feed elevator is represented on the memory belt by the sixth channel trailing behind said first-mentioned channel, which would be channel #7, with the intermediate five channels intended to represent eggs that may be delivered onto the distributing conveyor from the remaining five candling stations. All the buckets carried by the distributing conveyor may, therefore, be regarded as forming consecutive groups of six consecutive buckets each, with the first bucket of each of said group intended to receive eggs from the first candling station, the second bucket of each of said groups intended to receive eggs from the second candling station, and so on. Accordingly, the memory belt may likewise be regarded as being comprised of consecutive groups of six consecutive channels 1233 each, with the first channel in each of said groups serving to represent an egg placed upon the first feed elevator and the second, third, fourth, fifth, and sixth channels of each group intended to represent eggs delivered onto the feed elevators of the second, third, fourth, fifth and sixth candling stations, respectively, in the order named.

Assuming that an egg graded as "Checked" is delivered from the lowest rack 160*a* of the first candling station onto the feed elevator 168 of said candling station, and in passing from said rack onto an aligned cup 164 of the feed elevator actuates switch arms 347, 349 (FIG. 7) at the discharge end of said rack which closes briefly the switch 341*a* (FIGS. 5A and 5B) associated with said rack, closure of said switch should be arranged to energize briefly a solenoid 342*a* that is located adjacent the pin row 1243*a* in a sector of the rotary memory belt orbit through which passes at this moment the particular channel 1233 that is to represent said egg all along its journey through the machine. Accordingly, such a solenoid 342*a* is carried by the left-most mounting bar 1286 near its upper end (FIG. 16A) adjacent a sector of the rotary memory belt orbit that is identified by the number 1 in FIG. 30A, which represents diagrammatically a development of the structures that accompany the peripheral surface of the memory belt along the descending run thereof.

Figure 16A:
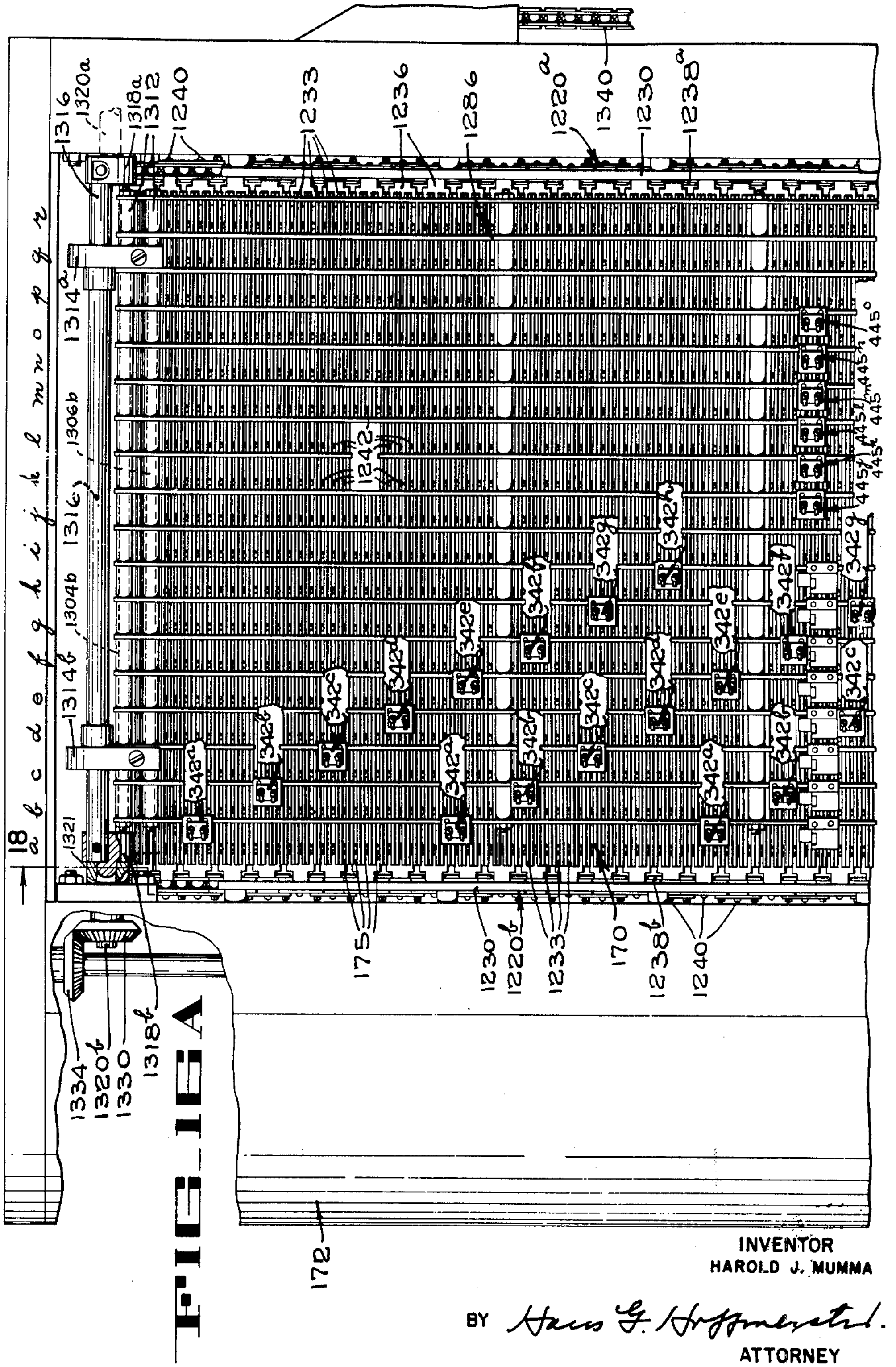
FIGS. 16A and 16B are upper and lower portions, respectively, of an elevational view of the memory belt taken at the quality and weight recording side thereof.

Let it now be assumed, however, that the particular elevator cup 164 which corresponds to the memory belt channel 1233 here under consideration did not receive an egg from the lowest rack 160*a*, but receives an egg from the next higher rack 160*b* upon which are placed all eggs of AA quality. In such a case, closure of the switch 341*b* associated with the second lowest rack 160*b* of the first candling station must be arranged to energize a solenoid 342*b* located adjacent the pin row 1243*b* of the memory belt at a subsequent sector of the rotary orbit of said belt corresponding to the second quality rack of said first candling station. Since the memory belt moves in synchronism with the distributing conveyor such that within a given time interval the number of channels 1233 on the memory belt passing a stationary point are equal to the number of buckets 186 on the distributing conveyor that pass a stationary point during said same time interval, and since said distributing conveyor moves six times as fast as the feed elevators of the candling station, the second mounting bar 1286, counted from the left of FIG. 16A, is arranged to hold a second solenoid 342*b* above the second pin row 1243*b* (FIG. 16A) at a sector in the rotary orbit of the memory belt advanced by a distance equal to the vertical width of six consecutive channels 1233, which sector is identified as sector 7 in FIG. 30A. Accordingly, the third, fourth, fifth, sixth, seventh and eighth mounting bars 1286 carry solenoids **342*c*, 342*d*,** 342*e*, 342*f*, 342*g*, and 342*h* over sectors 13, 19, 25, 31, 37, and 43, respectively, of the rotary orbit of the memory belt, as likewise indicated in FIG. 30A.

From the summit of the elevator 168 of the first candling station an egg whose quality has been recorded by energization of one of the hereinbefore mentioned quality solenoids 342 is passed onto the weighing station 180 and from there over the lowering mechanism 182 into the first bucket 186 of a group of six consecutive buckets carried by the distributing conveyor 185. As said egg is carried away from the weighing platform, one of the six weight switches 444*j*, 444*k*, 444*l*, 444*m*, 444*n*, and 444*o* (FIGS. 5A and 5B) of the weighing mechanism 180 is closed depending upon the level to which the weighing platform was depressed in a manner described in detail in my aforementioned copending application. Every one of said six weight switches is arranged, upon closure, to energize a corresponding solenoid 445*j*, 445*k*, 445*l*, 445*m*, 445*n*, or 445*o*, respectively (FIG. 5A) which is supported from a mounting bar 1286 adjacent the pin rows 1243*j*, 1243*k*, 1243*l*, 1243*m*, 1243*n*, or 1243*o*, respectively, in a common sector 55 that corresponds to the location of the eggs in their state of transfer from the weighing platform onto the lowering mechanism at the moment when their proper weight switches 444 are closed.

In the particular embodiment of the invention illustrated in the accompanying drawings, the point at which eggs are delivered to the distributing conveyor 185 from the second candling station 152 is removed from the point where eggs from the first candling station 151 are fed to said distributing conveyor by a distance equal to twenty-three consecutive buckets, i.e., a multiple of six less one. Hence, eggs delivered from the second candling station 152 will always drop into a bucket directly succeeding the first bucket in each of the above-mentioned groups of six consecutive buckets. Accordingly, the solenoid 342*a* that is energized by eggs passing from the lowest rack 160a of the second candling station 152 to shift a memory pin in the pin row 1243a which represents the quality "Checked," is held by the left-most mounting bar 1286 over sector 24 of the rotary memory belt orbit as shown in FIG. 30A, and the solenoids 342b to 342h that correspond to the seven higher racks 160b to 160h of the second candling station are mounted upon the seven adjacent mounting bars 1286 over the sectors 30, 36, 42, 48, 54, 60 and 66, respectively, of the memory belt orbit, while the weight recording solenoids 445j to 445o controlled from the second weighing station 180 are supported from the mounting bars 1286 over sector 78. Analogically, the quality recording solenoids of the third, fourth, fifth, and sixth candling stations 153, 154, 155 and 156, respectively, start at sectors 47, 70, 93 and 116, respectively, of the memory belt orbit and their associated weight recording solenoids are mounted in sectors 101, 124, 147, and 170, respectively, as indicated by the letters WS in FIG. 30A.

Figure 7:
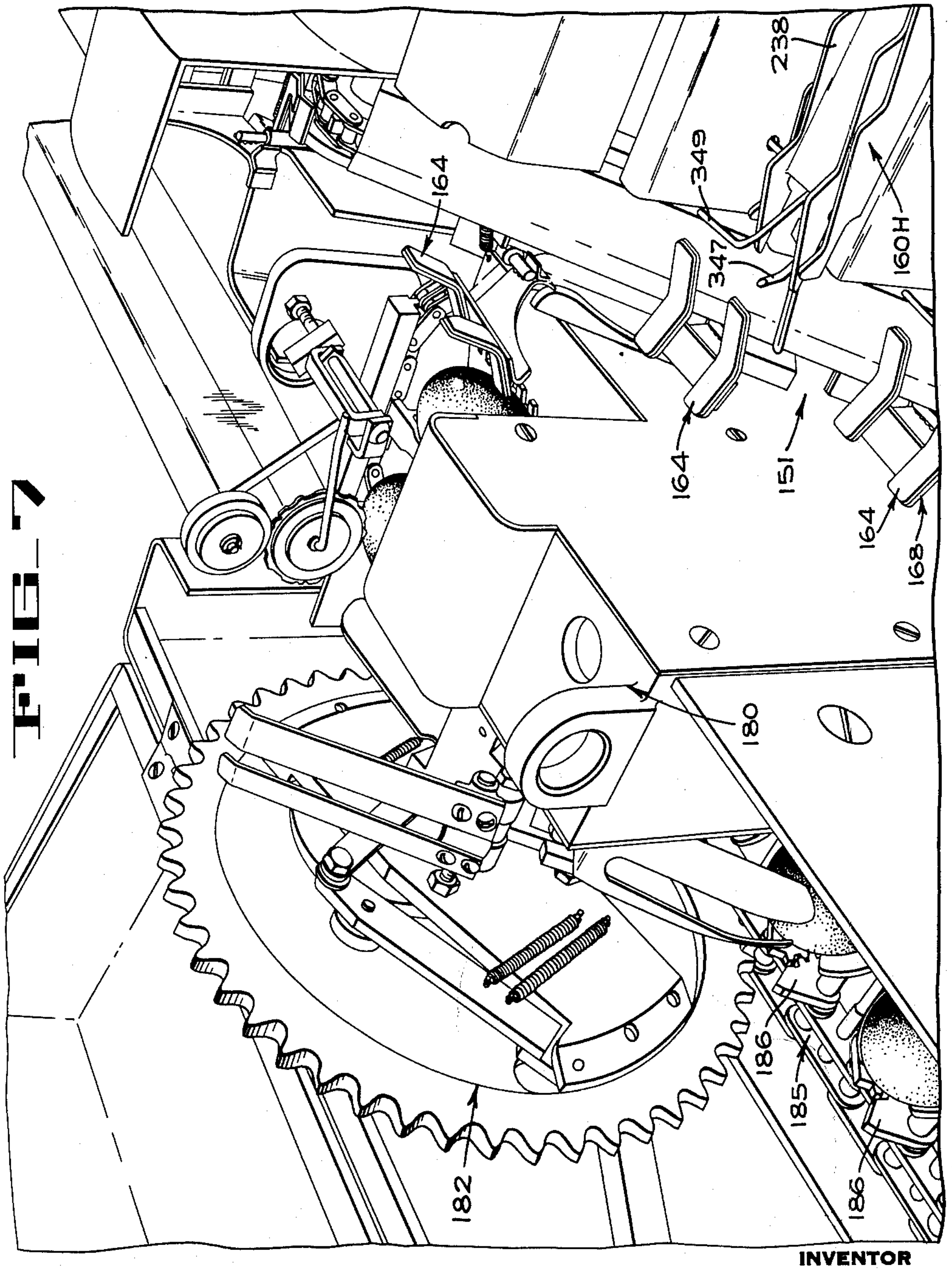
FIG. 7 is a fragmentary perspective of the upper end of a feed elevator and of an adjacent egg weighing mechanism of the machine shown in FIG. 1.

Since the memory belt 170 turns in timed relation with the distributing conveyor 185, it moves relatively fast because the distributing conveyor advances at six times the speed at which eggs travel through the candling and weighing stations 150 and 180, respectively. Hence, the period of time during which the pins 1242 in the channels 1233 of the memory belt are positioned directly opposite, and remain in operative relation to, the various quality and weight recording solenoids is very brief. Moreover, the period of time during which the quality and weight recording solenoids are energized is also very brief because whenever an egg passes from one of the racks 160 onto an aligned elevator cup 164, the quality switches 341 at the end of said racks are closed for a very brief moment only, and the exact moment of their closure will vary depending upon the behaviour of the individual eggs as they pass over the switch actuating arms 347, 349 (FIG. 7). Means are, therefore, provided to increase the period during which the advancing pins 1242 on the memory belt 170 and the pin shifting solenoids remain in operative relation so that a recording solenoid will not be energized without engaging the pin that it is intended to shift into effective position. For this purpose, the parallel vertical bars 1286 of the grid 1284 are arranged to move in orbits of limited diameter in timed relation with the advance of the memory belt in order that the quality and weight recording solenoids supported from said bars may move over a limited distance congruently with the channels 1233 whose pins they may have to shift.

Figure 18A:
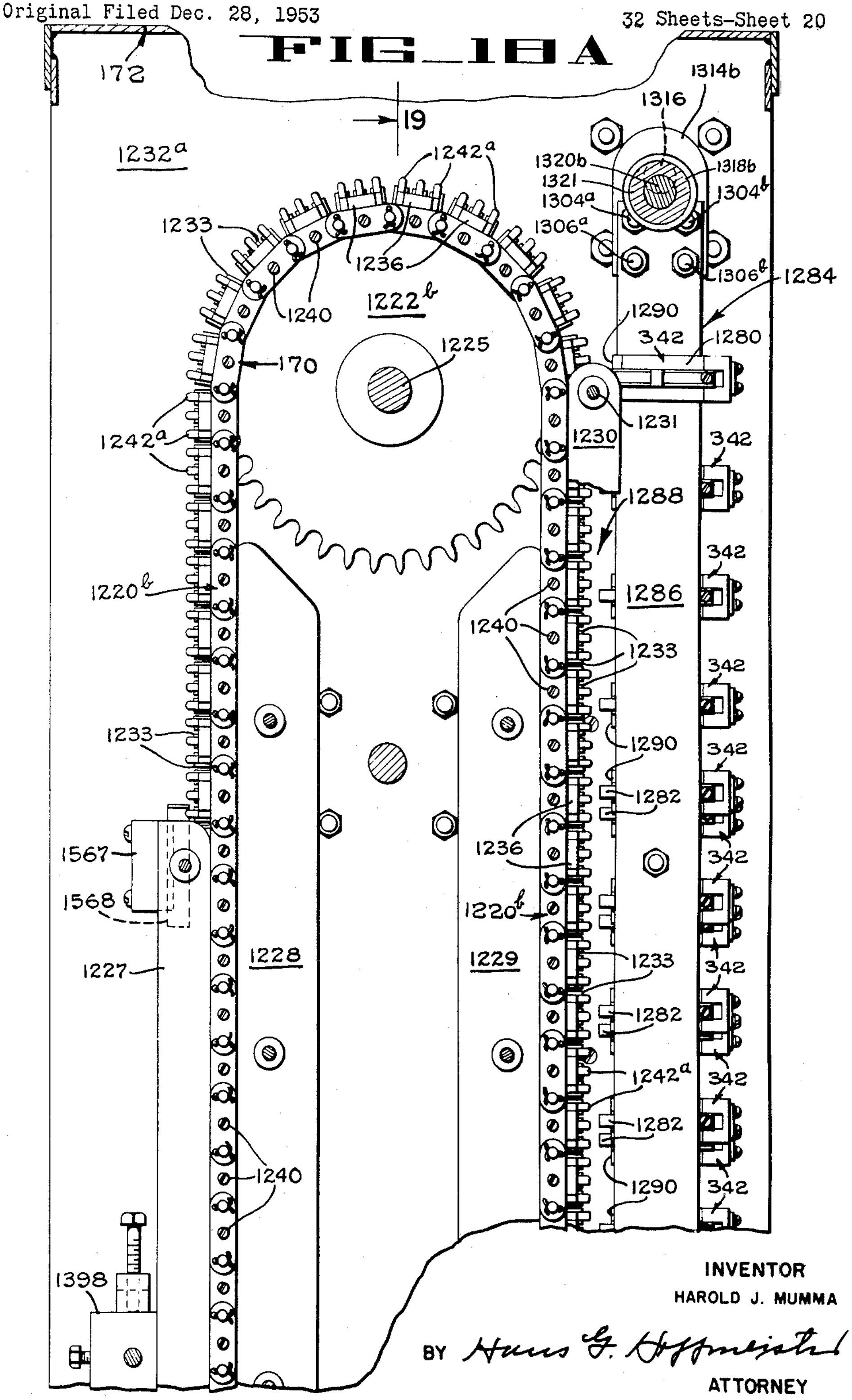
FIGS. 18A and 18B are the upper and lower portions, respectively, of a transverse vertical section through the memory belt taken along line 18—18 of FIGS. 16A and 16B.

Having reference to FIGS. 16A and 16B and 18A and 18B, all the mounting bars 1286 adjacent the descending run of the memory belt 170 are tied together at their upper ends by two vertical superposed pairs of cross rods 1304a, 1304b and 1306a, 1306b and at their lower ends by two additional pairs of such cross rods 1308a, 1308b and 1310a, 1310b, spacer bushings 1312 being interposed between adjacent mounting bars so as to maintain them at their proper distance from each other. The two upper pairs of cross rods are rigidly held in two vertically positioned transversely spaced mounting blocks 1314a and 1314b that in turn are rotatably mounted upon, and depend from, a transverse shaft 1316 whose opposite ends are held in crank discs 1318a and 1318b, respectively, at angularly aligned eccentric points thereof. Said crank discs in turn are firmly mounted upon stub shafts 1320a and 1320b that are rotatably supported in the hereinbefore mentioned side panels 1232a and 1232b of the cabinet 172 which houses the memory belt. A bearing 1321 for the stub shaft 1320b appears in FIGS. 16A and 18A. Similarly, the two pairs of cross rods 1308a, 1308b and 1310a, 1310b at the lower end of the mounting bars 1286 are firmly held in two vertically positioned transversely spaced mounting blocks 1322a and 1322b that are rotatably mounted upon, and rise from, a transverse shaft 1324 whose opposite ends are held in crank discs 1326a and 1326b at angularly aligned eccentric points thereof. Said discs in turn are firmly mounted on stub shafts 1328a and 1328b that are rotatably supported in the side panels 1232a and 1232b of the memory belt cabinet 172 near the lower ends thereof. A bearing 1329 for stub shaft 1328b appears in FIGS. 16B and 18B. Firmly mounted upon the outwardly projecting ends of the right stub shafts 1320b and 1328b, as viewed in FIGS. 19A and 19C, are bevel gears 1330 and 1332, respectively, that mesh with bevel gears 1334 and 1336 which are firmly mounted upon the upper and lower ends of a vertical shaft 1337 that is rotatably supported from the adjacent side panel of the memory belt cabinet in any suitable manner.

Figure 19B:
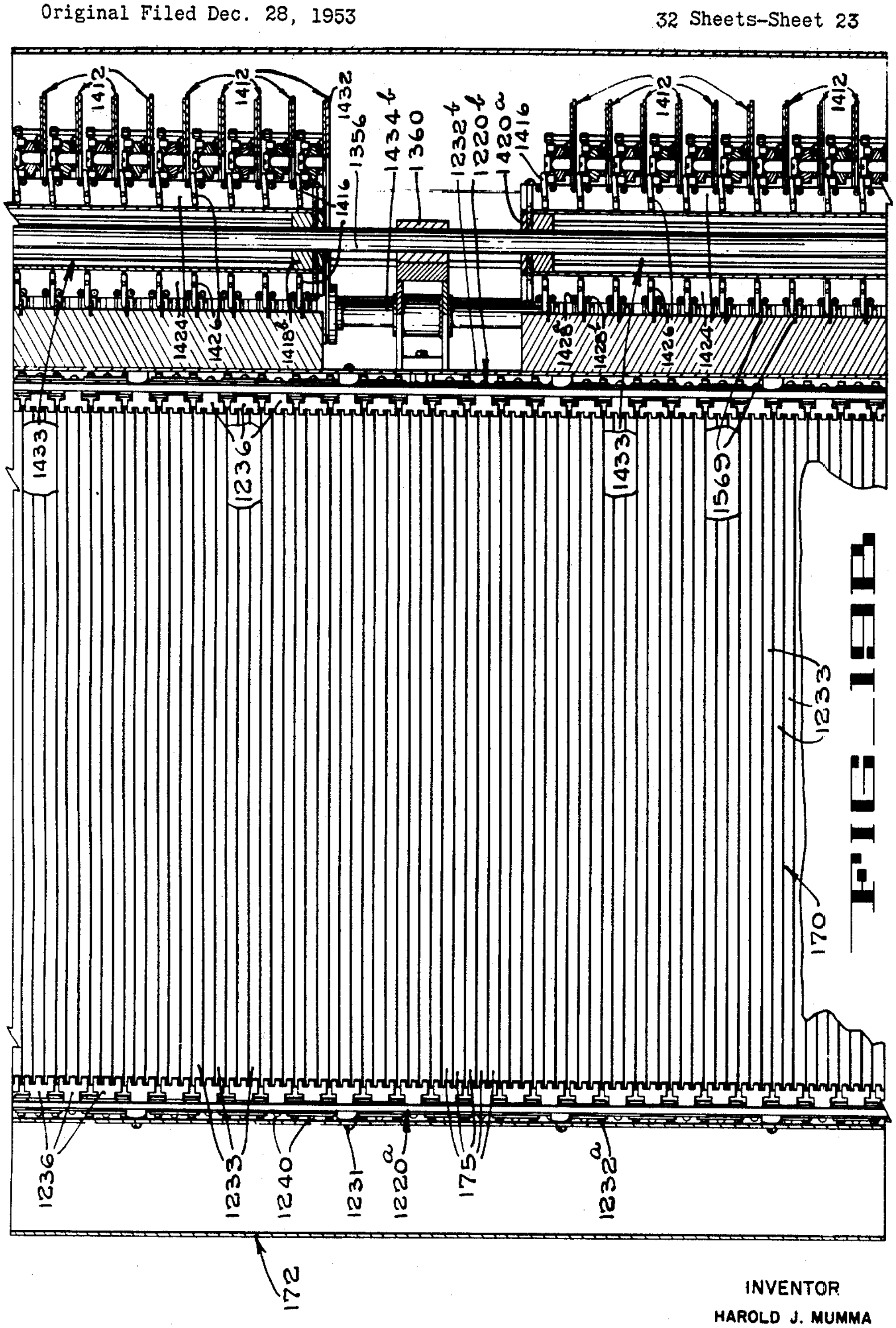

To operate the bars 1286 in proper relation to the memory belt 170 and to move the latter in the required synchronism with the distributing conveyor 185, both the memory belt and the crank discs 1318a, 1318b and 1326a, 1326b are driven directly from the distributing conveyor. Having reference to FIG. 4, shaft 652 at the trailing end of the distributing conveyor which supports conveyor sprockets 651a and 651b, also supports firmly mounted thereon a small sprocket 1338 that is operatively connected by an endless sprocket chain 1340 with another sprocket 1342 which is firmly mounted upon the outwardly protruding end of a transverse shaft 1344 that is rotatably supported in the repeatedly mentioned side panels 1232a and 1232b of the memory belt cabinet 172. Also mounted upon said shaft adjacent the sprocket 1338 is another sprocket 1346, and another endless sprocket chain 1348 connects said last-mentioned sprocket 1346 with yet another sprocket 1350 that is firmly mounted upon the outwardly protruding end of the hereinbefore mentioned drive shaft 1225, which carries the upper memory belt sprockets 1222a and 1222b. The hereinbefore mentioned transverse shaft 1344 carries a bevel gear 1352 adjacent the outer face of the outer side panel 1232b of the memory belt cabinet. Said bevel gear 1352 meshes with another bevel gear 1354 that is firmly mounted upon the upper end of a vertical shaft 1356 which is rotatably supported from the mentioned side panel 1232b of the memory belt cabinet at three vertically spaced points by suitable brackets 1358, 1360 and 1362 (FIGS. 19A, 19B and 19C). Said vertical shaft 1356 carries a sprocket 1364 that is operatively connected by means of an endless sprocket chain 1366 with a small sprocket 1368, and said last-mentioned sprocket 1368 is firmly mounted upon the hereinbefore mentioned vertical shaft 1337 that carries the bevel gears 1334 and 1336 which drive the crank shafts 1320b and 1328b.

Figures 24A, 24B, 24C, 24D:
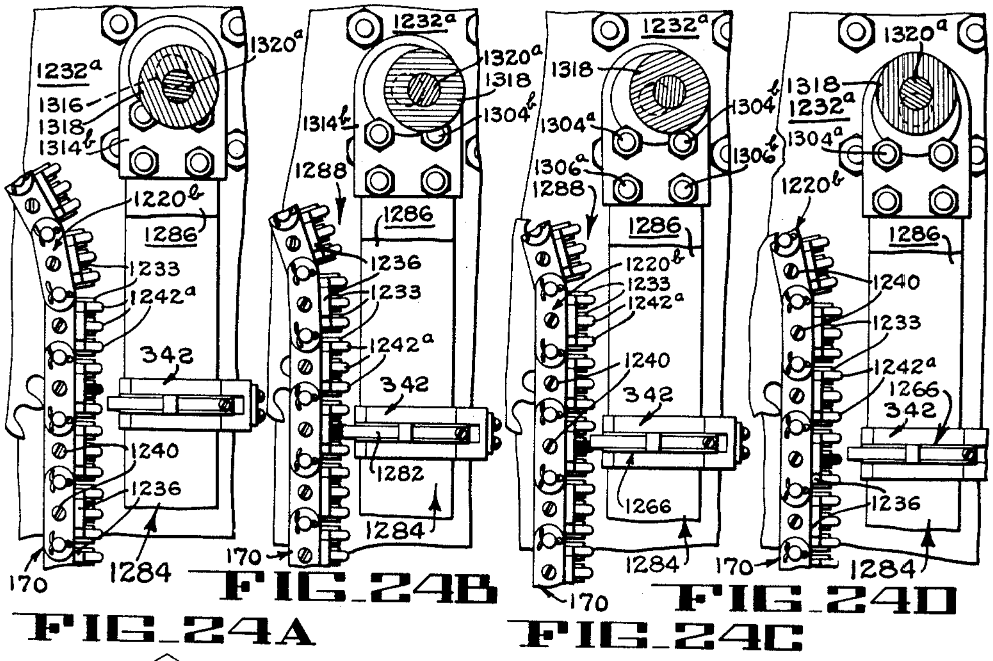

Since every one of the quality and weight recording solenoids 342 and 445, respectively, supported from the mounting bars 1286 is intended to coact with only every sixth of the memory belt channels 1233 passing-by, corresponding to the candling station 150 from which it may be energized as explained hereinbefore, the rotary motion of the mounting bars 1286 as effected by the described crank discs 1318a, 1318b and 1326a, 1326b needs to move the quality and weight recording solenoids supported thereon only once during the passage of six memory belt channels 1233 into close proximity of the memory belt. Also, since all the six candling stations 150 comprised in the machine and their associated weighing mechanisms 180 are arranged to operate in phase alignment, the described approach of the mounting bars to the descending run of the memory belt will place the quality and weight recording solenoids of every one of the six candling stations at the proper moment into operative relationship with their corresponding memory belt channels. The described power train is, therefore, arranged to rotate the solenoid supporting bars 1286 in an orbit the circumference of which is about equal to the composite width of six consecutive memory belt channels at a speed that imparts to the actuating ends of the solenoids supported thereon a peripheral velocity about equal to, or even slightly greater than, the peripheral speed of the descending memory pins 1242. As a result thereof, when a channel 1233 approaches a row of solenoids 342 or 445 that is intended to shift one of its pins 1242 upon energization thereof, the mounting bars 1286 move the solenoids closer to the belt in a downward direction, as illustrated in FIG. 24A, wherein the particular pin that is to be actuated by the solenoid is shown in black. Then, as the channel 1233 that supports the particular pin reaches the level of the solenoid, and pin and solenoid enter into operative relation, both the channel and the solenoid descend congruently over a limited distance while the pin and the solenoid remain in operative relation, as illustrated in FIGS. 24B and 24C. During the time of their common descent, energization of the solenoid will dependably shift the proper pin from ineffective to effective position, and thereafter as the particular channel continues to descend with one of its pins in activated position, continued rotation of the mounting bars 1286 withdraws the recording solenoids along the lower quadrants of their rotary orbit from the memory belt, as illustrated in FIG. 24D.

After the channels 1233 on the descending run of the memory belt 170 have dropped below sector "170" of their orbit (FIG. 30A), and provided the machine is operated at full capacity, they all represent eggs traveling on the distributing conveyor 185 whose quality and weight are recorded on said channels by two of the memory pins, in each of said channels, that are shifted into their effective positions, one representing the quality and the other the weight of the egg. When the eggs on the distributing conveyor approach oiling nozzle 705 (FIG. 8) their representative channels 1233 pass through sector 181 of the rotary orbit of the memory belt (FIG. 30A), and supported from a transverse stationary channel 1370 at said sector 181 (FIG. 16B) are fourteen juxtaposed normally open switches 1372*a* to 1372*h* and 1372*j* to 1372*o* (FIG. 8), one for each of the eight pin rows that represent quality and one for each of the six pins rows that represent weight. Said switches are briefly closed whenever a memory pin in effective position passes underneath.

Figure 16B:
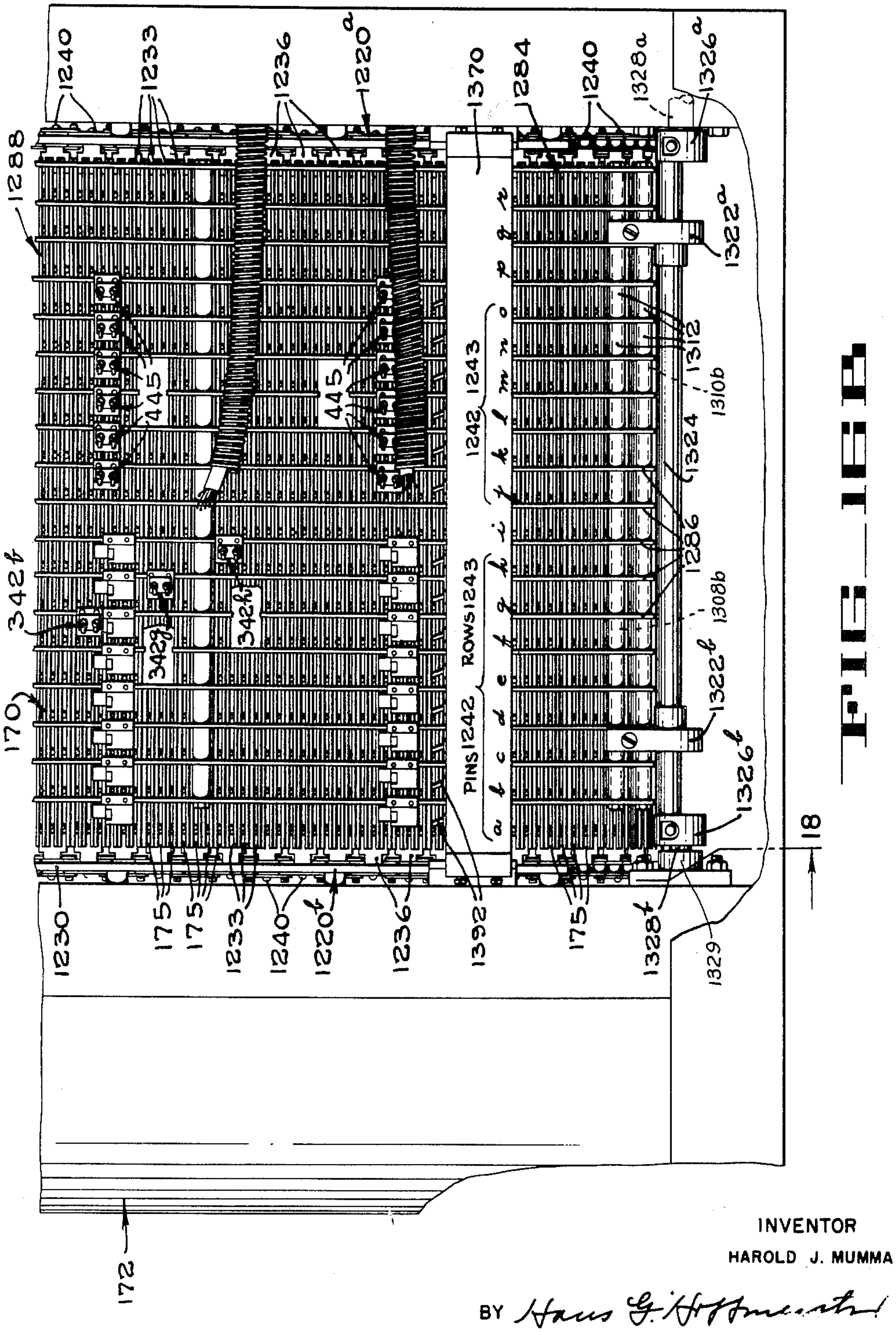
Figure 18B:
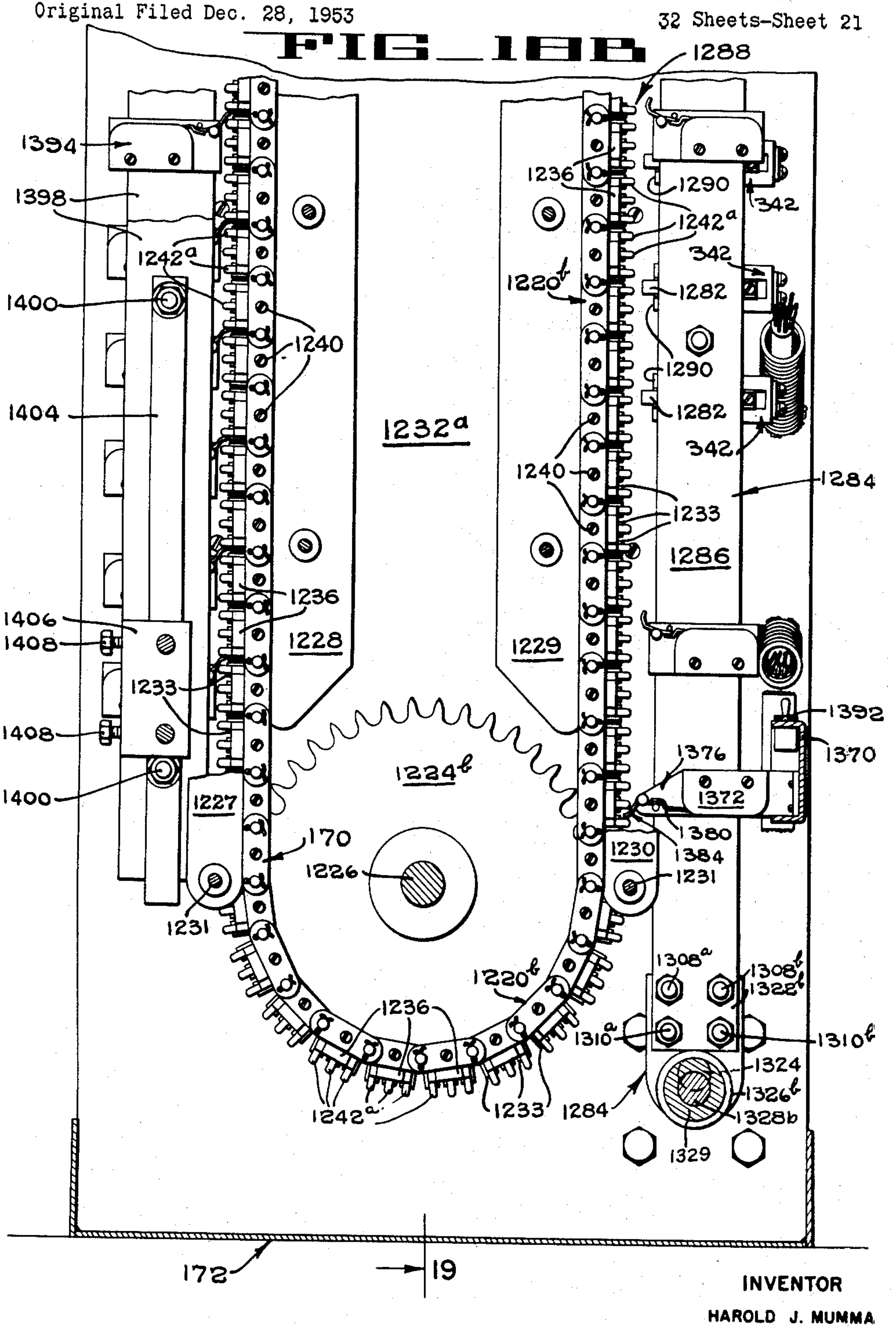
Figure 19C:
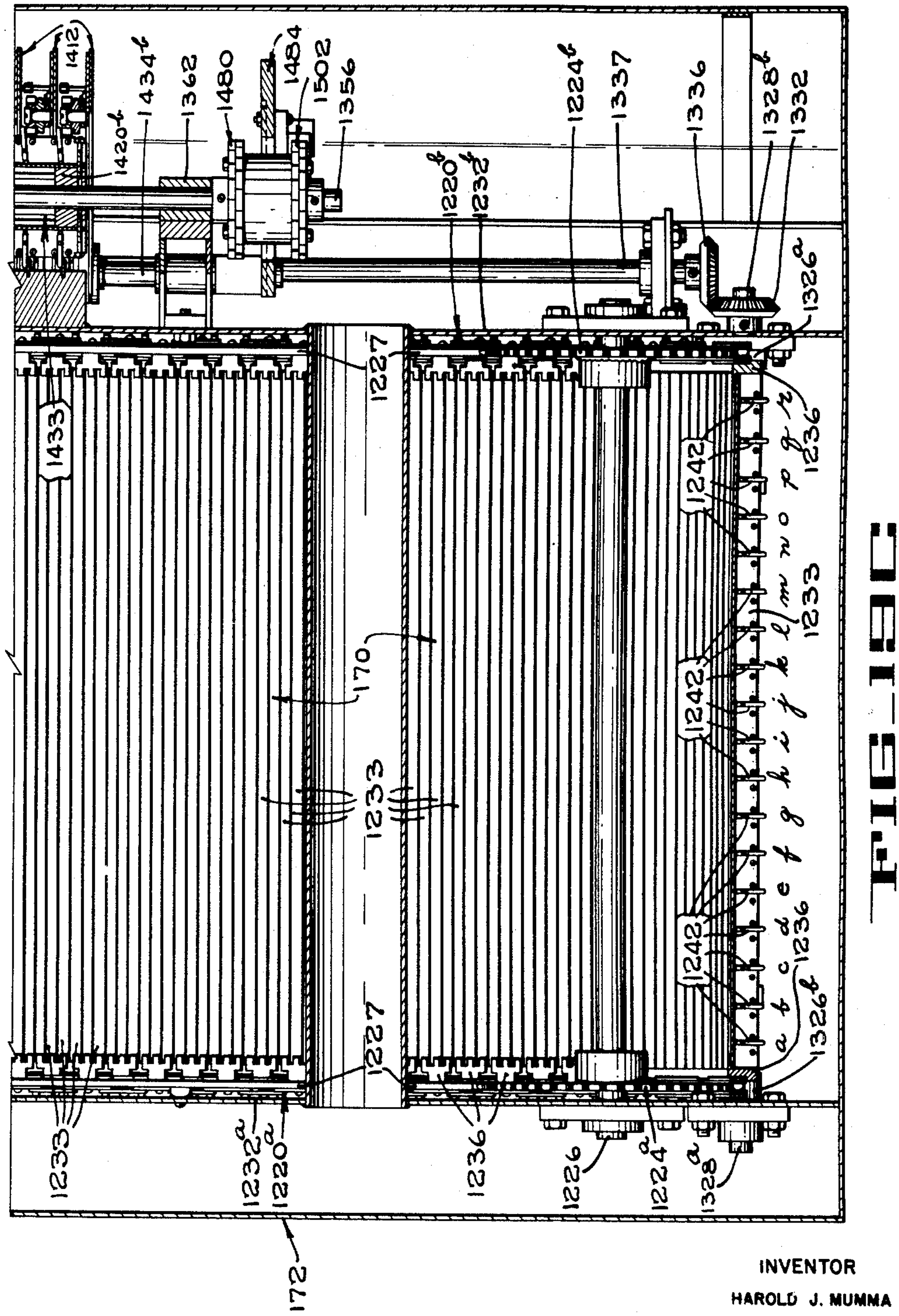

Having reference to FIGS. 16B and 18B, said stationary channel 1370 is adjustably secured at its opposite ends to the outer vertical guide bars 1230 on the descending side of the endless sprocket chains 1220*a* and 1220*b*; and the switches 1372 are secured to the long bars 1374 of L-shaped brackets 1376 (FIG. 27) that are bolted with their short bars 1378 to the inner face of the channel 1370 and which project between the rotating mounting bars 1286 into close proximity with the periphery of the memory belt. The operating arms 1380 of each of said switches overlie one end 1382 of an actuating lever 1384 that turns on a stud 1386 projecting laterally from the long bar 1374 of bracket 1376, and the opposite free end 1388 of said actuating lever projects into the vertical path of advance of activated pins in the particular pin row with which its switch 1372 is associated. Hence, whenever a pin 1242 in effective position passes through sector 181 of its rotary orbit, it bears down upon the free end 1388 of lever 1384 and swings it in counterclockwise direction, as viewed in FIG. 27, causing its opposite end 1382 to raise the switch arm 1380 which is effective to close the switch 1372. A stop pin 1390 supported from the long bar 1374 of bracket 1376 may be disposed below the inner end 1382 of the actuating lever 1384, as shown in FIG. 27, to prevent accidental disengagement of switch arm 1380 and actuating lever 1384 from each other.

Connected in series with each of the fourteen switches 1372*a* to 1372*h* and 1372*j* to 1372*o* is an ordinarily open manually settable switch 1392 (FIG. 8). The eight pairs of series-connected switches 1372/1392 associated with the pin rows 1243*a* to 1243*h* that represent quality are connected in parallel with each other, and the six pairs of series-connected switches 1372/1392 associated with the pin rows 1243*j* to 1243*o* that represent weight are likewise connected in parallel with each other. The two sets of parallel connected switch pairs 1372/1392 thus established are in turn connected in series within the power circuit of a solenoid 713*a* that controls a normally closed control valve 713 which governs the supply of oil to the oiling nozzle 705. Hence, whenever it is desired to oil eggs of a particular weight and quality combination, the operator merely closes the manually settable switches 1392 in series with the memory pin actuated switches 1372 opposite the pin rows that represent the selected quality and weight. Then, whenever an egg of the selected quality and weight approaches the oiling nozzle 705, the activated pins 1242 of its representative memory belt channel 1233 in passing by the stationary channel 1370 close briefly a switch 1372 in the set of parallel connected switches representing quality and another switch 1372 in the set of parallel connected switches representing weight and since the manually settable switches 1392 in series with said pin actuated switches were previously closed, momentary closure of said latter switches as effected by the activated pins completes the power circuit of the oil supply control solenoid 713*a* for the brief period of time during which the pin activated switches 1372 remain closed, causing brief energization of said solenoid. Upon energization, said solenoid opens the control valve 713 in an oil supply line 709 and a squirt of oil will be directed against the upper end of the egg at the very moment when it passes underneath the oiling nozzle 705. Thereafter, as the egg travels down the slanting run of the distributing conveyor, air nozzles 727 to 733 drive the small amount of oil deposited onto the top of the egg consecutively over its top surface, and down its sides so that the whole egg is covered with a thin film of oil which retards evaporation of its liquid contents and in this manner aids in keeping the egg in fresh condition.

After the distributing conveyor 185 has carried the eggs through the oiling station 188, it moves them toward and across the eighteen consecutive packing stations 190 (FIG. 9). As an egg approaches the first packing station and moves through a point a predetermined distance ahead of the downstream end of said packing station, which distance is equal to the length of six consecutive buckets in the exemplary embodiment of the invention that I am about to describe for reasons that will presently appear, its representative channel 1233 moves through sector 226 of its rotary orbit (FIG. 30B) which is located at the rear or ascending side or run of the memory belt 170. If said first packing station is to package eggs of, say, A Brown quality and small size, normally open switches 1394 are supported adjacent the ascending run of the memory belt at said sector 226 above the pin rows 1243*g* and 1243*n* representing A Brown quality and small size, respectively, in such a manner that they will be temporarily closed by pins 1242 in said rows that were previously shifted into effective position (FIGS. 17B and 30B). Said switches are of a construction similar to the oiling control switches 1372 illustrated in FIG. 27 but are secured to clamps 1397 (FIG. 28) rather than L-shaped brackets. The clamps 1397 may be slipped over and bolted to selected ones of a group of transversely spaced stationary vertical bars 1398 (FIGS. 18A and 18B) at the ascending run of the belt that are similar in construction to the rotating mounting bars 1286 adjacent the descending run of the memory belt. Said bars 1398 extend alongside the eighteen pin rows of the memory belt and are mounted upon a plurality of vertically spaced transverse rods 1400 (FIG. 18B) whereon they are maintained in their proper transversely spaced position by intermediately located spacer bushings 1402 (FIG. 17B). The rods 1400 in turn are held at their opposite ends in vertical rails 1404 slidably received in guide channels 1406 that are secured to the side panels 1232*a* and 1232*b* of the memory belt cabinet. Within said guide channels the rails 1404 may be fixed in vertically adjusted position by means of setscrews 1408. The clamps 1397 of the switches 1396 are detachably secured to the mounting bars 1398 in any suitable manner, such as by means of setscrews 1410 (FIG. 17B).

Figure 5C:
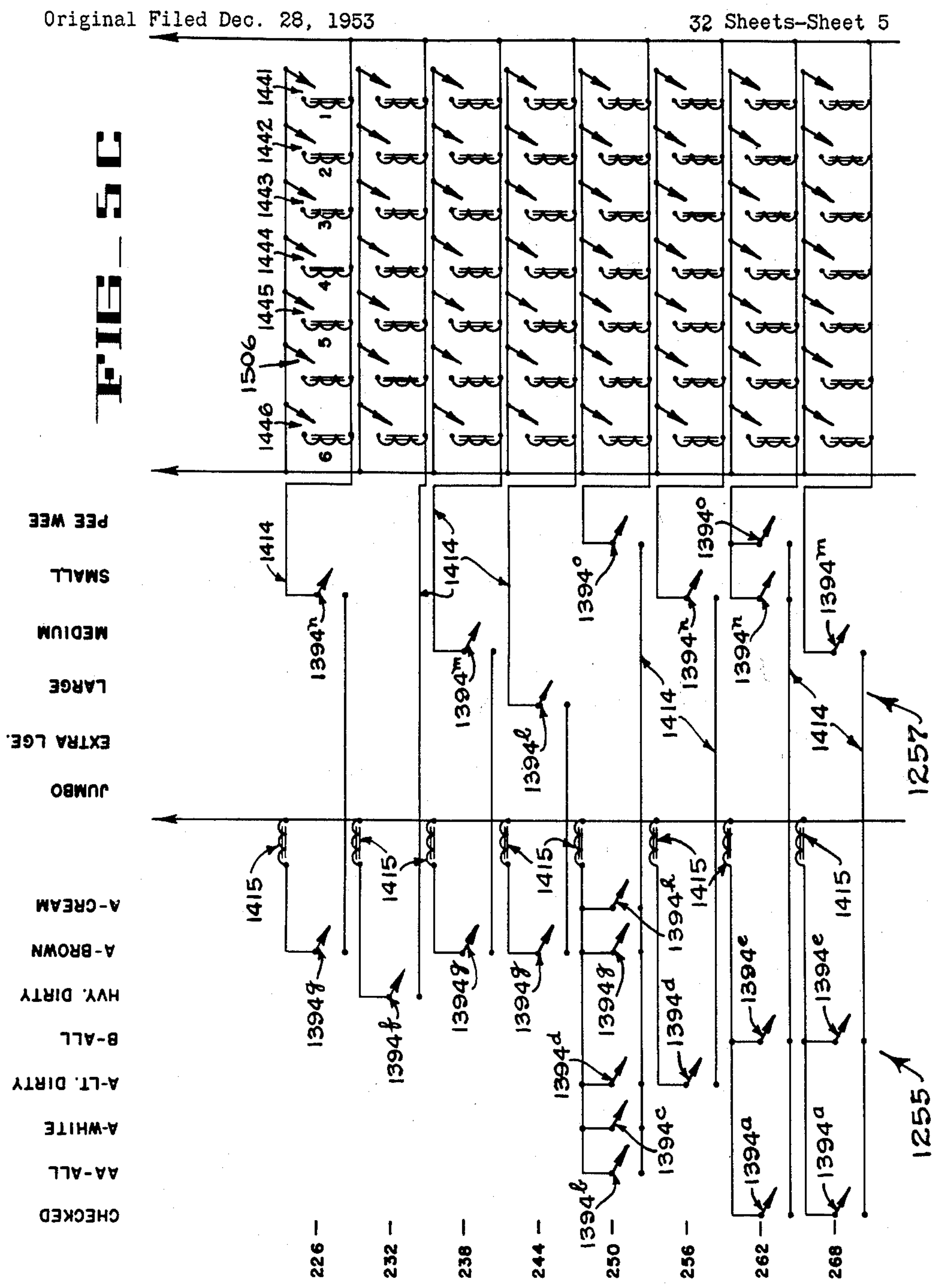

As soon as a channel 1233 with its memory pins 1242g and 1242n tilted to effective position passes underneath the hereinbefore mentioned switches 1394 that are held above the memory pin rows 1243g and 1243n, indicating that an egg of A Brown quality and small size approaches the first packing station, said switches—identified as switches 1394g and 1394n, respectively, in FIG. 5C— are closed for a brief moment and set into motion mechanism that will release the egg from its supporting bucket at the first packing station at the very moment when said egg travels over an empty pocket in a carton or cardboard grid that is held underneath the distributing conveyor at said packing station. If the pocket row of said carton or cardboard grid is still entirely empty, said mechanism is arranged to effect discharge of the egg from the distributing conveyor over the pocket at the downstream end of said pocket row, and succeeding eggs of the same weight and quality combination on the distributing conveyor are successively dropped into the remaining five pockets in upstream direction.

Since the consecutive pockets in the pocket rows of cartons or cardboard grids, of the type shown in FIG. 9, are located much closer together than the consecutive egg supporting buckets on the distributing conveyor, release of succeeding eggs of the selected quality and weight combination from the distributing conveyor must be effected at points along said conveyor that correspond to points of the rotary orbit of the memory belt which lie actually intermediately the consecutive sectors of the orbit that are illustrated in FIG. 30B. For this reason, whenever an egg reaches a predetermined point ahead of the downstream side of the packing station at which it is to be dropped, by a distance about equal to the total length of six consecutive buckets, its representative channel 1233 on the memory belt causes said egg to be registered on a secondary or auxiliary memory device 1412 (FIG. 15) that is individual to each packing station and which operates in synchronism with both the distributing conveyor and the memory belt. From that moment on, it is said secondary memory device 1412 that assumes representation of the egg and which operates to cause its release from the distributing conveyor at the proper moment as it passes over the carton or cardboard grid beneath, depending on how many eggs, if any, have previously been deposited into the aligned pocket row.

Figure 17A:
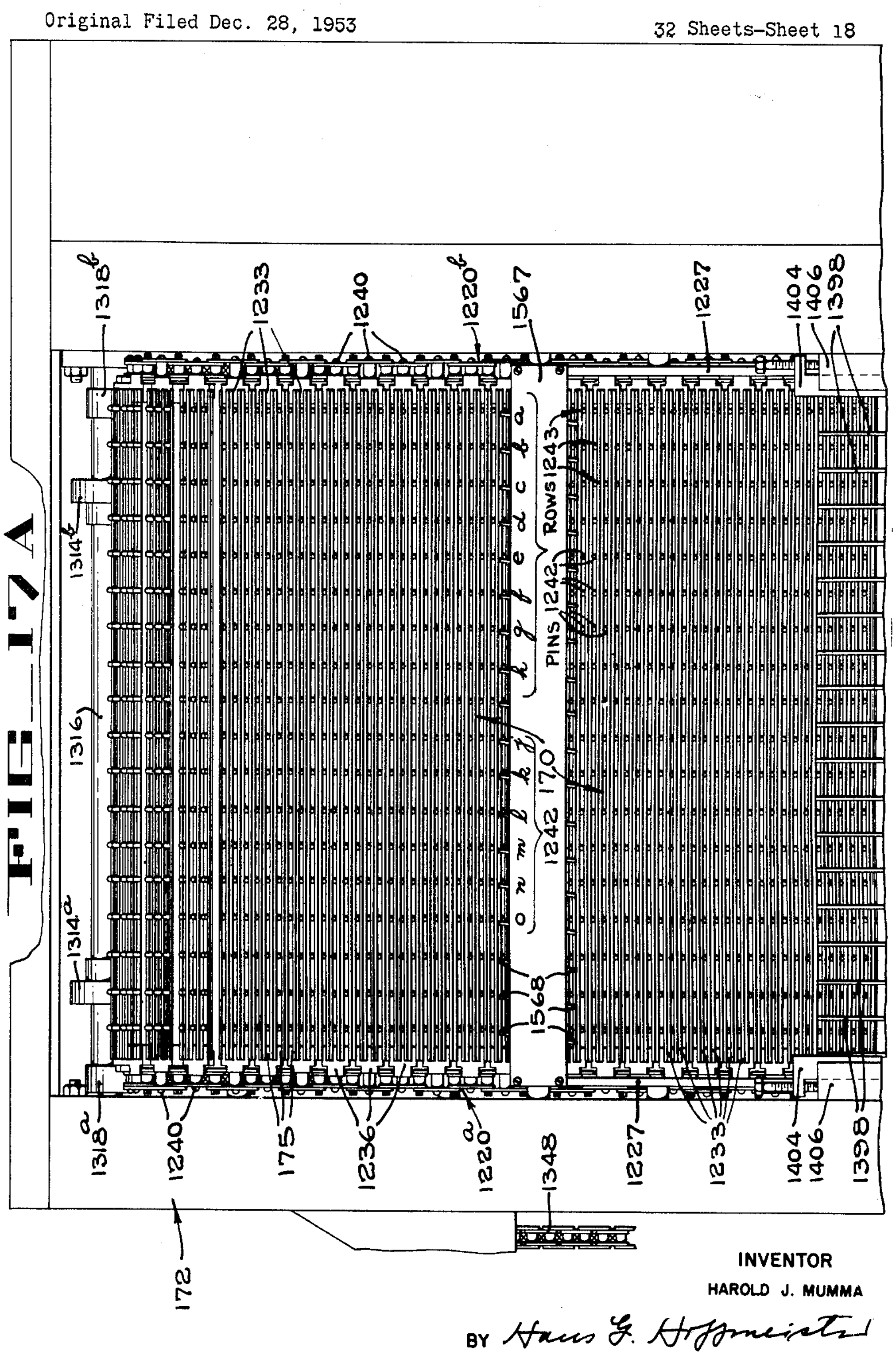
FIGS. 17A and 17B are upper and lower portions, respectively, of an elevational view of the memory belt taken at the side opposite to FIGS. 16A and 16B.
Figure 17B:
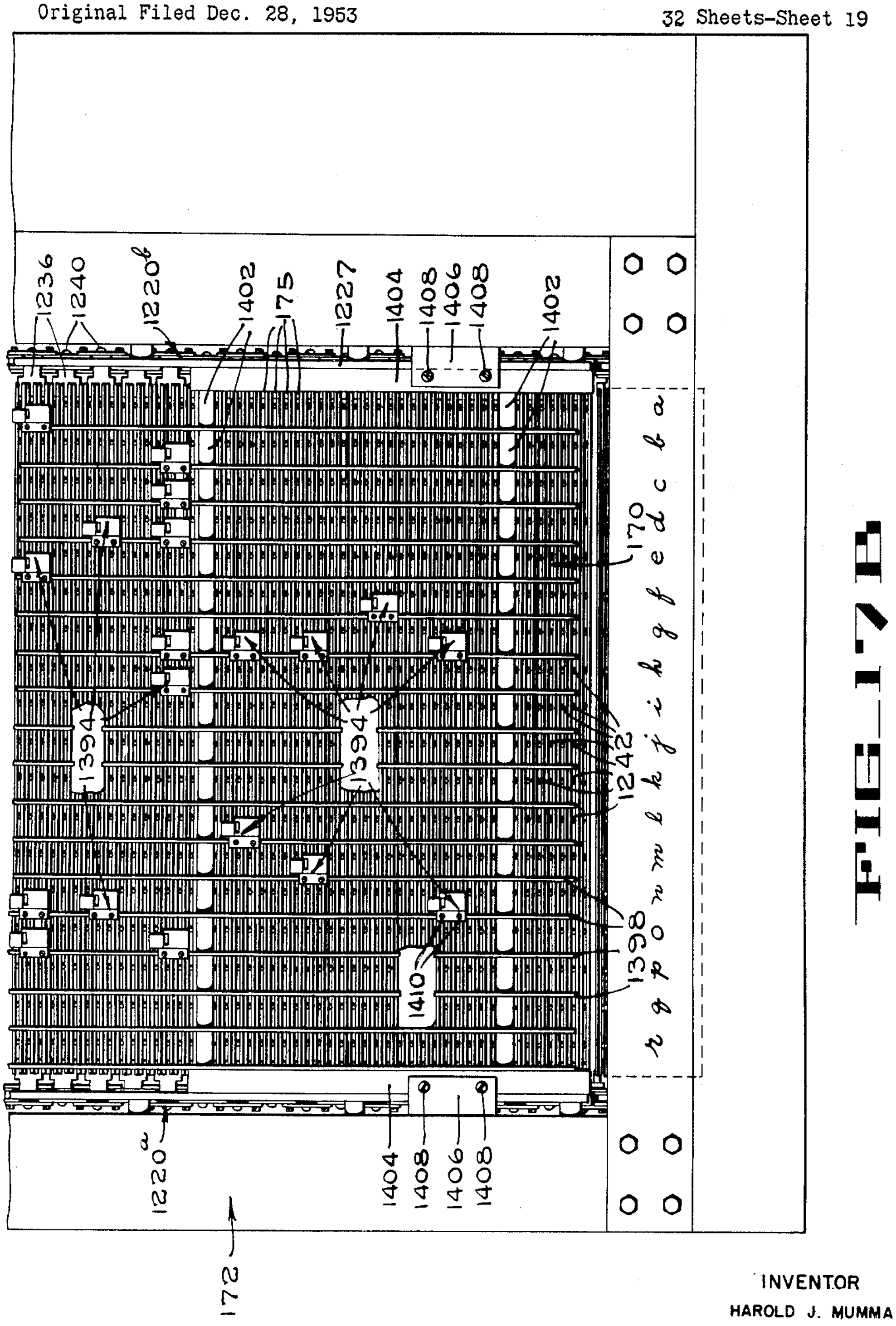

Reverting to FIGS. 17A, 17B and 30B, the eighteen juxtapositioned packing stations comprised in the egg handling machine are each of a width equal to the total length of six consecutive buckets on the distributing conveyor and the sectors of the rotary orbit of the memory belt at which the eighteen auxiliary memory devices comprised in the egg handling machine assume control over an egg to be released from the distributing conveyor at their corresponding packing station are, therefore, sectors 226, 232, 238 and so on, with sector 328 marking the point at which the auxiliary memory device associated with the last packing station assumes control of eggs to be packed at said last packing station. Supported from the mounting bars 1398 at each of said sectors above the pin rows 1243 that represent the weight and the quality of the eggs which are to be packaged at said particular packing stations are normally open switches 1394 of the construction described hereinbefore. Thus, as previously pointed out, the first of the eighteen packing stations is to receive eggs of A Brown quality and small size, and accordingly the mounting bars 1398 carry a switch 1394g over the pin row 1243g and a switch 1394n over the pin row 1243n in sector 226 of the rotary memory belt orbit. In other packing stations, it may be desired to pack all eggs of a certain quality, disregarding their size, into cartons or cardboard grids or to pack eggs of several different qualities and/or several different sizes. Thus, the second packing station may be intended to handle eggs classed as "Heavily Dirty," disregarding their sizes, and, accordingly, a switch 1394f is supported from the sixth mounting bar 1398, counted from the right, as viewed in FIG. 17B at sector 232 of the memory belt orbit over pin row 1243f which represents the quality "Heavily Dirty." As another example, the fifth packing station may be intended to handle eggs of the quality grades AA, A White, A Light Dirty, A Brown, and A Cream that are of Peewee size. Accordingly, in sector 250 of the memory belt orbit which corresponds to the fifth packing station, switches 1394b, 1394c, 1394d, 1394g and 1394h are supported from the bars 1398 over the pin rows 1243b, 1243c, 1243d, 1243g and 1243h, respectively, and a switch 1394o is supported over the pin row 1243o. As yet another example, is may be desired to pack eggs of the quality grades "checked" and "B," and of the sizes Jumbo, Extra Large, and Large, at the thirteenth packing station, and, accordingly, switches 1394a and 1394e are arranged above the first and fifth pin rows 1243a and 1243e, respectively, counted from the right in FIG. 15 and switches 1394j, 1394k and 1394l are mounted above the tenth, eleventh and twelfth pin rows 1243j, 1243k and 1243l, respectively, in sector 298 of the memory belt orbit which sector corresponds to the thirteenth packing station.

Figure 5D:
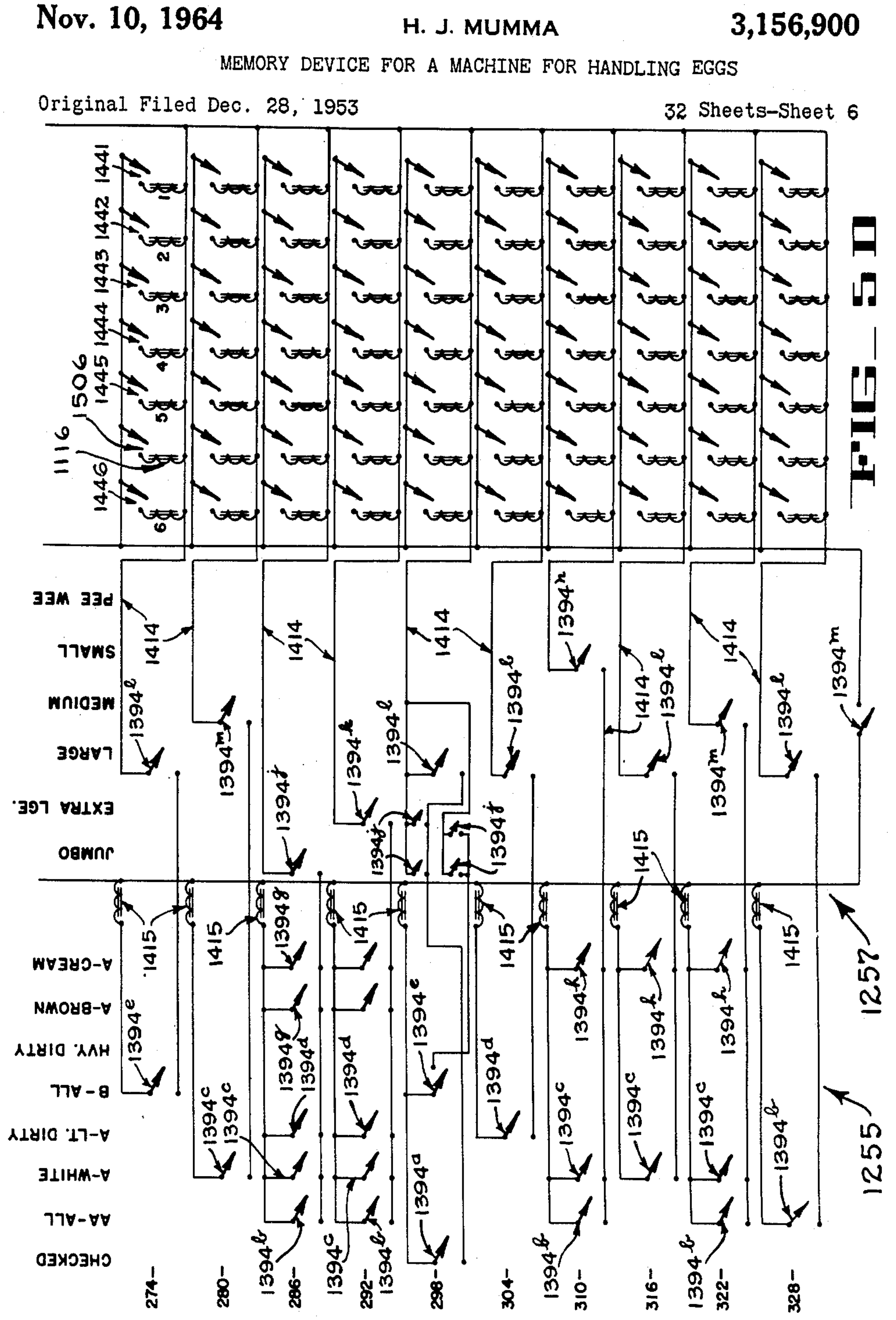

As pointed out hereinbefore, all of said switches 1394 are normally open and are briefly closed when they encounter activated pins 1242 in their respective pin rows of the continuously operating memory belt. In each of the eighteen sectors corresponding to the eighteen consecutive packing stations, the switches 1394 that represent quality grades are all connected in parallel with each other, provided there are more than one in any such sector as is the case in the above-discussed sectors 250 and 298 (FIGS. 5C and 5D), and similarly the switches 1394 in each of said eighteen sectors that represent weight are all connected in parallel if there are more than one, such as is the case in the sector 298 (FIG. 5D). The quality and weight switches in each of said sectors, however, are connected in series and form part of the power circuit 1414 of a solenoid 1415 (FIGS. 5C, 5D, 31 and 33). Upon energization, said solenoid 1415 operates to activate a memory pin 1416 in the secondary memory device 1412 corresponding to the packing station which is represented by the particular sector of the primary memory belt orbit in which are located the quality and weight switches 1394 that caused its energization. To energize such a solenoid 1415, it is necessary in all but sector 232 of the memory belt orbit—which corresponds to packing station #2—that at least one of the quality switches 1394 and one of the weight switches 1394 in its power circuit be closed simultaneously which occurs only when an egg that has both the selected quality and the selected weight approaches a packing station. In the unique case illustrated by packing station #2 where all eggs graded as "Heavily Dirty" are to be packed together irrespective of weight, the power circuit of the solenoid 1415 requires only a single quality switch 1394 placed into cooperative relation with the pin row 1243f that represents the quality grade "Heavily Dirty" and needs no switches representative of weight. The solenoid 1415 associated with packing station #2 will, therefore, be energized whenever a channel 1233 with its pin 1242f in effective position passes its solitary switch 1394f no matter what the setting of the weight recording pins 1242j to 1242o of the channel may be.

Whenever a solenoid 1415 has been energized and has shifted a secondary memory pin 1416 in the secondary memory device 1412 into effective position, it is said shifted secondary memory pin 1416 that takes over representation of the particular egg instead of the memory belt channel 1233 that caused energization of the shift-effecting solenoid 1415. Having reference to FIGS. 31, 32 and 33, the eighteen secondary memory devices 1412 comprised in the illustrated embodiment of the invention are all mounted upon and driven from the hereinbefore mentioned vertical shaft 1356 which is rotatably supported from the outer side panel 1232*b* of the memory belt cabinet 172 by means of three vertically spaced brackets 1358, 1360 and 1362, respectively. As previously pointed out, said shaft is driven from the distributing conveyor by means of a bevel gear 1354 mounted upon its upper end that meshes with another bevel gear 1352 which is firmly secured to the protruding end of the transverse shaft 1344 that is driven from the distributing conveyor and which in turn drives the memory belt 170. Supported from the vertical shaft 1356 for rotation therewith is an upper and lower pair of vertically spaced mounting discs 1418*a*, 1418*b* and 1420*a*, 1420*b* (FIGS. 19A, 19B and 19C) each provided with eight equi-spaced angularly aligned radial retaining slots 1422 (FIGS. 31 and 33). Received within and secured to the angularly aligned slots 1422 of the upper and lower pairs of mounting discs are eight vertically disposed channels 1424 that are substantially of the same construction as, but are shorter in length than, the hereinbefore mentioned horizontally disposed channels 1233 that form the memory belt 170. Pivotally supported within said channels in vertically spaced relation are eighteen secondary memory pins 1416, one for each of the eighteen packing stations comprised in the illustrated embodiment of the invention. Said pins 1416 may be of the same construction and may be made of the same material as the hereinbefore described primary memory pins 1242, and rotation of said pins about their pivots 1426 is positively limited by studs 1428*a* and 1428*b* that are mounted within the side flanges 1430 of said channels above and below the pins, as best shown in FIG. 31.

Disposed below each of the eighteen circular rows of secondary memory pins 1416 formed by the pins projecting from the channels 1424 at equal altitudes are base plates 1432 of roughly horseshoe shape that embrace the rotor 1433 formed by the channels 1424 in superposed relation, as shown in FIG. 31. Said plates may be supported at their ends from two vertical rods 1434*a* and 1434*b* that are held in the hereinbefore mentioned brackets 1358, 1360 and 1362.

Arranged along the inner edge of each of the eighteen horseshoe plates 1432 for driving engagement by the pins of the aligned circular pin rows 1431 is a semi-circular row of six Geneva gears 1441, 1442, 1443, 1444, 1445 and 1446 (FIG. 33). Each of said Geneva gears has six angularly equi-spaced notches 1447 corresponding to the six egg discharge effecting solenoids 681 to 686 (FIG. 14) at each packing station and adapted to be operatively engaged by the protruding ends of the secondary memory pins 1416 in the aligned circular pin row 1431, when said pins are in effective position. Each Geneva gear (FIGS. 34 and 35) has a tubular stem 1448 that turns upon a vertical stud 1449 which rises from a common U-shaped mounting plate 1450 that is adjustably held upon the horseshoe plate 1432. Arranged along the outer periphery of the semi-circle formed by the six Geneva gears on each horseshoe plate 1432 are six switches (FIGS. 31 and 33) 1451, 1452, 1453, 1454, 1455 and 1456 that lie in the individual power circuits (FIGS. 5C and 5D) of the six consecutive bucket release solenoids 680 disposed adjacent the distributing conveyor at the particular packing station with which a particular secondary memory device is associated. Said switches 1451 to 1456 are bolted to the U-shaped mounting plate 1450 and their condition is controlled by cams 1458 formed on the stems 1448 of the Geneva gears, depending upon the rotary position of said gears. The edges of said cams have each a solitary depression 1460, as shown, and as long as a roller 1462 provided to actuate each of said switches rides on the circular contour 1466 of its respective cam, the switch is held in open position, but when it drops into said depression 1460, the switch will close.

During operation of the machine the rotor 1433 formed by the vertically disposed channels 1424 turns in counterclockwise direction as viewed in FIG. 33 in synchronism with both the distributing conveyor 185 and the memory belt 170 such that in a given time interval the same number of secondary memory pins 1416 will pass a given stationary point as do buckets 186 on the distributing conveyor and channels 1233 on the memory belt. During rotation of said rotor 1433, the pins 1416 projecting from the channels 1424 sweep ineffectively above their respective rows 1431 of Geneva gears as long as they are in their upwardly tilted ineffective position as determined by engagement with their upper limit studs 1328*a*. Mounted upon each horseshoe plate 1432, however, ahead of the first Geneva gear 1441 is the hereinbefore mentioned solenoid 1415 that may be energized by closure of at least one quality switch 1394*a* to 1394*h* and at least one weight switch 1394*j* to 1394*o* in the sector of the memory belt orbit that corresponds to the particular packing station at which the secondary memory device about to be described controls the discharge of eggs from the distributing conveyor. The solenoids 1415 are similar in construction to the hereinbefore described solenoids 1260 that are supported from the oscillating grid 1284 adjacent the descending run of the memory belt, but the actuating ends of their armatures 1468 are preferably formed in the manner of the cross bar of a T as shown at 1470 in FIGS. 31 and 33. With a solenoid 1415 in de-energized condition, said cross bar 1470 is positioned slightly above the level of the circular row of secondary memory pins 1416 with which the solenoid is associated, as shown in FIG. 31. Upon energization of the solenoid 1415, however, coincident with the passage of a secondary memory pin, the cross bar 1470 of its armature bears down upon the passing pin, and shifts it into its downwardly tilted effective position, wherein upon further rotation the pin will successively engage and advance every one of the six Geneva gears upon the adjacent horseshoe plate 1432 over a limited increment.

Figures 36A, 36B, 36C, 36D, 36E, 36F, 36G, 36H:
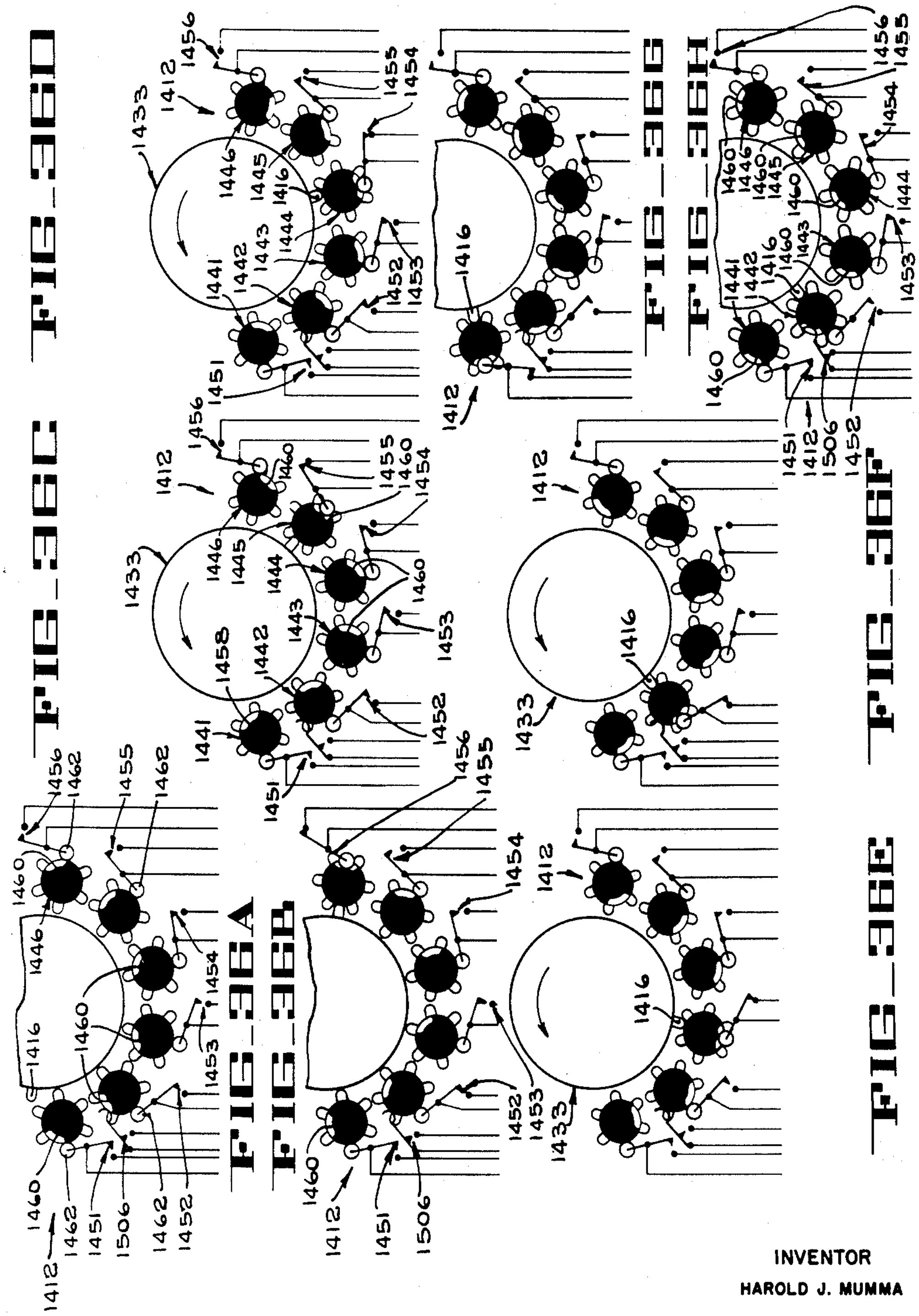

The six Geneva gears upon each of the horseshoe plates 1432 are adjusted to such rotary positions relative to each other that the depressions 1460 in the cams 1458 of consecutive gears, counting backwards from the last gear 1446, trail behind each other by rotary increments equal to the rotary increments by which the gears are advanced when effectively engaged by a secondary memory pin. Initially, i.e. before an egg has been dropped into any of the pockets in the pocket row of a carton or cardboard grid that is held below the distributing conveyor at the corresponding packing station, the Geneva gears are in the position illustrated in FIG. 36A wherein the sixth Geneva gear, i.e., the gear 1446 that is last engaged by a secondary memory pin 1416 in depressed condition, is in such a rotary position that the depression 1460 of its cam 1458 lies directly in front of the roller 1462 of its associated switch 1456 which is the switch that closes the power circuit of the last one 686 of the set of bucket opening solenoids 680 (FIG. 14) on the downstream side of the packing station. Thus, whenever the solenoid 1415 depresses a secondary memory pin 1416 indicating that an egg of the quality and weight combination to be packed at said particular packing station approaches said station on the distributing conveyor, consecutive engagement of said depressed pin 1416 with the consecutive Geneva gears 1441 to 1446 will advance all of said gears by a limited increment which remains without effect upon the switches 1451 to 1455 associated with the first five Geneva gears 1441 to 1445, respectively, but causes the roller 1462 of the sixth switch 1456 to drop briefly into the depression 1460 in the cam of the sixth Geneva gear 1446, as illustrated in FIG. 36B. This closes said switch 1456 temporarily, and as a result thereof the last solenoid 686 in the corresponding battery of bucket opening solenoids 680, i.e., the solenoid on the downstream side of the battery 678, is energized and projects its armature into the path of the noses 675 (FIG. 14) formed on gear segments 673 of the conveyor buckets 186 at the very moment when the bucket carrying the egg which started the described sequence of operations approaches said solenoid, for the pins 1416 of the secondary memory device 1412 advance in synchronism with the advance of the buckets on the distributing conveyor. Hence, the egg will drop into the last pocket of the pocket row presented to the distributing conveyor at the particular packing station.

As previously pointed out, however, passage of the above-described secondary memory pin 1416 in depressed condition past the Geneva gear did not only advance the last Geneva gear 1446, it also advanced each of the five preceding gears 1441 to 1445 by the same increment so that it is now the fifth Geneva gear 1445 that holds the depression 1460 of its cam 1458 directly in front of the roller 1462 of its associated switch 1455. Hence, when the pin activating solenoid 1415 is again energized upon passage of a channel 1233 through sector 226 of the memory belt orbit with pins 1242 thereof in a position to close the power circuit of said solenoid, and another secondary memory pin 1416 is depressed, said pin while advancing all the Geneva gears by equal rotary increments will cause the fifth Geneva gear 1445 to effect closure of its respective switch 1455 (FIG. 36C) with resultant energization of the fifth solenoid 685 in the battery of bucket opening solenoids 680 that corresponds to the sequence of Geneva gears here under consideration.

As best illustrated in FIG. 33, the fifth Geneva gear 1445 is spaced from the sixth Geneva gear 1446 by an angular interval that is smaller than the angular interval between each two consecutive secondary memory pins 1416 by a ratio equal to the ratio of the linear interval between the center points of consecutive egg receiving carton pockets to the linear interval between the center points of consecutive buckets on the distributing conveyor. Measured in angular distance, the fifth Geneva gear 1445 is, therefore, closer to the sixth and last Geneva gear 1446 than the angular interval between two directly consecutive pins 1416, and the second pin 1416 in depressed condition must, therefore, travel a longer distance counted from the point that corresponds to the sector of the memory belt orbit wherein the described sequence of operations is started, to the fifth Geneva gear 1445 than corresponds to the linear dimension of five consecutive buckets on the distributing conveyor. As a result thereof, the bucket that carries the egg which initiated the sequence of operations that resulted in depression of the secondary memory pin 1416 will travel a distance slightly larger than five buckets from the point on the distributing conveyor where its representative channel 1233 on the memory belt 170 released control over its egg, until its representative pin 1416 on the secondary memory device effects energization of the fifth bucket opening solenoid 685 through actuation of the fifth Geneva gear 1445. The bucket will, therefore, reach said solenoid at the very moment when it projects its armature into the path of the nose 675 (FIG. 14) on its gear segment 673 and, hence, the second egg of the proper quality and weight will drop into the fifth carton pocket which is the second pocket counted from the downstream side of the packing station.

As the solenoid 1415 depresses additional secondary memory pins 1416 indicative of the fact that additional eggs of the selected weight and quality combination have come within the length of six buckets from the downstream end of the packing station, the Geneva gears 1441 to 1446 are consecutively advanced by additional increments causing in succession closure of the fourth, third, second and first switches 1454, 1453, 1452 and 1451, respectively, as illustrated in FIGS. 36D, 36E, 36F and 36G, with resultant energization of the fourth, third, second and first bucket opening solenoids 684, 683, 682 and 681 which open succeeding buckets 186 as they carry eggs of the selected quality and weight over the fourth, third, second and first carton pocket counted from the upstream side of the distributing conveyor. In this manner all the pockets in the pocket row of a carton underneath are successively filled with eggs of the proper weight and quality.

To prevent overthrow of any one of the Geneva gears during actuation thereof, the stem 1448 (FIG. 35) of each of said Geneva gears is arranged to form below its switch actuating cam 1458 a six-sided locking cam 1472, one side for each of the six actuating notches 1447 (FIG. 33) in the edge of the gear, and a pawling arm 1474 pivotally mounted upon the U-shaped plate 1450 adjacent each gear is yieldably held against the edge of said locking cam 1472 by means of a coil spring 1476 as illustrated in FIG. 35.

To avoid misoperation of the described mechanism, it will be apparent that the pin shifting solenoids 1415 comprised therein must be energized at the very moment when a vertical row of secondary memory pins 1416 passes by, because premature energization of a solenoid 1415 would cause the T-bar 1470 of its armature 1468 to pass ineffectively underneath the pin that it should have depressed. To accurately time the energization of the solenoids 1415 with the passage of the vertical pin rows, a master switch 1478 is, therefore, connected in series with said solenoids 1415 (FIGS. 5C, 5D and 32) and the position of said master switch is controlled by a cam 1480 formed by two relatively adjustable, superposed cam discs 1482*a* and 1482*b* that are mounted upon the main shaft 1356 of the secondary memory mechanism, such that the master switch 1478 is normally open, but is allowed to close briefly at the very moment when a vertical pin row passes by the superposed solenoids 1415 upon the eighteen superposed horseshoe plates 1432 comprised in the egg handling machine.

Having reference to FIG. 32, said master switch 1478 is mounted upon an annular base plate 1484 which surrounds the shaft 1356 near the bottom end thereof, and comprises a conductive lever 1486 that is mounted for rotation about a vertically disposed stud 1488. Said lever has its tail end engaged by a conductive spring 1490 which urges a double-pronged nose 1492 thereof into contact with the ends of two parallel adjustable contact bolts 1494*a* and 1494*b*. On the side opposite the spring 1490, however, the tail end of lever 1486 engages the contour of the cam 1480 at a point angularly aligned with the T-bars 1470 of the eighteen vertically superposed pin shifting solenoids 1415. The edge of the cam 1480 forms a sequence of equally spaced recesses 1496 that are in angular alignment with the vertical pin rows 1416. When the tail end of the switch lever 1486 is engaged by the lobes 1498 formed between each two consecutive recesses 1496 in the edge of the cam 1480, the switch 1478 is held open, but when it drops into the recesses 1496 under the urgency of spring 1490—which is the case whenever a pin row passes by the armatures 1468 of the eighteen superposed solenoids 1415—the switch 1478 is momentarily closed. It is only then that any one of the solenoids 1415 may be energized by passage of memory belt channels 1233 with the proper weight and quality setting through corresponding sectors of the memory belt orbit.

To accurately time the previously described oiling operation of individual eggs so that a jet of oil ejected from the oiling nozzle will be confined to the egg for which it is intended, a similar master switch 1500 may be connected in series into the power circuit of the solenoid 713*a* that controls the valve 713 for the spray nozzle 705 (FIG. 8). Said switch 1500 may be supported from the under side of the same annular plate 1484 upon which the master switch 1478 for the pin setting solenoids 1415 is mounted, and may be controlled from a cam 1502 that is similar to cam 1480 and which is likewise mounted upon the main shaft 1356 of the secondary memory device as best shown in FIG. 32.

Figure 11:
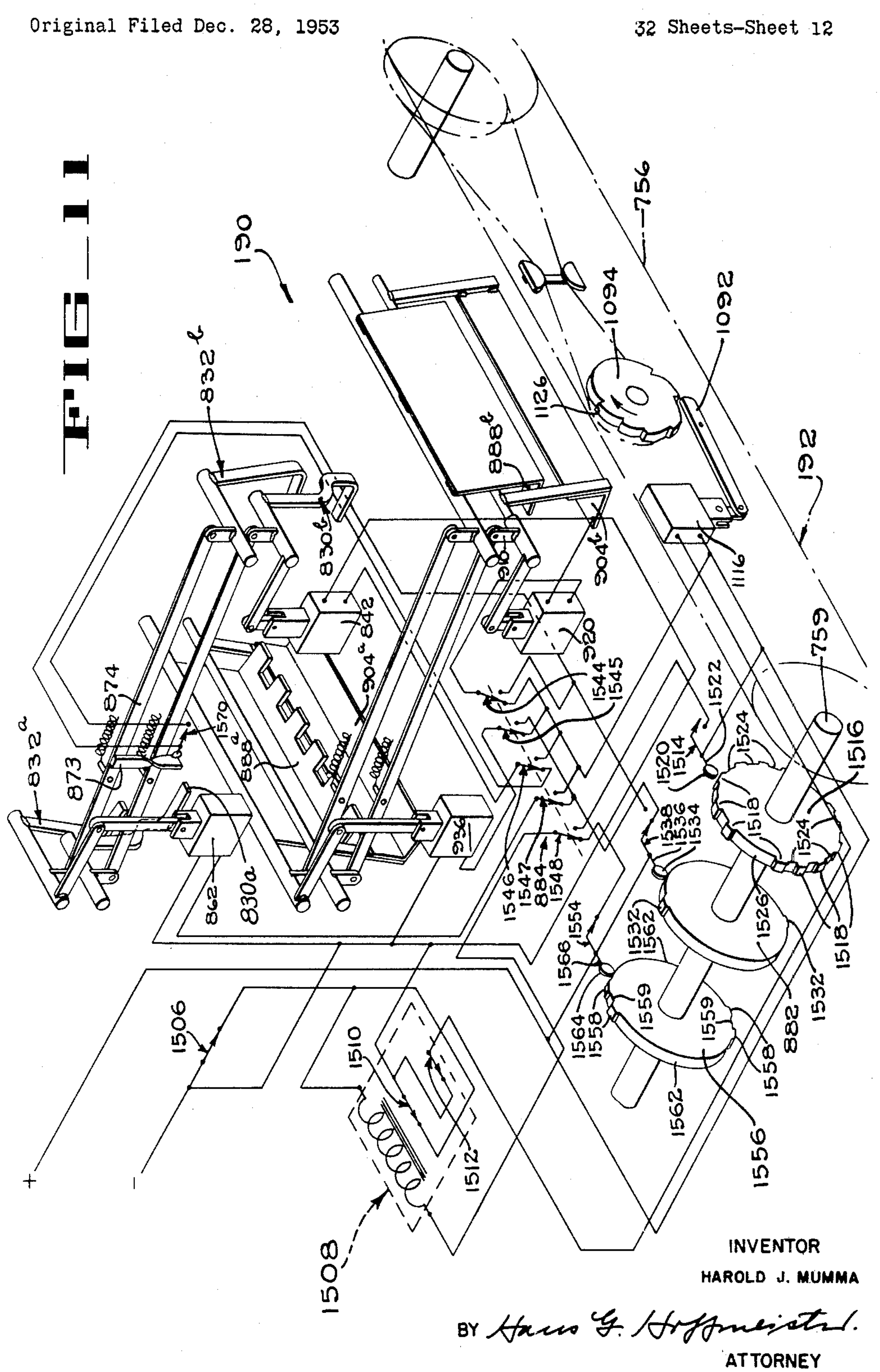
FIG. 11 is a perspective diagram illustrating the electrical circuits of each packing station and the mechanical components controlled thereby.
Figure 13:
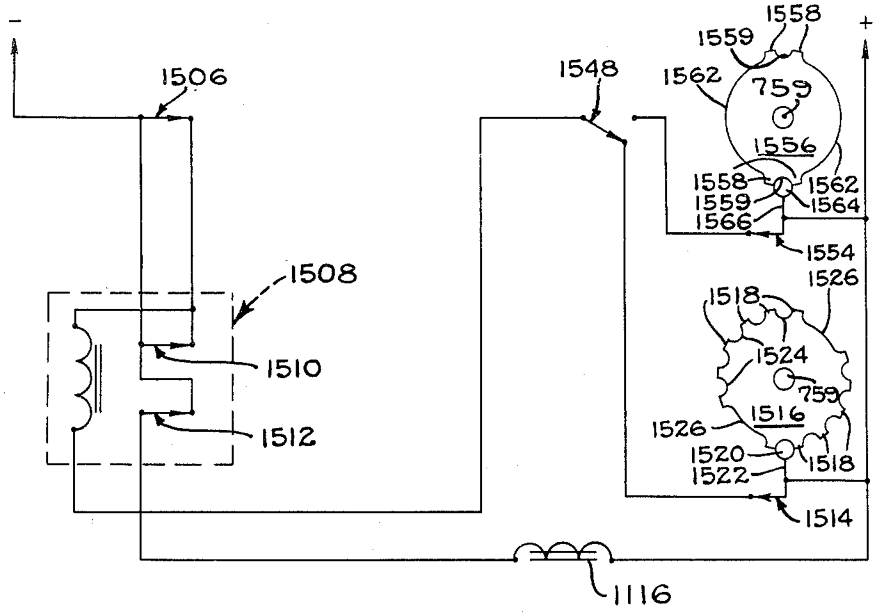

Reverting to the operation of the secondary memory device, after all six switches 1451 to 1456 of one of the eighteen auxiliary memory mechanisms 1412 have been consecutively closed in a direction opposite to the order named, and all six pockets of a pocket row presented to the distributing conveyor at a particular packing station have been filled with eggs of the proper weight and quality, the carton or cardboard grid which forms said pocket row must be shifted so that a consecutive row of pockets will lie below the distributing conveyor before another egg of the proper weight and quality is released from said conveyor under control of the secondary memory mechanism. Means are, therefore, provided in accordance with the invention that cause advance of the carton or cardboard grid underneath the distributing conveyor so as to place a new row of pockets underneath said conveyor whenever an egg has been dropped into the last pocket of the preceding pocket row, which is the pocket on the upstream side of the packing station. Release of the egg that dropped into said last pocket was effected by operative engagement of a depressed secondary memory pin 1416 with the first Geneva gear 1441 in the sequence of six Geneva gears, which engagement caused temporary closure of the switch 1451 that energizes the first solenoid 681 of the bucket opening solenoids 680 adjacent the distributing conveyor at the particular packing station. After having actuated said first Geneva gear 1441 (FIG. 36G), the depressed pin 1416 engages and advances consecutively all the remaining Geneva gears 1442–1446, as previously explained. The incremental advancement of the second Geneva gear 1442 by said memory pin 1416 is arranged to move the depression 1460 in cam 1458 of said gear 1442 past the arched actuating end 1504 of another normally open switch 1506 (FIG. 36H) to cause brief closure thereof. Each of the U-shaped plates 1450 carries such a switch 1506 between the first and second egg releasing switches 1451 and 1452, respectively, as shown in FIGS. 31 and 33, and each such switch 1506 lies in the power circuit of a relay 1508 (FIGS. 11 and 13) that is secured to a mounting plate (not shown) at the rear of the carton magazine 191 (FIG. 10) at the particular packing station 190 at which the secondary memory device 1412 controls the discharge of eggs from the distributing conveyor. The packing stations, including the magazine and the carton feed conveyors therefore, are described in detail in my aforementioned copending application. Upon energization, said relay 1508 (FIGS. 11 and 13) causes closure of a holding switch 1510 that maintains it in energized condition even after the switch 1506 has returned to open position. Energization of the relay 1508 also effects closure of another switch 1512 which lies in the power circuit of a ratchet control solenoid 1116 (FIG. 11). As a result, the solenoid 1116 is energized and withdraws a latching pawl 1092 from a ratchet 1094 permitting said ratchet to follow the rotative force of the driven side of a friction clutch, which is described in my previously mentioned copending application. The carton supply conveyor 192 commences to advance moving the filled pocket row of a carton or cardboard grid beyond the distributing conveyor, while advancing a directly succeeding pocket row into egg receiving position below said conveyor. To limit advance of the conveyor to whatever distance is required to place a succeeding pocket row of a cardboard grid, or the first pocket row of a succeeding cardboard grid, into egg receiving position below the distributing conveyor—assuming that a particular packing station has been adjusted to handle cardboard grids—a normally closed switch 1514 is interposed in the power circuit of the hereinbefore mentioned relay 1508 (FIGS. 11 and 13). The position of said switch 1514 is controlled by a cam 1516 that is firmly mounted upon a conveyor shaft 759 adjacent one side of a magazine release cam 882. Said cam 1516 is a two-cycle cam, and carries two sets of six consecutive lobes 1518 of narrow angular width. Each of the lobes 1518 is adapted, upon engagement with a roller 1520 upon the actuating arm 1522 of switch 1514 (FIGS. 11 and 13) to move said switch from its normally closed position to open position. Thus, when during advance of the conveyor the roller 1520 on switch arm 1522 encounters a lobe 1518 on the cam 1516, the switch 1514 is thrown open which causes de-energization of the relay 1508 and consequent opening of the holding switch 1510 and of the control switch 1512 in the power circuit of the ratchet release solenoid 1116. As a result, the ratchet release solenoid is de-energized permitting the nose of the latching pawl 1092 to drop back onto the edge of the ratchet 1094 and engage the next tooth thereof which positively blocks further rotation of the ratchet causing the conveyor to come to a halt with the roller 1520 on switch arm 1522 engaging the depression 1524 in cam 1516 beyond the lobe 1518 that effected opening of switch 1514. As a result, the switch 1514 is closed again, and the described mechanism is ready for another operational cycle to be initiated by energization of the relay 1508.

The depressions 1524 that separate the consecutive lobes in each set of lobes of cam 1516 are of limited angular width corresponding to the advance of the feed conveyor necessary to move a succeeding row of pockets into alignment with the distributing conveyor, while the depressions 1526 between each two consecutive sets of lobes are of larger angular width corresponding to the advance of the feed conveyor necessary to move the first row of a new cardboard grid into alignment with the distributing conveyor.

Whenever the fourth pocket row of a cardboard grid has been filled with eggs and the above described mechanism moves the fifth pocket row of the cardboard grid below the distributing conveyor, it is time that a fresh cardboard grid be dropped from the magazine onto the feed conveyor. For this purpose, the previously mentioned cam 882 is mounted upon the conveyor shaft 759 in such a rotary position that two diametrically opposite lobes 1532 thereof are in angular alignment with the depressions 1524 between the fifth and sixth lobes 1518 in the two sets of lobes provided in the edge of cam 1516 as illustrated in FIG. 11. Hence, whenever a fifth lobe 1518 upon cam 1516 has moved beyond the roller 1520 on switch arm 1522 indicative of the fact that the fifth row of a cardboard grid is being filled with eggs from the distributing conveyor, one of the lobes 1532 of cam 882 engages a roller 1534 provided on the arm 1536 of a two-way switch 1538 (FIG. 12) moving said switch from a position wherein it closes a power circuit through a control solenoid 936 of the upper pair of cardboard grid retaining flanges **888*a* and 888*b* to a position wherein it interrupts said last mentioned power circuit and closes a power circuit through a control solenoid 920 of the lower cardboard grid retaining flanges 904*a* and 904*b*. As a result thereof, the upper flanges 888*a* and 888*b* (FIG. 11) are projected into the magazine 191 and engage underneath the second lowest cardboard grid in the stack within said magazine, while the lower retaining flanges 904*a* and 904*b* are retracted so that the lowermost grid in the magazine is free to drop upon the feed conveyor 192 in front of an impeller 755. When the fifth pocket row of the preceding cardboard grid has been filled with eggs from the distributing conveyor, and the secondary memory pin 1416 that operated to release an egg into the last pocket of said pocket row effects closure of the switch 1506 and the energization of relay 1508, the resultant energization of the solenoid 1116 effects withdrawal of the latch pawl 1092 from the sixth tooth 1126 of the ratchet 1094 permitting the conveyor to advance by a distance sufficient to place the last pocket row of the preceding cardboard grid below the distributing conveyor. The accompanying rotation of the conveyor shaft 759 (FIG. 11) moves the lobe 1532 of the magazine control cam 882 beyond the roller 1534 of control switch 1538 (FIG. 12) permitting said switch to return from the position wherein it energized the control solenoid 920** of the lower grid retaining flanges to the position wherein it energizes the control solenoid 936 of the upper grid retaining flanges. As a result thereof, the lower grid retaining flanges return to their initial position wherein they are projected into the magazine while the upper grid retaining flanges are withdrawn from the magazine and permit the stack of superposed cardboard grids in the magazine to drop onto the lower grid retaining flanges. Hence, the grid release mechanism at the bottom of the magazine is restored to its initial position wherein it is ready to supply another cardboard grid onto the feed conveyor. As the sixth pocket row of a cardboard grid is being filled with eggs from the distributing conveyor, the roller 1520 on the arm 1522 of the conveyor advance control switch 1514 lies directly behind the sixth lobe on the cam 1516 and faces a large depression 1526 in the edge of said cam. Therefore, when an egg has been deposited into the last pocket of said sixth pocket row and the secondary memory pin 1416 that effected release of said last egg from the distributing conveyor effects closure of switch 1506, the resultant advance of the carton supply conveyor 192 will be substantially longer than in the preceding five instances, and will place the new cardboard grid with its first row into egg receiving position below the distributing conveyor while advancing the filled cardboard grid within reach of power driven transfer rollers 1190 (FIG. 9) that draw it away from the packing stations and place it upon the take-off ramp 193.

During the described operation, two solenoids 842 and 862 (FIG. 11) that control the position of carton retaining fingers 830*a*, 830*b*, and 832*a*, 832*b*, respectively, are maintained in energized condition to disable said fingers by keeping them in a position withdrawn from the magazine. Whenever a packing station is to handle two-row cartons instead of six-row cardboard grids, the magazine is adjusted in the manner described in my aforementioned copending application, and an actuating lever at the side of the packing station is manipulated in the manner explained in my just-mentioned copending application to raise a carton retaining member 992 (FIG. 10) above the conveyor chains 756*a* and 756*b* into operative position. Furthermore, the previously mentioned switching mechanism 884 is manipulated by means of an actuating arm, not shown, which throws five two-way switches 1544, 1545, 1546, 1547 and 1548, respectively (FIG. 11) from a position wherein they establish electrical circuits that permit the above described operations for the release of cardboard grids from the magazine and for the intermittent advance of said cardboard grids on the feed conveyor, into a position wherein they establish circuits that permit appropriate control of the carton release fingers and wherein the intermittent advances of the feed conveyor are modified to handle two-row cartons.

Figure 12:
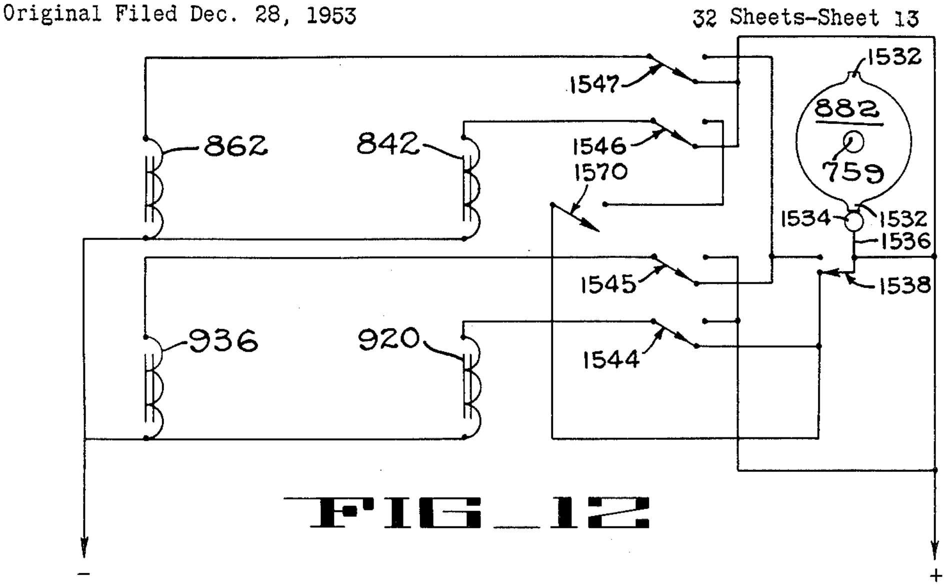
FIGS. 12 and 13 are simplified diagrams of the circuit arrangement illustrated in FIG. 11, showing different operational positions thereof.

Having reference to FIGS. 11, 12 and 13, the switches 1544 and 1545 are moved from the position illustrated in FIG. 12 wherein they subject energization of the solenoids 920 and 936 for the control of the cardboard grid retaining flanges, to the position of the cam controlled switch 1538 into a position wherein said solenoids 920 and 936 are permanently energized so that said retaining flanges are permanently withdrawn from the magazine, (FIG. 11). Vice versa, the switches 1546 and 1547 are moved from the position illustrated in FIG. 12 wherein they maintain the control solenoids 842 and 862 of the carton retaining fingers in a permanent state of energization, into a position (FIG. 11) wherein they subject energization of said solenoids 842 and 862 to the position of the aforementioned cam controlled switch 1538. In addition, manipulation of a rod cam, not shown, moves a fifth switch 1548 from the position illustrated in FIG. 13 wherein the energization of the relay 1508 may be interrupted by opening of the normally closed switch 1514 whose position is controlled by the twelve lobes 1518 of cam 1516 into a position wherein energization of said relay 1508 may be interrupted by opening of a normally closed switch 1554 whose position is determined by another cam 1556 that is also mounted upon the repeatedly mentioned conveyor shaft 759 (FIGS. 11 and 13). Said cam 1556 operates in a manner analogous to the cam 1516 but instead of having two sets of each six lobes 1518 it is provided with two sets of each two lobes 1558 that are angularly aligned with the fifth and sixth lobes of cam 1516 and correspond to the two pocket rows formed by cartons 767 of the type illustrated in FIG. 9, and while said two lobes 1558 are separated from each other by a depression 1559 of an angular width equal to the depression 1524 that separate the lobes 1518 in the two sets of lobes of cam 1516, the depression 1562 between the two sets of lobes 1558 on cam 1556 is much wider than the corresponding depressions 1526 on cam 1516 and extends in addition to a distance equal to the depression 1526 over a distance corresponding to the total angular width of the first four lobes 1518 in each set of lobes of cam 1516.

Hence, whenever the roller 1564 on switch arm 1566 (FIG. 13) has negotiated a second lobe 1558 on cam 1556 which corresponds to a sixth lobe 1518 on cam 1516, and faces a depression 1562 on said cam 1556, closure of the switch 1506 on the secondary memory device upon the delivery of a last egg into the second pocket row of a carton 767 of the type illustrated in FIG. 9 will cause energization of the latch control solenoid 1116 with resultant movement of the carton feed conveyor 192 in the same manner as described in connection with cam 1516, but the solenoid 1116 will remain energized, and the conveyor will continue to advance, until the cam 1556 has turned over an arc of an angular width equal to a depression 1526 and four lobes 1518 of cam 1516. As a result the carton feed conveyor 192 will advance by a distance equal to the interval between two cardboard grids on the conveyor 192 plus the total width of four consecutive pocket rows, which places the first pocket row of a carton 767 of the type illustrated in FIG. 9 into egg receiving position below the upper run of the distributing conveyor. Then, as soon as the conveyor 192 comes to a halt with the roller 1564 on the arm 1566 of switch 1554 situated in the depression 1560 between the two lobes of a set of lobes on cam 1556, one of the lobes 1532, on cam 882, which is angularly aligned with the depression 1520 between the fifth and sixth lobes on cam 1516 and hence with the depression 1559 between the first and second lobes 1558 on cam 882, actuates the switch 1538 and closes a power path through the solenoid 842 for the lower fingers of the carton control gate on the carton magazine while opening a formerly closed power path through the solenoid 862 for the upper fingers of said gate mechanism. As a result thereof, the lower fingers are withdrawn from the magazine permitting a carton to drop onto the feed conveyor as the first pocket row of the preceding carton is filled with eggs, while the upper fingers of the gate mechanism are projected into the magazine to block descent of the remaining cartons in the magazine. Then, after the first pocket row of the carton has been filled with eggs, and the conveyor advances again upon closure of switch 1506 on the secondary memory device by the secondary memory pin 1416 which releases the last egg into the pocket on the upstream side of the packing station, the lobe 1532 on cam 882 passes the switch arm 1536 permitting the switch 1538 to return to its original position wherein it opens the power circuit through the solenoid 862 and closes a power path through the solenoid 842. This returns the carton gate mechanism of the magazine to its original position wherein it is ready for another operational cycle as soon as the other lobe 1532 on the cam 882 actuates the arm 1536 of switch 1538.

To make certain that the lower carton retaining fingers 830*a* and 830*b* of the gate mechanism for the cartons are not withdrawn from the lowest carton in the magazine until the upper fingers 832*a* and 832*b* have moved underneath the second lowest carton, a normally open switch 1570 (FIGS. 11 and 12) is connected in series into the power circuit of the actuating solenoid 842 for the lower fingers, and the actuating solenoid 862 for the upper fingers is arranged to close said switch whenever it is in de-energized condition. For this purpose, said switch 1570 shown diagrammatically in FIG. 11, is secured to a mounting plate (not shown), and an arm 873 rigidly secured to an interponent 874 in the power train of the solenoid 862 is arranged to bear against the actuating roller of said switch and maintain the switch in closed condition as long as the solenoid 862 remains de-energized. Whenever the solenoid 862 is energized, however, which means that the upper fingers are withdrawn from the magazine, the arm 873 is withdrawn from the actuating roller of switch 1570 and said switch is open and interrupts the power circuit of the solenoid 842 for the lower fingers so that said last mentioned solenoid cannot be energized and said lower fingers remain in carton retaining position. As soon as the upper solenoid 862 is de-energized, however, by the action of cam 882 in the manner described hereinbefore and permits the upper fingers to project into the magazine, the concomitant movement of interponent 874 brings the arm 873 against the actuating roller of the switch 1570 and closes said switch, which places the power circuit of the actuating solenoid 842 for the lower fingers into condition for energization and permits withdrawal of said lower fingers.

Reverting to the secondary memory device, after the secondary memory pin 1416 that caused release of the last or sixth egg into the last pocket of a pocket row has passed the second Geneva gear 1442 where it initiated the above described operations for placing another row of pockets underneath the distributing conveyor, it passes all the remaining Geneva gears 1443–1446 advancing them by rotational increments corresponding to the angular distance between two consecutive ones of their notches, and in passing the sixth Geneva gear 1446 it places the same into its initial position, as illustrated in FIG. 36A, wherein the switch actuating depression 1460 in its cam 1458 lies again directly ahead of the actuating roller 1462 of the power switch 1456 for the sixth egg releasing solenoid 686. Hence, engagement of said sixth Geneva gear by a subsequent memory pin 1416 in depressed condition will cause said sixth egg releasing solenoid 686 to drop a first egg into the next pocket row presented to the distributing conveyor at the particular packing station. Thus, when another egg of the proper weight and quality approaches the packing station here under consideration and causes energization of the pin setting solenoid 1415 corresponding to said station, the secondary memory pin 1416 depressed by energization of said solenoid will have to travel all the way to the sixth Geneva gear 1446 before it causes energization of an egg release solenoid. The next egg released from the distributing conveyor at the particular packing station is dropped into the sixth pocket on the downstream side of a new pocket row that has meanwhile been moved below the distributing conveyor. Due to the fact that a pocket row receives its last egg from the distributing conveyor at the upstream side of the packing station, and the next egg of the same quality and weight combination, which is the first egg to be dropped into the succeeding pocket row, is dropped into the pocket on the downstream side of the packing station, ample time is provided for the operations that move a new carton row into egg receiving position below the distributing conveyor even if the next egg to be discharged from the distributing conveyor at the particular packing station follows directly behind the egg that was dropped into the last pocket of the preceding pocket row.

Figure 15:
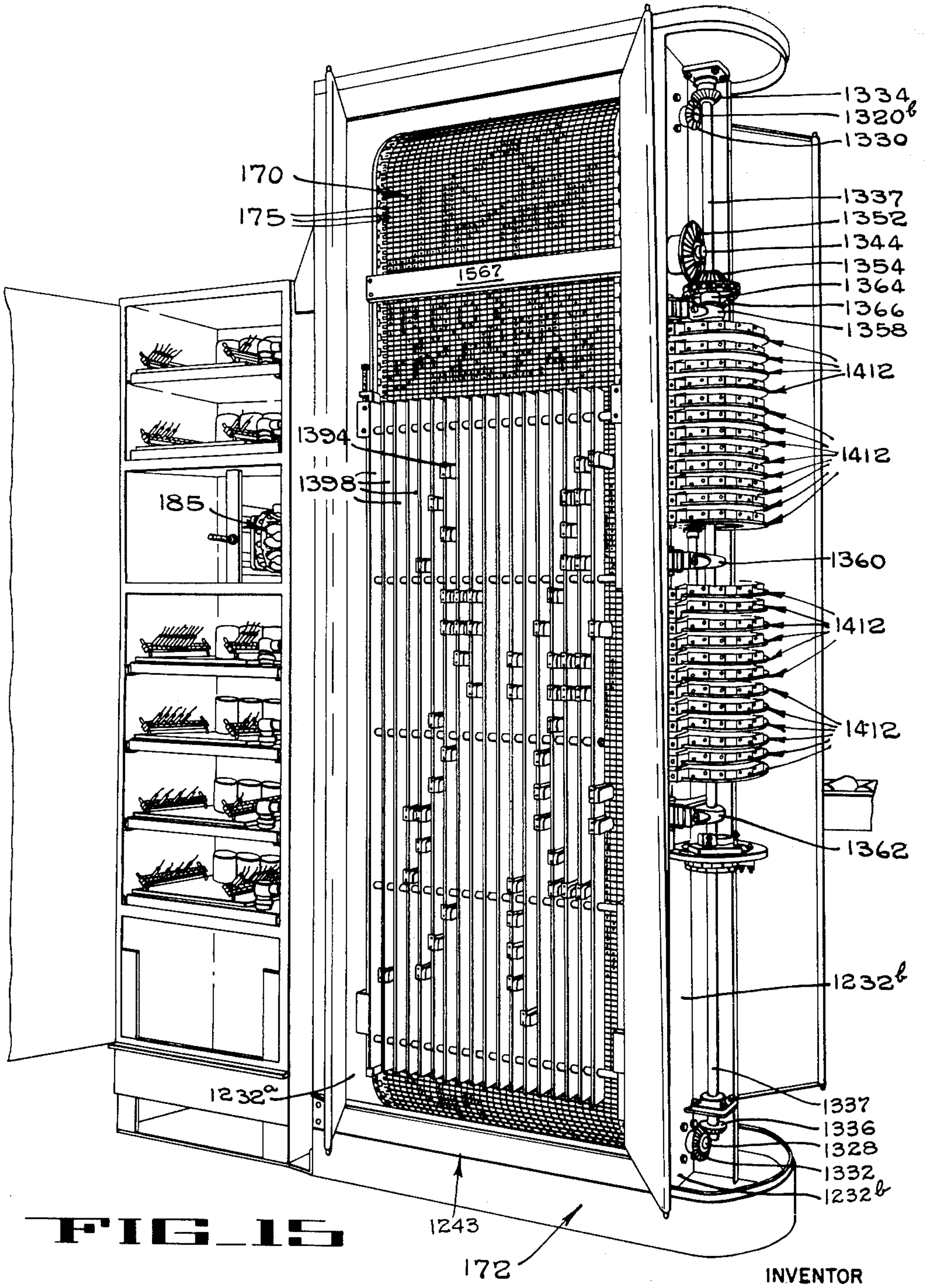
FIG. 15 is a perspective of a rotary control mechanism, hereinafter to be referred to as the memory belt, upon which the quality and weight of eggs delivered to the machine are recorded and which in turn controls release of the eggs from the distributing conveyor at predetermined packing stations along the terminal run thereof.

After a channel 1233 of the memory belt has passed through all the sectors 226 to 331, inclusive, to the eighteen packing stations comprised in the machine, and has initiated the release of the egg, that it represented, at one of said packing stations in the manner described hereinbefore, all the activated memory pins on said channel must be returned to their neutral positions before the channel returns over the upper sprockets 1222*a* and 1222*b* of the memory belt to the descending run thereof so that said channel may be ready to record the quality and weight of another egg delivered to the machine while passing through the descending run of the memory belt. For this purpose, a transverse bar 1567 is bolted at its opposite ends to the outer guide bars 1227 of the ascending run of the memory belt above the level of the vertical mounting bars 1398 as shown in FIGS. 15, 17A, and 18A, and held by said bar 1567 adjacent every one of the pin rows 1243 of the memory belt are slightly inclined camming plates 1568 as shown in FIG. 29 that are arranged to engage the heads of all activated pins 1242 and shift them gradually into their neutral positions, as they travel past said plates. Hence, whenever a channel 1233 has passed the bar 1567, all its quality and weight recording pins 1242 are in their neutral positions and are ready to again record the quality and weight of an egg delivered into the machine.

Similarly, after a secondary memory pin 1416 in depressed condition has consecutively passed and actuated all six Geneva gears 1441 to 1446, it must be returned to its ineffective position so that it may again represent an egg that is to be discharged from the distributing conveyor at the particular packing station represented by said same six Geneva gears. For this purpose, upwardly slanting camming plates 1569 are provided at the rear end of the rotor formed by the vertically disposed channels 1424 adjacent each circular row 1431 of memory pins 1416. Thus, after a depressed pin has passed the sixth Geneva gear 1446, it slides over the lower end of a cam plate 1569 and as the pin continues its rotary course, it is cammed upwardly into its ineffective position.

While I have described my invention with the aid of a particular embodiment thereof, it will be understood that I do not wish to be limited to the specific constructional details illustrated and described which may be departed from without departing from the spirit of the invention.

Also, while my invention as illustrated in the accompanying drawings and as described in the specification was specifically devised and is employed in the processing of eggs, it will be understood that the principles of the invention may also be usefully employed in the separation of other articles, such as avocadoes, lemons, or other highly priced fruit.

Having thus described my invention, what I claim as new and desire to protect by Letters Patent is:

1. A data storage mechanism comprising a first memory device having an endless belt, means operable to drive said belt along a predetermined path, rows of pins extending parallel to a rotary axis of said belt, said pins being pivotally supported from said belt in consecutive sectors of the peripheral surface thereof for individual adjustment from an ineffective position to an effective position and corresponding pins of consecutive rows of pins being aligned in a direction longitudinally of the belt periphery to form longitudinal extending pin files, a first suppporting structure disposed at a predetermined station along said path and arranged adjacent said belt along and exteriorly of the peripheral surface of said belt, solenoids held by said supporting structure opposite said pin files and operative upon energization to shift selected pins of said pin files from the ineffective to the effective position for storing information, a second supporting structure disposed at a subsequent station along said path and aranged adjacent said belt along and exteriorly of the peripheral surface of said belt, switches held by said second supporting structure opposite said pin files in such a manner that they are actuated by pins in the effective position, a second memory device including a rotor, a circular row of pins pivotally supported from said rotor for individual adjustment from an ineffective to an effective position, a plurality of Geneva gears rotatably mounted in an arc around said rotor in such a manner that the recesses in the peripheries of said Geneva gears are drivingly engaged by the pins of said rotor that are in the effective position, normally open switches associated with each of said Geneva gears, means on said Geneva gears adapted to close said normally open switches, and means responsive to the actuated switches of said second supporting structure and operable to move said pins of said rotor from the ineffective to the effective position for transferring information from said first memory device to said second memory device to store the information in said second memory device.

2. A memory device comprising an endless flexible belt mounted for movement in a circuitous path and having an elongated, substantially straight first run, transversely extending rows of pins movably supported on said belt in consecutive sectors thereof for individual adjustment from an ineffective to an effective position, the individual pins of consecutive pin rows being aligned in a direction longitudinally of the path to form longitudinally extending pin files, means for imparting continuous movement to said belt in its path whereby said first run is moved longitudinally thereof in a predetermined direction, a support positioned opposite to said first run of said belt, solenoids mounted on said support in individual alignment with said pin files, and means mounting said support for orbiting movement about an axis extending transversely of said run and in synchronism with said belt thereby intermittently moving said solenoids in said predetermined direction with and at substantially the same speed as said first run and in opposed relation to selected pins on said run whereby energization of said solenoids during such intermittent movement causes said solenoids to engage said selected pins and to move them to effective positions.

3. In an article handling apparatus wherein articles of different classifications are fed from each of several stations onto a conveyor at spaced points therealong and are moved by said conveyor in uniformly spaced relation along a path, an apparatus for recording the presence of every article on the conveyor comprising a support movable in timed relation with said conveyor along a predetermined line of travel; longitudinally and transversely extending rows of recording members on said support, each member being movable into a recording position upon actuation; a plurality of groups of actuators mounted opposite to said support, there being a group of actuators for each station and an actuator in each group for each classification at its respective station, each group of actuators extending diagonally of said line of travel so that there is an actuator in each group in substantial alignment with a longitudinal row of recording members, the longitudinal spacing between successively adjacent actuators in each group corresponding to the spacing between articles successively delivered to said conveyor from the station associated with such group, and the spacing between successively adjacent longitudinally aligned actuators corresponding to the spacing between said feeding points of adjacent stations; and means responsive to the feeding of each article from each station for activating the corresponding actuator whereby the latter actuates a recording member which is then opposite thereto.

4. In an article handling machine, means for conveying articles from a plurality of stations along a predetermined path with the articles being spaced longitudinally along said path, means for simultaneously feeding articles of several different classifications from each station onto said conveying means at delivery points spaced longitudinally of said path, a support movable along a predetermined line of travel, recording members connected to said support and arranged in rows extending transversely and longitudinally of said line of travel, said recording members having effective and ineffective conditions, actuating means for placing said members in effective condition in response to the feeding of articles of different classifications from said stations onto said conveying means so that each article on said conveying means is represented by a member in effective condition, and means for motivating said conveying means, said feeding means, and said support in timed relation to each other so that articles successively delivered from each station are spaced longitudinally of said conveying means and articles delivered from each station are offset from articles from every other station, and so that members placed in effective condition by such deliveries are spaced longitudinally of said line of travel by amounts corresponding to the spacing of corresponding articles on said conveying means.

5. In an article handling machine, a single file conveyor including uniformly spaced cups movable past a plurality of article feeding stations; means at each station for delivering the articles to the cups; a single memory device for recording the presence of articles fed to said conveyor from all of said stations, said device being movable along a predetermined path and including movable recording members uniformly spaced longitudinally and transversely of said path, and a plurality of actuating means mounted in longitudinally spaced relation along said path for moving recording members opposite thereto upon activation of said actuating means, each actuating means being associated with a station; means responsive to the feeding of each article from each station onto said conveyor for activating its associated actuating means whereby one of said members is moved to record the presence of such article on the conveyor; and means for motivating said conveyor, all of said delivering means, and said memory device in timed relation to each other so that within a given time interval, the number of cups passing one of said stations is equal to the number of members passing one of said actuating means and so that the number of cups separating articles successively delivered to said conveyor from said delivering means at one station is equal to the number of stations less one, the spacing between points of delivery of adjacent stations corresponding to the longitudinal spacing between successively adjacent actuating means and being such that articles successively delivered from adjacent stations are spaced along said conveyor whereby corresponding successively activated actuating means move members that are spaced longitudinally of said path.

6. In an article handling machine, a main conveyor including a procession of cups; a plurality of delivery stations spaced along said conveyor; means for delivering articles of several different classifications from each station to said cups so that the number of cups separating successive articles delivered from any one station is equal to the number of stations less one, the number of cups separating the points of delivery of adjacent stations being equal to the number of stations less two or a multiple of the number of stations less two; a support mounted for movement along a predetermined path; a plurality of longitudinally and transversely extending rows of recording members borne by said support, said members being movable between effective and ineffective positions; a plurality of groups of actuators mounted in spaced relation to each other opposite to said support with each group being associated with a delivery station, with each actuator in each group corresponding to one of the classifications of the articles at its respective station, and with the actuators in each group being spaced both longitudinally and transversely of said path, there being an actuator in each group in alignment with a longitudinal row of said members, the number of transverse rows between successive actuators in each group being equal to the number of cups separating successive articles deliverable from the station associated with such group, and the number of transverse rows separating longitudinally aligned actuators in adjacent groups being equal to the number of cups between said points of delivery; means for motivating said conveyor, said delivery means and said support in timed relation to each other, said actuators, upon activation, being adapted to move an opposed member in an aligned row from ineffective to effective position; and means at each station individually responsive to the delivering of articles of said classifications for activating the corresponding actuators whereby the presence of an article in a cup is recorded by movement of a member in one of said rows into effective position.

7. In an article handling machine, a main conveyor providing a procession of uniformly spaced cups; a plurality of article feeding stations providing article delivery points spaced along said conveyor; a recording device including a plurality of uniformly spaced sectors movable along a predetermined path, said sectors extending transversely of said path, a row of pins mounted in each sector for movement between effective and ineffective positions, the pins in successive rows being aligned in files extending longitudinally of said path, a plurality of groups of pin actuators mounted along said path opposite to said sectors with the actuators in each group lying along a diagonal with respect to said files, each actuator being individually associated with a pin file, each file thereby having associated therewith a longitudinally aligned series of actuators including actuators from the several groups in corresponding transverse positions so that activated actuators can move certain pins in their respective file as said pins pass by said actuators, the number of sectors between successive actuators in each series being equal to the number of cups between the points of delivery of adjacent feeding stations; means for delivering articles of different classifications from each station onto said conveyor with each article from each station being delivered to a cup at its respective delivery point; means for moving said conveyor, said recording device and said delivering means in timed relation, there being one group of actuators for each station with each actuator in each group representing one of the classifications at its respective station, the number of sectors between successive actuators in each group being equal to the number of cups between articles successively delivered from its corresponding station; and means responsive to the presence of articles of said classifications at said stations for activating corresponding actuators.

8. A combined data sorting and control device comprising an endless belt mounted for movement in a circuitous path and having a run; transversely extending rows of pins movably supported on said belt in consecutive sectors of the peripheral surface thereof for individual adjustment from an ineffective to an effective position, the individual pins of consecutive pin rows being aligned in files extending longitudinally of the belt; means for imparting continuous movement to said belt in its path whereby said run is moved longitudinally thereof in a predetermined direction; a support positioned opposite to said run of said belt; control members mounted on said support in individual alignment with said pin files, and means mounting said support for oscillating movement in synchronism with said belt thereby intermittently moving said control members in said predetermined direction with said run and in opposed relation to selected pins whereby said control members are positioned for engagement with selected pins, one of said control members being a switch including an actuating arm having a free end, a pivotally supported lug having a head end in opposed relation to the pins in one of said files and a tail end overlaying the free end of said actuating arm whereby a pin in effective position engages said head to pivot said lug and actuate the switch through said arm, and rotation limiting stop means preventing disengagement of said tail end from said free end.

9. In an article handling machine including means for conveying articles of several different classifications along a path and batteries of selectively operable discharge members spaced along said path for releasing articles from said conveying means at spaced positions corresponding to the locations of said discharge members, a first rotary memory device including a plurality of recording sectors circumscribing a first axis of rotation, a rotor having a second axis of rotation and including a plurality of secondary rotary memory devices individually associated with said batteries of discharge members, each secondary device including a plurality of recording members circumferentially spaced about said second axis of rotation, means coupling each secondary recording member to a discharge member in its associated battery so that said discharge members are actuated in succession longitudinally of said path upon activation of their associated recording members successively about said second axis, means for recording the presence of each article being conveyed and its classification on a separate sector of said first memory device during an initial interval of travel of said first device, and control means individually associated with said secondary devices and being positioned along subsequent intervals of travel of said first device for activating said secondary members in succession about the second axis to record on each secondary device all articles of a common classification whereby all articles of a common classification are discharged at a separate position along said path.

10. A data storage mechanism comprising a first memory device including a support having a peripheral surface and primary pins mounted on and projecting outward from said surface and being movable between effective and ineffective positions, means mounting said support for circuitous travel of said primary pins about a first axis successively past first and second stations spaced circumferenetially about said axis, a second memory device including a second support and a plurality of secondary pins mounted on said second support, said secondary pins being movable between effective and ineffective positions, means mounting said second support for travel of said secondary pins about a second axis, common drive means for imparting continuous and simultaneous movement to said supports thereby to move their associated pins about their respective axes, data-feeding means at said first station of said first device for shifting selected primary pins into effective positions while said pins continue to travel about said first axis, and data-transferring means having a receiving portion at said second station and a transmitting portion at said secondary device and being actuated by a primary pin in effective position for shifting a secondary pin into its effective position while said primary and secondary pins continue to move about their respective axes.

11. The mechanism of claim 10 wherein said first memory device is an endless flexible belt having elongated, substantially straight first and second runs respectively adjacent to said first and second stations, wherein said belt is divided into a plurality of sectors spaced longitudinally of said runs, and wherein said primary pins are positioned in said sectors, wherein said second memory device includes a rotor rotatable about said second axis, wherein said secondary pins are mounted on said rotor in a plurality of rows axially spaced along said rotor, the rows of pins on said rotor individually corresponding to certain sectors on said belt, and wherein said data transferring means has receiving portions individually adjacent to said certain sectors of said belt and a plurality of transmitting portions individually adjacent to said rows of secondary pins.

12. In a combined data storing and control device, an endless belt having an elongated run, means mounting said belt for movement in a circuitous path and with said run disposed substantially entirely in a single plane, transversely extending rows of pins movably supported on said belt in consecutive longitudinally spaced sectors of the peripheral surface thereof for individual adjustment from an ineffective to an effective position, the individual pins of consecutive pin rows being aligned in a direction longitudinally of the belt to form longitudinally extending pin files, means for imparting continuous movement to said belt in its path whereby said run is moved longitudinally thereof in a predetermined direction, a support confronting said run of said belt, actuatable control members mounted on said support in individual alignment with said pin files, means mounting said support for oscillating movement thereby successively moving said control members toward said run, thence in said predetermined direction at substantially the same speed as said run and in opposed relation to selective pins whereby said control members are intermittently positioned for engagement with said selected pins when said control members are actuated, and thence away from said run, and means for imparting said oscillating movement to said support in synchronism with said belt.

13. In a memory device, a support, a pair of shafts mounted on said support in spaced parallel relation with each other, a pair of endless flexible supporting members circumscribing said shafts, means mounting said supporting members on said shafts for circuitous travel therearound and so that said members have elongated straight portions extending between said shafts, there being a pair of such straight portions on each side of a plane passing axially through said shafts, a sequence of channels having side walls terminating in outer edges, said channels interconnecting said members in circumferentially spaced relation about said shafts, each pair of said straight portions and the channels interconnecting them constituting a substantially planar run of said belt, each of said channels having a concave side facing outward with respect to said shafts, and pins pivotally mounted between said side walls of said channels for movement between angularly spaced, effective and ineffective positions, said pins projecting outward from the outer edges of their respective channels in each of said positions of said pins.

14. A data storage mechanism comprising a first memory device having a mounting member, means operable to drive said member along a predetermined path, rows of pins extending from said member, said pins being movably supported from said member in consecutive sectors of the peripheral surface thereof for individual adjustment from an ineffective position to an effective position and corresponding pins of consecutive rows of pins being aligned lengthwise of said path to form longitudinal extending pin files, a first supporting structure disposed at a predetermined station along said path and arranged adjacent said member along the peripheral surface of said member, solenoids held by said supporting structure opposite said pin files and operative upon energization to shift selected pins of said pin files from the ineffective to the effective position for storing information, a second supporting structure disposed at a subsequent station along said path and arranged adjacent said member along and exteriorly of said member; switches held by said second supporting structure opposite said pin files in such a manner that they are actuated by pins in the effective position, a second memory device including a rotor, a row of pins movably supported from said rotor for individual adjustment from an ineffective to an effective position, a plurality of Geneva gears rotatably mounted in an arc around said rotor in such a manner that the recesses in the peripheries of said Geneva gears are drivingly engaged by the pins of said rotor that are in the effective position, normally open switches associated with each of said Geneva gears, means on said Geneva gears adapted to close said normally open switches, and means responsive to the actuated switches of said second supporting structure and operable to move said pins of said rotor from the ineffective to the effective position for transferring information from said first memory device to said second memory device to store the information in said second memory device.

15. A data storage mechanism comprising a first memory device having a mounting member, means operable to drive said member along a predetermined path, pins extending from said member and being movably supported from said member in consecutive sectors of the peripheral surface thereof for individual adjustment from an ineffective position to an effective position, a first supporting structure disposed at a predetermined station along said path and arranged adjacent said member along the peripheral surface of said member, solenoids held by said supporting structure opposite said pins and operative upon energization to shift selected pins from the ineffective to the effective position for storing information, a second supporting structure disposed at a subsequent station along said path and arranged adjacent said member along and exteriorly of said member; switches held by said second supporting structure opposite said pins in such a manner that they are actuated by pins in the effective position, a second memory device including a rotor, pins movably supported from said rotor for individual adjustment from an ineffective to an effective position, a plurality of Geneva gears rotatably mounted around said rotor in such a manner that recesses in the peripheries of said Geneva gears are drivingly engaged by the pins of said rotor that are in the effective position, normally open switches associated with each of said Geneva gears, means on said Geneva gears adapted to close said normally open switches, and means responsive to the actuated switches of said second supporting structure and operable to move said pins of said rotor from the ineffective to the effective position for transferring information from said first memory device to said second memory device to store the information in said second memory device.

16. A combined data storing and control device comprising an endless belt having elongated storing and controlling runs, means mounting said belt with its storing and controlling runs substantially straight and in spaced substantially parallel relation with each other and for circuitous travel about axes extending transversely of said runs, said runs including consecutive sectors spaced lengthwise of said runs, said runs also having outwardly facing outer surfaces, each of said outer surfaces being on the opposite side of said runs from said axes, means for imparting circuitous movement to said belt, rows of pins pivotally supported on said belt in said consecutive sectors for individual adjustment of each pin from an ineffective to an effective position and projecting outward from said outer surfaces of said runs in both of said positions, the individual pins of successive rows being aligned longitudinally of said runs to form longitudinally extending pin files, a first supporting structure mounted in spaced confronting relation to the outer surface of said storing run, solenoids extending from said supporting surface toward and disposed opposite to said pin files and being operative upon energization to shift selected pins in said files from ineffective to effective positions, a second supporting structure mounted in spaced confronting relation to the outer surface of said controlling run, and switches extending from said second supporting structure toward and disposed opposite to said files so that they are actuated by pins in effective positions.

References Cited in the file of this patent

UNITED STATES PATENTS

| | | |
|---|---|---|
| 2,217,342 | Ladrach | Oct. 8, 1940 |
| 2,317,888 | Cypser | Apr. 27, 1943 |
| 2,380,894 | Colman | July 31, 1945 |
| 2,441,984 | Armstrong | May 25, 1948 |
| 2,601,154 | Krueger et al. | June 17, 1952 |
| 2,661,091 | Maloney | Dec. 1, 1953 |
| 2,785,242 | White | Mar. 12, 1957 |
| 2,795,150 | Seidler | June 11, 1957 |
| 2,866,176 | Durfee et al. | Dec. 23, 1958 |
| 2,890,298 | Bullard et al. | June 9, 1959 |

OTHER REFERENCES

Automatic Digital Calculators, pages 113–115 by Booth & Booth, London, 1953.